(12) United States Patent
Liu et al.

(10) Patent No.: US 10,554,467 B2
(45) Date of Patent: Feb. 4, 2020

(54) SIGNAL SENDING APPARATUS, SIGNAL DETECTION APPARATUS, SIGNAL SENDING AND DETECTION SYSTEM, SIGNAL SENDING METHOD, AND SIGNAL DETECTION METHOD

(71) Applicant: HUAWEI TECHNOLOGIES CO., LTD., Shenzhen, Guangdong (CN)

(72) Inventors: Jianqin Liu, Beijing (CN); Jianghua Liu, Beijing (CN); Qiang Wu, Beijing (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/055,353

(22) Filed: Aug. 6, 2018

(65) Prior Publication Data
US 2018/0343159 A1    Nov. 29, 2018

Related U.S. Application Data

(63) Continuation of application No. 15/639,373, filed on Jun. 30, 2017, which is a continuation of application No. PCT/CN2014/095890, filed on Dec. 31, 2014.

(51) Int. Cl.
*H04L 27/26* (2006.01)
*H04J 1/00* (2006.01)
(Continued)

(52) U.S. Cl.
CPC ......... *H04L 27/2676* (2013.01); *H04J 1/00* (2013.01); *H04J 11/0073* (2013.01); *H04J 11/0076* (2013.01); *H04L 5/0048* (2013.01)

(58) Field of Classification Search
CPC ............. H04L 27/2676; H04J 11/0073; H04J 11/0076
See application file for complete search history.

(56) References Cited

U.S. PATENT DOCUMENTS

| 5,065,398 A | 11/1991 | Takashima |
| 5,473,612 A | 12/1995 | Dehner, Jr. et al. |

(Continued)

FOREIGN PATENT DOCUMENTS

| CN | 1325196 A | 12/2001 |
| CN | 101425991 A | 5/2009 |

(Continued)

OTHER PUBLICATIONS

Bei Yin et al.,"High-Throughput Beamforming Receiver for Millimeter Wave Mobile Communication",Global Communications Conference,dated 2013,total 6 pages.

*Primary Examiner* — Jean B Corrielus
(74) *Attorney, Agent, or Firm* — Gregg L. Jansen

(57) ABSTRACT

The present invention provides a signal sending apparatus, a signal detection apparatus, a signal sending and detection system, a signal sending method, and a signal detection method. The apparatus determines a time unit that is in each time window and that is used to transmit a synchronization signal, and transmits the synchronization signal in the determined time unit in each time window. Therefore, a synchronization signal is always located in a time unit that has a fixed location in each time window, so that a device at a receive end needs to perform detection only in a fixed time unit in each time window, thereby reducing complexity of designing and detecting the synchronization signal.

17 Claims, 15 Drawing Sheets

Determine a time unit that is in each time window and that is for detecting a synchronization signal — 500

Detect the synchronization signal in the determined time unit in each time window — 501

(51) Int. Cl.
  *H04L 5/00* (2006.01)
  *H04J 11/00* (2006.01)

(56) References Cited

U.S. PATENT DOCUMENTS

| | | | |
|---|---|---|---|
| 6,536,011 B1* | 3/2003 | Jang | G11B 27/3027 369/47.28 |
| 6,975,652 B1 | 12/2005 | Mannette et al. | |
| 7,738,422 B2 | 6/2010 | Das et al. | |
| 9,408,170 B2 | 8/2016 | Abraham et al. | |
| 9,681,456 B2 | 6/2017 | Son et al. | |
| 2002/0021718 A1 | 2/2002 | Kerhuel et al. | |
| 2004/0028236 A1 | 2/2004 | Chelen | |
| 2005/0213695 A1* | 9/2005 | Shin-e | G11B 20/10009 375/354 |
| 2006/0269028 A1 | 11/2006 | Bley et al. | |
| 2009/0016714 A1 | 1/2009 | Soto et al. | |
| 2009/0125363 A1 | 5/2009 | Frederiksen et al. | |
| 2010/0034239 A1 | 2/2010 | Keshavarzian et al. | |
| 2010/0317384 A1* | 12/2010 | Sakai | H04L 5/005 455/501 |
| 2011/0216787 A1 | 9/2011 | Ai et al. | |
| 2012/0008646 A1 | 1/2012 | Fourcand | |
| 2012/0033647 A1 | 2/2012 | Moon et al. | |
| 2012/0120910 A1 | 5/2012 | Mazzarese et al. | |
| 2012/0182956 A1 | 7/2012 | Liu et al. | |
| 2013/0178220 A1 | 7/2013 | Lee et al. | |
| 2013/0235851 A1 | 9/2013 | Abu-Surra et al. | |
| 2013/0258936 A1 | 10/2013 | Choi et al. | |
| 2014/0086111 A1 | 3/2014 | Li et al. | |
| 2014/0126380 A1 | 5/2014 | Kazmi et al. | |
| 2014/0133371 A1 | 5/2014 | Park et al. | |
| 2014/0204825 A1 | 7/2014 | Ekpenyong et al. | |
| 2014/0233522 A1 | 8/2014 | Tokairin et al. | |
| 2014/0254564 A1 | 9/2014 | Khude et al. | |
| 2014/0269673 A1 | 9/2014 | Yin et al. | |
| 2014/0341018 A1 | 11/2014 | Bhushan et al. | |
| 2014/0362701 A1 | 12/2014 | Roh et al. | |
| 2015/0085717 A1 | 3/2015 | Papasakellariou et al. | |
| 2015/0103960 A1 | 4/2015 | Mohammed et al. | |
| 2016/0192355 A1 | 6/2016 | Yu et al. | |
| 2016/0227345 A1 | 8/2016 | Xu et al. | |
| 2016/0227498 A1 | 8/2016 | Zhang et al. | |
| 2018/0003794 A1 | 1/2018 | Raghupathy et al. | |

FOREIGN PATENT DOCUMENTS

| | | |
|---|---|---|
| CN | 101645722 A | 2/2010 |
| CN | 102239647 A | 11/2011 |
| CN | 102484548 A | 5/2012 |
| CN | 103220707 A | 7/2013 |
| CN | 103686987 A | 3/2014 |
| EP | 1892865 A1 | 2/2008 |
| WO | 2014086409 A1 | 6/2014 |

* cited by examiner

FIG. 12B

| 19 | 20 | 21 | 22 | 23 | 24 | 25 | 26 | 27 | 28 | 29 | 30 | 31 | 32 | 33 | 34 | 35 | 36 | 37 | 38 | 39 |

| f | a | b | c | d | e | f | a | b | c | d | a | b | c | d | e | f | c | d | e | f |

CONT. FROM FIG. 21A

FIG. 21B

| 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| a | b | c | d | e | f | g | h | i | j | k | l | m | n | o | k | l | m | n | o |

| 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|
| a | b | c | d | e | f | g | h | i | j | k | l | m | n | o | k | l | m | n | o |

CONT. FROM FIG. 23A

SIGNAL SENDING APPARATUS, SIGNAL DETECTION APPARATUS, SIGNAL SENDING AND DETECTION SYSTEM, SIGNAL SENDING METHOD, AND SIGNAL DETECTION METHOD

CROSS-REFERENCE TO RELATED APPLICATIONS

This application is a continuation of U.S. patent application Ser. No. 15/639,373, filed on Jun. 30, 2017, which is a continuation of International Application No. PCT/CN2014/095890, filed on Dec. 31, 2014, the disclosure of which is hereby incorporated by reference in its entirety.

TECHNICAL FIELD

The present invention relates to communications technologies, and in particular, to a signal sending apparatus, a signal detection apparatus, a signal sending and detection system, a signal sending method, and a signal detection method.

BACKGROUND

In a high frequency scenario, to overcome relatively large transmission losses, a beamforming (BF) technology, that is, antenna array beamforming, needs to be used in transmission of some common channels or reference signals such as a downlink measurement reference signal(DL-MRS), a physical broadcast channel (PBCH), a primary synchronization signal (PSS), and a secondary synchronization signal (SSS) to form a beam, so as to generate a large antenna gain. User equipment in a network or a cell transmits a signal in a time division manner. That is, the different beams in the cell or the network cyclically function at different moments. When one beam is corresponding to one resource (such as a radio frequency resource) by definition, because a common channel and a common reference signal are transmitted to ensure wide coverage for all users in the cell, to ensure wide coverage for all the users in the cell, transmission of the common channel and the reference signal is time-division polling transmission based on multiple resources. A broadcast channel (such as a PBCH) or a synchronization signal (such as a PSS and/or an SSS) in each resource is separately sent in multiple time units according to a fixed cycle/interval. An existing Long Term Evolution (LTE) system is used as an example. An encoded broadcast channel transmission block is mapped to a radio frame. Duration of each radio frame is 10 ms, and each radio frame includes 10 subframes. Generally, four radio frames are used as one cycle.

In the prior art, a transmission cycle of each resource is related to a quantity of resources. When receiving the signal, the user equipment needs to perform blind detection on a broadcast channel or a synchronization signal in each frame. However, because each cell is not corresponding to a fixed quantity of resources, a number of a subframe in which the user equipment performs blind detection on a broadcast channel or a synchronization signal in each frame is not fixed. A synchronization signal is used as an example. FIG. 1A and FIG. 1B are a schematic diagram of signal sending in the prior art. It can be learned by referring to FIG. 1A and FIG. 1B that, when the quantity of resources is 6, blind detection on a synchronization signal in a resource a needs to be performed in a subframe whose number is 0, 6, 2, or 4 in each frame, and one round of periodic detection on the resource a needs to use three frames. When the quantity of resources is 7, blind detection on a synchronization signal in a resource a needs to be performed in a subframe whose number is 0, 7, 4, 1, 8, 5, 2, 9, 6, or 3 in each frame, and one round of periodic detection on the resource a needs to use seven frames. Consequently, complexity of designing a broadcast channel or a synchronization signal or the like, and complexity of performing blind detection by a user are greatly increased.

SUMMARY

Embodiments of the present invention provide a signal sending apparatus, a signal detection apparatus, a signal sending and detection system, a signal sending method, and a signal detection method, so as to reduce complexity of designing a broadcast channel or a synchronization signal, and complexity of performing blind detection by a user.

A first aspect of the present invention provides a signal sending apparatus, including:

a determining module, configured to determine a time unit that is in each time window and that is used to transmit a synchronization signal, where the determined time unit includes at least one of: $j^{th}$ time unit in each time window, a $(j+(\lfloor m/S \rfloor +1) \cdot S - m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S; and a transmission module, configured to transmit the synchronization signal in the determined time unit in each time window.

With reference to the first aspect, in a first possible implementation, a sequence corresponding to the synchronization signal is formed by interleaving a first subsequence with a second subsequence; an expression of the first subsequence is as follows:

$$d(2n) = \begin{cases} s_0^{(m_0)}(n)c_0(n) & \text{a time unit } j \\ s_1^{(m_1)}(n)c_0(n) & \text{a time unit } j+(\lfloor m/S \rfloor +1) \times S - m \text{,} \\ s_2^{(m_2)}(n)c_0(n) & \text{a time unit } j+m \end{cases}$$

where $0 \leq n \leq N/2$; N is a length of the sequence corresponding to the synchronization signal; d(2n) is the first subsequence; $s_0^{(m_0)}(n)$, $s_1^{(m_1)}(n)$, and $s_2^{(m_2)}(n)$ are three sequences including three cyclic shifts of a first M sequence; $c_0(n)$ is a first scrambling code sequence including a cyclic shift of a second M sequence; $s_0^{(m_0)}(n)c_0(n)$ is used to represent the first subsequence used when the synchronization signal is transmitted in the $j^{th}$ time unit in each time window; $s_1^{(m_1)}(n)c_0(n)$ is used to represent the first subsequence used when the synchronization signal is transmitted in the $(j+(\lfloor m/S \rfloor +1) \times S - m)^{th}$ time unit in each time window; and $s_2^{(m_2)}(n)c_0(n)$ is used to represent the first subsequence used when the synchronization signal is transmitted in the $(j+m)^{th}$ time unit in each time window; and an expression of the second subsequence is as follows:

$$d(2n+1) = \begin{cases} s_2^{(m_2)}(n)c_1(n)z_1^{(m_0)}(n) & \text{a time unit } j \\ s_1^{(m_1)}(n)c_1(n)z_1^{(m_1)}(n) & \text{a time unit } j+(\lfloor m/S \rfloor +1) \times S - m \text{,} \\ s_0^{(m_0)}(n)c_1(n)z_1^{(m_2)}(n) & \text{a time unit } j+m \end{cases}$$

where d(2n+1) is the second subsequence; $c_1(n)$ is a second scrambling code sequence including a cyclic shift of the second M sequence;) $z_1^{(m_0)}(n)$, $z_1^{(m_1)}(n)$, and $z_2^{(m_2)}(n)$ are three third scrambling code sequences including three cyclic shifts of a third M sequence; $s_2^{(m_2)}(n)c_1(n)z_1^{(m_0)}(n)$ is used to represent the second subsequence used when the synchronization signal is transmitted in the $j^{th}$ time unit in each time window; $s_1^{(m_1)}(n)c_1(n)z_1^{(m_1)}(n)$ is used to represent the second subsequence used when the synchronization signal is transmitted in the $(j+(\lfloor m/S \rfloor+1) \times S-m)^{th}$ time unit in each time window; and $s_0^{(m_0)}(n)c_1(n)z_1^{(m_2)}(n)$ is used to represent the second subsequence used when the synchronization signal is transmitted in the $(j+m)^{th}$ time unit in each time window.

With reference to the first aspect or the first possible implementation of the first aspect, in a second possible implementation, the transmission module is further configured to: before transmitting the synchronization signal in the determined time unit in each time window, send m to user equipment UE by using a broadcast channel.

With reference to any one of the first aspect or the possible implementations of the first aspect, in a third possible implementation, the determining module is specifically configured to determine, according to preset synchronization signal information, the time unit that is in each time window and that is used to transmit the synchronization signal, where the preset synchronization signal information includes the time unit that is in each time window and that is used to transmit the synchronization signal; or the transmission module is further configured to: obtain updated synchronization signal information, and determine, according to the updated synchronization signal information, the time unit that is in each time window and that is used to transmit the synchronization signal, where the updated synchronization signal information includes the time unit that is in each time window and that is used to transmit the synchronization signal.

With reference to any one of the first aspect or the possible implementations of the first aspect, in a fourth possible implementation, the determining module is further configured to determine time units that are in T consecutive time windows and that are used to transmit the broadcast channel, where T is an integer greater than 0, and the time units that are in the T time windows and that are used to transmit the broadcast channel are $j^{th}$ time units in all the T time windows; and the transmission module is further configured to transmit the broadcast channel in each of the determined time units that are in the T time windows and that are used to transmit the broadcast channel.

With reference to the fourth possible implementation of the first aspect, in a fifth possible implementation, the broadcast channel is located in r time units in each time window, and the r time units have fixed locations in each time window.

With reference to the fifth possible implementation of the first aspect, in a sixth possible implementation, r and m have equal values.

With reference to the fifth possible implementation of the first aspect or the sixth possible implementation of the first aspect, in a seventh possible implementation, the transmission module is further configured to: before transmitting the broadcast channel in each of the determined time units that are in the T time windows and that are used to transmit the broadcast channel, send r to the user equipment UE by using the broadcast channel.

With reference to the fourth possible implementation of the first aspect, or the fifth possible implementation of the first aspect, or the sixth possible implementation of the first aspect, or the seventh possible implementation of the first aspect, in an eighth possible implementation, the determining module is specifically configured to determine, according to preset broadcast channel information, the time units that are in the T consecutive time windows and that are used to transmit the broadcast channel, where the preset broadcast channel information includes: a quantity T of the time windows, and a time unit that is in each time window and that is used to transmit the broadcast channel; or the transmission module is further configured to: obtain updated broadcast channel information, and determine, according to the updated broadcast channel information, the time units that are in the T consecutive time windows and that are used to transmit the broadcast channel, where the updated broadcast channel information includes: a quantity T of the time windows, and a time unit that is in each time window and that is used to transmit the broadcast channel.

With reference to any one of the first aspect or the possible implementations of the first aspect, in a ninth possible implementation, the determining module is further configured to determine a time unit that is in each time window and that is used to transmit each set of downlink measurement reference signals, where the determined time unit that is in each time window and that is used to transmit each set of downlink measurement reference signals includes at least one of: the $j^{th}$ time unit in each time window, a $(j+(\lfloor q/S \rfloor+1) \cdot S-q)^{th}$ time unit in each time window, $(j+q)^{th}$ time unit in each time window, and q is a positive integer that is greater than or equal to 1 and that is less than or equal to S; and the transmission module is further configured to transmit each set of downlink measurement reference signals in the determined time unit that is in the time window and that is used to transmit the downlink measurement reference signal.

With reference to the ninth possible implementation of the first aspect, in a tenth possible implementation, the transmission module is specifically configured to perform, by using the following formula, cyclic shift on the determined time unit that is in the time window and that is used to transmit each set of downlink measurement reference signals, so that each set of downlink measurement reference signals is always transmitted in the $j^{th}$ time unit in each time window, and/or the $(j+q)^{th}$ time unit in each time window, and/or the $(j+(\lfloor q/S \rfloor+1) \cdot S-q)^{th}$ time unit in each time window:

$$t = \left\lfloor \frac{kq}{S} \right\rfloor \times S - \left\lfloor \left\lfloor \frac{kq}{S} \right\rfloor \times \frac{S}{q} \right\rfloor \times q,$$

where the cyclic shift is performing cyclic shift, by t time units, on time units corresponding to a $k^{th}$ time of transmission of q sets of the downlink measurement reference signals, q indicates a set quantity of downlink measurement reference signals in each time of transmission, k indicates the $k^{th}$ time of transmission, t indicates a quantity of time units by which cyclic shift is performed for each set of downlink measurement reference signals in each cyclic shift, and q, k, and t are all positive integers greater than 0.

With reference to the ninth possible implementation of the first aspect or the tenth possible implementation of the first aspect, in an eleventh possible implementation, the transmission module is further configured to: before transmitting each set of downlink measurement reference signals in the determined time unit that is in the time window and that is used to transmit the downlink measurement reference signal, send a value of q to the user equipment UE by using the broadcast channel.

With reference to the eleventh possible implementation of the first aspect, in a twelfth possible implementation, the apparatus further includes:

a configuration module, configured to configure, for each UE by using higher layer signaling, a time unit corresponding to each set of downlink measurement reference signals to be measured by the UE.

With reference to the ninth possible implementation of the first aspect, or the tenth possible implementation of the first aspect, or the eleventh possible implementation of the first aspect, or the twelfth possible implementation of the first aspect, in a thirteenth possible implementation, the determining module is specifically configured to determine, according to preset downlink measurement reference signal information, the time unit that is in each time window and that is used to transmit each set of downlink measurement reference signals, where the preset downlink measurement reference signal information includes the time unit that is in each time window and that is used to transmit each set of downlink measurement reference signals; or the transmission module is further configured to: obtain updated downlink measurement reference signal information, and determine, according to the updated downlink measurement reference signal information, the time unit that is in each time window and that is used to transmit each set of downlink measurement reference signals, where the updated downlink measurement reference signal information includes the time unit that is in each time window and that is used to transmit each set of downlink measurement reference signals.

A second aspect of the present invention provides a signal sending apparatus, including:

a determining module, configured to determine a time unit that is in each time window and that is used to transmit each set of downlink measurement reference signals, where the determined time unit that is in each time window and that is used to transmit each set of downlink measurement reference signals includes at least one of: a $j^{th}$ time unit in each time window, a $(j+(\lfloor q/S \rfloor+1) \cdot S-q)^{th}$ time unit in each time window, S is a quantity of time units included in each time window, q is a positive integer that is greater than or equal to 1 and that is less than or equal to S, and j is a positive integer that is greater than or equal to 1 and that is less than or equal to S; and a transmission module, configured to transmit each set of downlink measurement reference signals in the determined time unit that is in the time window and that is used to transmit the downlink measurement reference signal.

With reference to the second aspect, in a first possible implementation, the transmission module is specifically configured to perform cyclic shift on the determined time unit that is in the time window and that is used to transmit each set of downlink measurement reference signals, so that each set of downlink measurement reference signals is always transmitted in the $j^{th}$ time unit in each time window, and/or the $(j+q)^{th}$ time unit in each time window, and/or the $j+(\lfloor q/S \rfloor+1) \cdot S-q)^{th}$ time unit in each time window:

$$t = \left\lfloor \frac{kq}{S} \right\rfloor \times S - \left\lfloor \left\lfloor \frac{kq}{S} \right\rfloor \times \frac{S}{q} \right\rfloor \times q,$$

where the cyclic shift is performing cyclic shift, by t time units, on time units corresponding to a $k^{th}$ time of transmission of q sets of the downlink measurement reference signals, q indicates a set quantity of downlink measurement reference signals in each time of transmission, k indicates the $k^{th}$ time of transmission, t indicates a quantity of time units by which cyclic shift is performed for each set of downlink measurement reference signals in each cyclic shift, and q, k, and t are all positive integers greater than 0.

With reference to the second aspect or the first possible implementation of the second aspect, in a second possible implementation, the transmission module is further configured to: before transmitting each set of downlink measurement reference signals in the determined time unit that is in the time window and that is used to transmit the downlink measurement reference signal, send a value of q to user equipment UE by using a broadcast channel.

With reference to the second possible implementation of the second aspect, in a third possible implementation, the apparatus further includes:

a configuration module, configured to configure, for each UE by using higher layer signaling, a time unit corresponding to each set of downlink measurement reference signals to be measured by the UE.

With reference to any one of the second aspect or the possible implementations of the first aspect, in a fourth possible implementation, the determining module is specifically configured to determine, according to preset downlink measurement reference signal information, the time unit that is in each time window and that is used to transmit each set of downlink measurement reference signals, where the preset downlink measurement reference signal information includes the time unit that is in each time window and that is used to transmit each set of downlink measurement reference signals; or the transmission module is further configured to: obtain updated downlink measurement reference signal information, and determine, according to the updated downlink measurement reference signal information, the time unit that is in each time window and that is used to transmit each set of downlink measurement reference signals, where the updated downlink measurement reference signal information includes the time unit that is in each time window and that is used to transmit each set of downlink measurement reference signals.

A third aspect of the present invention provides a signal sending apparatus, including:

a determining module, configured to determine time units that are in T consecutive time windows and that are used to transmit a broadcast channel, where T is an integer greater than 0, T is an integer greater than 0, and the time units that are in the T time windows and that are used to transmit the broadcast channel are $j^{th}$ time units in all the T time windows, j is a positive integer that is greater than or equal to 1 and that is less than or equal to S, and S is a quantity of time units included in each time window; and a transmission module, configured to transmit the broadcast channel in each of the determined time units that are in the T time windows and that are used to transmit the broadcast channel.

With reference to the third aspect, in a first possible implementation, the broadcast channel is located in r time units in each time window, the r time units have fixed locations in each time window, and r is a positive integer that is greater than or equal to 1 and that is less than or equal to S.

With reference to the first possible implementation of the third aspect, in a second possible implementation, the transmission module is further configured to: before transmitting the broadcast channel in each of the determined time units that are in the T time windows and that are used to transmit the broadcast channel, send r to user equipment UE by using the broadcast channel.

With reference to the third aspect or the first possible implementation of the third aspect, in a third possible implementation, the determining module is specifically configured to determine, according to preset broadcast channel information, the time units that are in the T consecutive time windows and that are used to transmit the broadcast channel, where the preset broadcast channel information includes: a quantity T of the time windows, and a time unit that is in each time window and that is used to transmit the broadcast channel; or the transmission module is further configured to: obtain updated broadcast channel information, and determine, according to the updated broadcast channel information, the time units that are in the T consecutive time windows and that are used to transmit the broadcast channel, where the updated broadcast channel information includes: a quantity T of the time windows, and a time unit that is in each time window and that is used to transmit the broadcast channel.

A fourth aspect of the present invention provides a signal sending apparatus, including:

a determining module, configured to determine P antenna ports, where the P antenna ports are antenna ports for transmitting a synchronization signal; and a transmission module, configured to map a broadcast channel to the P antenna ports for transmission.

With reference to the fourth aspect, in a first possible implementation, the transmission module is specifically configured to: separately map, in an $i^{th}$ time unit in each time window, the broadcast channel to the P antenna ports for transmission; and separately map, in the $i^{th}$ time unit in each time window, the synchronization signal to the P antenna ports for transmission, where a transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

With reference to the first possible implementation of the fourth aspect, in a second possible implementation, the transmission module is specifically configured to map, in at least two symbols in the $i^{th}$ time unit in each time window, the synchronization signal to the P antenna ports for transmission, where the symbol is a unit of time that is smaller than the time unit.

With reference to any one of the fourth aspect or the possible implementations of the fourth aspect, in a third possible implementation, the determining module is specifically configured to determine the P antenna ports according to preset antenna port information, where the preset antenna port information includes a correspondence between the P antenna ports and the synchronization signal; or the transmission module is further configured to: obtain updated antenna port information, and determine the P antenna ports according to the updated antenna port information, where the updated antenna port information includes a correspondence between the P antenna ports and the synchronization signal.

A fifth aspect of the present invention provides a signal detection apparatus, including:

a determining module, configured to determine a time unit that is in each time window and that is for detecting a synchronization signal, where the determined time unit includes at least one of: a $j^{th}$ time unit in each time window, a $(j+(\lfloor m/S \rfloor+1)\cdot S-m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S; and a detection module, configured to detect the synchronization signal in the determined time unit in each time window.

With reference to the fifth aspect, in a first possible implementation, a sequence corresponding to the synchronization signal is formed by interleaving a first subsequence with a second subsequence; an expression of the first subsequence is as follows:

$$d(2n) = \begin{cases} s_0^{(m_0)}(n)c_0(n) & \text{a time unit } j \\ s_1^{(m_1)}(n)c_0(n) & \text{a time unit } j+(\lfloor m/S \rfloor+1)\times S-m \\ s_2^{(m_2)}(n)c_0(n) & \text{a time unit } j+m \end{cases},$$

where $0 \leq n \leq N/2$; N is a length of the sequence corresponding to the synchronization signal; d(2n) is the first subsequence; $s_0^{(m_0)}(n)$, $s_1^{(m_1)}(n)$, and $s_2^{(m_2)}(n)$ are three sequences including three cyclic shifts of a first M sequence; $C_0(n)$ is a first scrambling code sequence including a cyclic shift of a second M sequence; $s_0^{(m_0)}(n)c_0(n)$ is used to represent the first subsequence used when the synchronization signal is transmitted in the $j^{th}$ time unit in each time window; $s_1^{(m_1)}(n)c_0(n)$ is used to represent the first subsequence used when the synchronization signal is transmitted in the $(j+(\lfloor m/S \rfloor+1)\times S-m)^{th}$ time unit in each time window; and $s_2^{(m_2)}(n)C_0(n)$ is used to represent the first subsequence used when the synchronization signal is transmitted in the $(j+m)^{th}$ time unit in each time window; and an expression of the second subsequence is as follows:

$$d(2n+1) = \begin{cases} s_2^{(m_2)}(n)c_1(n)z_1^{(m_0)}(n) & \text{a time unit } j \\ s_1^{(m_1)}(n)c_1(n)z_1^{(m_1)}(n) & \text{a time unit } j+(\lfloor m/S \rfloor+1)\times S-m \\ s_0^{(m_0)}(n)c_1(n)z_1^{(m_2)}(n) & \text{a time unit } j+m \end{cases},$$

where d(2n+1) is the second subsequence; $c_1(n)$ is a second scrambling code sequence including a cyclic shift of the second M sequence; $z_1^{(m_0)}(n)$, $z_1^{(m_1)}(n)$, and $z(_2^{(m_2)}(n)$ are three third scrambling code sequences including three cyclic shifts of a third M sequence; $s_2^{(m_2)}(n)c_1(n)z_1^{(m_0)}(n)$ is used to represent the second subsequence used when the synchronization signal is transmitted in the $j^{th}$ time unit in each time window; $s_1^{(m_1)}(n)c_1(n)z_1^{(m_1)}(n)$ is used to represent the second subsequence used when the synchronization signal is transmitted in the $(j+(\lfloor m/S \rfloor+1)\times S-m)^{th}$ time unit in each time window; and $s_0^{(m_0)}(n)c_1(n)z_1^{(m_2)}(n)$ is used to represent the second subsequence used when the synchronization signal is transmitted in the $(j+m)^{th}$ time unit in each time window.

With reference to the fifth aspect or the first possible implementation of the fifth aspect, in a second possible implementation, the apparatus further includes:

a transmission module, further configured to: before the time unit that is in each time window and that is for detecting the synchronization signal is determined, obtain a value of m that is broadcasted by a transmit end.

With reference to any one of the fifth aspect or the possible implementations of the fifth aspect, in a third possible implementation, the determining module is specifically configured to:

determine, according to preset synchronization signal information, the time unit that is in each time window and that is for detecting the synchronization signal, where the preset synchronization signal information includes the time unit that is in each time window and that is for detecting the synchronization signal; or obtain updated synchronization signal information, and determine, according to the updated synchronization signal information, the time unit that is in each time window and that is for detecting the synchronization signal, where the updated synchronization signal information includes the time unit that is in each time window and that is for detecting the synchronization signal.

With reference to any one of the fifth aspect or the possible implementations of the fifth aspect, in a fourth possible implementation, the determining module is further configured to determine time units that are in T consecutive time windows and that are for detecting the broadcast channel, where T is an integer greater than 0, and the time units that are in the T time windows and that are for detecting the broadcast channel are $j^{th}$ time units in all the time windows; and the detection module is further configured to detect the broadcast channel in the determined time units that are in the T time windows and that are for detecting the broadcast channel.

With reference to the fourth possible implementation of the fifth aspect, in a fifth possible implementation, the broadcast channel is located in r time units in each time window, the r time units have fixed locations in each time window, and r is a positive integer that is greater than or equal to 1 and that is less than or equal to S.

With reference to the fifth possible implementation of the fifth aspect, in a sixth possible implementation, r and m have equal values.

With reference to the fifth possible implementation of the fifth aspect or the sixth possible implementation of the fifth aspect, in a seventh possible implementation, the determining module is further configured to: before the broadcast channel is detected in the determined time units that are in the T time windows and that are for detecting the broadcast channel, obtain a value of r that is broadcasted by the transmit end.

With reference to the fourth possible implementation of the fifth aspect, or the fifth possible implementation of the fifth aspect, or the sixth possible implementation of the fifth aspect, or the seventh possible implementation of the fifth aspect, in an eighth possible implementation, the determining module is specifically configured to:

determine, according to preset broadcast channel information, the time units that are in the T consecutive time windows and that are for detecting the broadcast channel, where the preset broadcast channel information includes: a quantity T of the time windows, and a time unit that is in each time window and that is for detecting the broadcast channel; or obtain updated broadcast channel information, and determine, according to the updated broadcast channel information, the time units that are in the T consecutive time windows and that are for detecting the broadcast channel, where the updated broadcast channel information includes: a quantity T of the time windows, and a time unit that is in each time window and that is for detecting the broadcast channel.

With reference to any one of the fifth aspect or the possible implementations of the fifth aspect, in a ninth possible implementation, the determining module is further configured to determine a time unit that is in each time window and that is for measuring each set of downlink measurement reference signals, where the determined time unit that is in each time window and that is for measuring each set of downlink measurement reference signals includes at least one of: the $j^{th}$ time unit in each time window, a $(j+(\lfloor q/S \rfloor+1) \cdot S - q)^{th}$ time unit in each time window, or a $(j+q)^{th}$ time unit in each time window, and q is a positive integer that is greater than or equal to 1 and that is less than or equal to S; and the detection module is further configured to perform channel quality measurement on each set of downlink measurement reference signals in the determined time unit that is in the time window and that is for measuring each set of downlink measurement reference signals.

With reference to the ninth possible implementation of the fifth aspect, in a tenth possible implementation, the determining module is further configured to: before channel quality measurement is performed on each set of downlink measurement reference signals in the determined time unit that is in the time window and that is for measuring each set of downlink measurement reference signals, obtain a value of q that is broadcasted by the transmit end.

With reference to the tenth possible implementation of the fifth aspect, in an eleventh possible implementation, the detection module is specifically configured to perform channel quality measurement on the downlink measurement reference signal in a time unit that is configured by the transmit end by using higher layer signaling and that is corresponding to each set of downlink measurement reference signals.

With reference to the ninth possible implementation of the fifth aspect, or the tenth possible implementation of the fifth aspect, or the eleventh possible implementation of the fifth aspect, or the twelfth possible implementation of the fifth aspect, in a thirteenth possible implementation, the determining module is specifically configured to:

determine, according to preset downlink measurement reference signal information, the time unit that is in each time window and that is for measuring each set of downlink measurement reference signals, where the preset downlink measurement reference signal information includes the time unit that is in each time window and that is for measuring each set of downlink measurement reference signals; or obtain updated downlink measurement reference signal information, and determine, according to the updated downlink measurement reference signal information, the time unit that is in each time window and that is for measuring each set of downlink measurement reference signals, where the updated downlink measurement reference signal information includes the time unit that is in each time window and that is for measuring each set of downlink measurement reference signals.

A sixth aspect of the present invention provides a signal detection apparatus, including:

a determining module, configured to determine a time unit that is in each time window and that is for measuring each set of downlink measurement reference signals, where the determined time unit that is in each time window and that is for measuring each set of downlink measurement reference signals includes at least one of: a $j^{th}$ time unit in each time window, a $(j+(\lfloor q/S \rfloor+1) \cdot S-q)^{th}$ time unit in each time window, or a $(j+q)^{th}$ time unit in each time window, q is a positive integer that is greater than or equal to 1 and that is less than or equal to S, S is a quantity of time units included in each time window, q is a positive integer that is greater than or equal to 1 and that is less than or equal to S, and j is a positive integer that is greater than or equal to 1 and that is less than or equal to S; and the detection module, configured to perform channel quality measurement on each set of downlink measurement reference signals in the determined time unit that is in the time window and that is for measuring each set of downlink measurement reference signals.

With reference to the sixth aspect, in a first possible implementation, the determining module is further configured to: before channel quality measurement is performed on each set of downlink measurement reference signals in the determined time unit that is in the time window and that is for measuring each set of downlink measurement reference signals, obtain a value of q that is broadcasted by the transmit end.

With reference to the first possible implementation of the sixth aspect, in a second possible implementation, the detection module is specifically configured to perform channel quality measurement on the downlink measurement reference signal in a time unit that is configured by the transmit end by using higher layer signaling and that is corresponding to each set of downlink measurement reference signals.

With reference to any one of the sixth aspect or the possible implementations of the sixth aspect, in a third possible implementation, the determining module is specifically configured to:

determine, according to preset downlink measurement reference signal information, the time unit that is in each time window and that is for measuring each set of downlink measurement reference signals, where the preset downlink measurement reference signal information includes the time unit that is in each time window and that is for measuring each set of downlink measurement reference signals; or obtain updated downlink measurement reference signal information, and determine, according to the updated downlink measurement reference signal information, the time unit that is in each time window and that is for measuring each set of downlink measurement reference signals, where the updated downlink measurement reference signal information includes the time unit that is in each time window and that is for measuring each set of downlink measurement reference signals.

A seventh aspect of the present invention provides a signal detection apparatus, including:

a determining module, configured to determine time units that are in T consecutive time windows and that are for detecting a broadcast channel, where T is an integer greater than 0, and the time units that are in the T time windows and that are for detecting the broadcast channel are $j^{th}$ time units in all the time windows, j is a positive integer that is greater than or equal to 1 and that is less than or equal to S, and S is a quantity of time units included in each time window; and a detection module, configured to detect the broadcast channel in the determined time units that are in the T time windows and that are for detecting the broadcast channel.

With reference to the seventh aspect, in a first possible implementation, the broadcast channel is located in r time units in each time window, the r time units have fixed locations in each time window, and r is a positive integer that is greater than or equal to 1 and that is less than or equal to S.

With reference to the first possible implementation of the seventh aspect, in a second possible implementation, the determining module is configured to: before the broadcast channel is detected in the determined time units that are in the T time windows and that are for detecting the broadcast channel, obtain a value of r that is broadcasted by the transmit end.

With reference to any one of the seventh aspect or the possible implementations of the seventh aspect, in a third possible implementation, the determining module is specifically configured to:

determine, according to preset broadcast channel information, the time units that are in the T consecutive time windows and that are for detecting the broadcast channel, where the preset broadcast channel information includes: a quantity T of the time windows, and a time unit that is in each time window and that is for detecting the broadcast channel; or obtain updated broadcast channel information, and determine, according to the updated broadcast channel information, the time units that are in the T consecutive time windows and that are for detecting the broadcast channel, where the updated broadcast channel information includes: a quantity T of the time windows, and a time unit that is in each time window and that is for detecting the broadcast channel.

An eighth aspect of the present invention provides a signal detection apparatus, including:

a determining module, configured to determine P antenna ports, where the P antenna ports are antenna ports for transmitting a synchronization signal by a transmit end; and a detection module, configured to detect a broadcast channel on the P antenna ports.

With reference to the eighth aspect, in a first possible implementation, the detection module is specifically configured to:

detect, in an $i^{th}$ time unit in each time window, the broadcast channel corresponding to the P antenna ports; and detect, in the $i^{th}$ time unit in each time window, the synchronization signal corresponding to the P antenna ports, where a transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

With reference to the first possible implementation of the eighth aspect, in a second possible implementation, the detection module is specifically configured to detect, in at least two symbols in the $i^{th}$ time unit in each time window, the synchronization signal corresponding to the P antenna ports, where the symbol is a unit of time that is smaller than the time unit.

With reference to any one of the eighth aspect or the possible implementations of the eighth aspect, in a third possible implementation, the determining module is specifically configured to:

determine the P antenna ports according to preset antenna port information, where the preset antenna port information includes a correspondence between the P antenna ports and the synchronization signal; or obtain updated antenna port information, and determine the P antenna ports according to the updated antenna port information, where the updated antenna port information includes a correspondence between the P antenna ports and the synchronization signal.

A ninth aspect of the present invention provides a signal sending apparatus, including:

a processor, configured to determine a time unit that is in each time window and that is used to transmit a synchronization signal, where the determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S; and a transceiver, configured to transmit the synchronization signal in the determined time unit in each time window.

With reference to the ninth aspect, in a first possible implementation, a sequence corresponding to the synchronization signal is formed by interleaving a first subsequence with a second subsequence; an expression of the first subsequence is as follows:

$$d(2n) = \begin{cases} s_0^{(m_0)}(n)c_0(n) & \text{a time unit } j \\ s_1^{(m_1)}(n)c_0(n) & \text{a time unit } j + (\lfloor m/S \rfloor + 1) \times S - m \\ s_2^{(m_2)}(n)c_0(n) & \text{a time unit } j + m \end{cases},$$

where $0 \leq n \leq N/2$; N is a length of the sequence corresponding to the synchronization signal; $d(2n)$ is the first subsequence; $S_0^{(m_0)}(n)$, $S_1^{(m_1)}(n)$, and $S_2^{(m_2)}(n)$ are three sequences including three cyclic shifts of a first M sequence; $c_0(n)$ is a first scrambling code sequence including a cyclic shift of a second M sequence; $S_0^{(m_0)}(n)c_0(n)$ is used to represent the first subsequence used when the synchronization signal is transmitted in the $j^{th}$ time unit in each time window; $S_1^{(m_1)}(n)c_0(n)$ is used to represent the first subsequence used when the synchronization signal is transmitted in the $(j+(\lfloor m/S \rfloor+1) \times S-m)^{th}$ time unit in each time window; and $s_2^{(m_2)}(n)c_0(n)$ is used to represent the first subsequence used when the synchronization signal is transmitted in the $(j+m)^{th}$ time unit in each time window; and an expression of the second subsequence is as follows:

$$d(2n+1) = \begin{cases} s_2^{(m_2)}(n)c_1(n)z_1^{(m_0)}(n) & \text{a time unit } j \\ s_1^{(m_1)}(n)c_1(n)z_1^{(m_1)}(n) & \text{a time unit } j + (\lfloor m/S \rfloor + 1) \times S - m \\ s_0^{(m_0)}(n)c_1(n)z_1^{(m_2)}(n) & \text{a time unit } j + m \end{cases},$$

where $d(2n+1)$ is the second subsequence; $c_1(n)$ is a second scrambling code sequence including a cyclic shift of the second M sequence; $z_1^{(m_0)}(n)$, $z_1^{(m_1)}(n)$, and $z_2^{(m_2)}(n)$ are three third scrambling code sequences including three cyclic shifts of a third M sequence; $S_2^{(m_2)}(n)c_1(n)z_1^{(m_0)}(n)$ is used to represent the second subsequence used when the synchronization signal is transmitted in the $j^{th}$ time unit in each time window; $s_1^{(m_1)}(n)c_1(n)z_1^{(m_1)}(n)$ is used to represent the second subsequence used when the synchronization signal is transmitted in the $(j+(\lfloor m/S \rfloor+1) \times S-m)^{th}$ time unit in each time window; and $s_0^{(m_0)}(n)c_1(n)z_1^{(m_2)}(n)$ is used to represent the second subsequence used when the synchronization signal is transmitted in the $(j+m)^{th}$ time unit in each time window.

With reference to the ninth aspect or the first possible implementation of the ninth aspect, in a second possible implementation, the transceiver is further configured to: before transmitting the synchronization signal in the determined time unit in each time window, send m to user equipment UE by using a broadcast channel.

With reference to any one of the ninth aspect or the possible implementations of the ninth aspect, in a third possible implementation, the processor is specifically configured to determine, according to preset synchronization signal information, the time unit that is in each time window and that is used to transmit the synchronization signal, where the preset synchronization signal information includes the time unit that is in each time window and that is used to transmit the synchronization signal; or the transceiver is further configured to: obtain updated synchronization signal information, and determine, according to the updated synchronization signal information, the time unit that is in each time window and that is used to transmit the synchronization signal, where the updated synchronization signal information includes the time unit that is in each time window and that is used to transmit the synchronization signal.

With reference to any one of the ninth aspect or the possible implementations of the ninth aspect, in a fourth possible implementation, the processor is further configured to determine time units that are in T consecutive time windows and that are used to transmit the broadcast channel, where T is an integer greater than 0, and the time units that are in the T time windows and that are used to transmit the broadcast channel are $j^{th}$ time units in all the T time windows; and the transceiver is further configured to transmit the broadcast channel in each of the determined time units that are in the T time windows and that are used to transmit the broadcast channel.

With reference to the fourth possible implementation of the ninth aspect, in a fifth possible implementation, the broadcast channel is located in r time units in each time window, and the r time units have fixed locations in each time window.

With reference to the fifth possible implementation of the ninth aspect, in a sixth possible implementation, r and m have equal values.

With reference to the fifth possible implementation of the ninth aspect or the sixth possible implementation of the ninth aspect, in a seventh possible implementation, the transceiver is further configured to: before transmitting the broadcast channel in each of the determined time units that are in the T time windows and that are used to transmit the broadcast channel, send r to the user equipment UE by using the broadcast channel.

With reference to the fourth possible implementation of the ninth aspect, or the fifth possible implementation of the ninth aspect, or the sixth possible implementation of the ninth aspect, or the seventh possible implementation of the ninth aspect, in an eighth possible implementation, the processor is specifically configured to determine, according to preset broadcast channel information, the time units that are in the T consecutive time windows and that are used to transmit the broadcast channel, where the preset broadcast channel information includes: a quantity T of the time windows, and a time unit that is in each time window and that is used to transmit the broadcast channel; or the transceiver is further configured to: obtain updated broadcast channel information, and determine, according to the updated broadcast channel information, the time units that are in the T consecutive time windows and that are used to transmit the broadcast channel, where the updated broadcast channel information includes: a quantity T of the time windows, and a time unit that is in each time window and that is used to transmit the broadcast channel.

With reference to any one of the ninth aspect or the possible implementations of the ninth aspect, in a ninth possible implementation, the processor is further configured to determine a time unit that is in each time window and that is used to transmit each set of downlink measurement reference signals, where the determined time unit that is in each time window and that is used to transmit each set of downlink measurement reference signals includes at least one of: the $j^{th}$ time unit in each time window, a $(j+(\lfloor q/S \rfloor+1) \cdot S-q)^{th}$ time unit in each time window, or a $(j+q)^{th}$ time unit in each time window, and q is a positive integer that is greater than or equal to 1 and that is less than or equal to S; and the transceiver is further configured to transmit each set of downlink measurement reference signals in the determined time unit that is in the time window and that is used to transmit the downlink measurement reference signal.

With reference to the ninth possible implementation of the ninth aspect, in a tenth possible implementation, the transceiver is specifically configured to perform, by using the following formula, cyclic shift on the determined time unit that is in the time window and that is used to transmit each set of downlink measurement reference signals, so that each set of downlink measurement reference signals is always transmitted in the $j^{th}$ time unit in each time window, and/or the $(j+q)^{th}$ time unit in each time window, and/or the $(j+(\lfloor q/S \rfloor+1) \cdot S-q)^{th}$ time unit in each time window:

$$t = \left\lfloor \frac{kq}{S} \right\rfloor \times S - \left\lfloor \left\lfloor \frac{kq}{S} \right\rfloor \times \frac{S}{q} \right\rfloor \times q,$$

where the cyclic shift is performing cyclic shift, by t time units, on time units corresponding to a $k^{th}$ time of transmission of q sets of the downlink measurement reference signals, q indicates a set quantity of downlink measurement reference signals in each time of transmission, k indicates the $k^{th}$ time of transmission, t indicates a quantity of time units by which cyclic shift is performed for each set of downlink measurement reference signals in each cyclic shift, and q, k, and t are all positive integers greater than 0.

With reference to the ninth possible implementation of the ninth aspect or the tenth possible implementation of the ninth aspect, in an eleventh possible implementation, the transceiver is further configured to: before transmitting each set of downlink measurement reference signals in the determined time unit that is in the time window and that is used to transmit the downlink measurement reference signal, send a value of q to the user equipment UE by using the broadcast channel.

With reference to the eleventh possible implementation of the ninth aspect, in a twelfth possible implementation, the processor is further configured to configure, for each UE by using higher layer signaling, a time unit corresponding to each set of downlink measurement reference signals to be measured by the UE.

With reference to the ninth possible implementation of the ninth aspect, or the tenth possible implementation of the ninth aspect, or the eleventh possible implementation of the ninth aspect, or the twelfth possible implementation of the ninth aspect, in a thirteenth possible implementation, the processor is specifically configured to determine, according to preset downlink measurement reference signal information, the time unit that is in each time window and that is used to transmit each set of downlink measurement reference signals, where the preset downlink measurement reference signal information includes the time unit that is in each time window and that is used to transmit each set of downlink measurement reference signals; or the transceiver is further configured to: obtain updated downlink measurement reference signal information, and determine, according to the updated downlink measurement reference signal information, the time unit that is in each time window and that is used to transmit each set of downlink measurement reference signals, where the updated downlink measurement reference signal information includes the time unit that is in each time window and that is used to transmit each set of downlink measurement reference signals.

A tenth aspect of the present invention provides a signal sending apparatus, including:

a processor, configured to determine a time unit that is in each time window and that is used to transmit each set of downlink measurement reference signals, where the determined time unit that is in each time window and that is used to transmit each set of downlink measurement reference signals includes at least one of: a $j^{th}$ time unit in each time window, a $(j+(\lfloor q/S \rfloor+1) \cdot S-q)^{th}$ time unit in each time window, or a $(j+q)^{th}$ time unit in each time window, S is a quantity of time units included in each time window, q is a positive integer that is greater than or equal to 1 and that is less than or equal to S, and j is a positive integer that is greater than or equal to 1 and that is less than or equal to S; and a transceiver, configured to transmit each set of downlink measurement reference signals in the determined time unit that is in the time window and that is used to transmit the downlink measurement reference signal.

With reference to the tenth aspect, in a first possible implementation, the transceiver is specifically configured to perform cyclic shift on the determined time unit that is in the time window and that is used to transmit each set of downlink measurement reference signals, so that each set of downlink measurement reference signals is always transmitted in the $j^{th}$ time unit in each time window, and/or the $(j+q)^{th}$ time unit in each time window, and/or the $(j+(\lfloor q/S \rfloor+1) \cdot S-q)^{th}$ time unit in each time window:

$$t = \left\lfloor \frac{kq}{S} \right\rfloor \times S - \left\lfloor \left\lfloor \frac{kq}{S} \right\rfloor \times \frac{S}{q} \right\rfloor \times q,$$

where the cyclic shift is performing cyclic shift, by t time units, on time units corresponding to a $k^{th}$ time of transmission of q sets of the downlink measurement reference signals, q indicates a set quantity of downlink measurement reference signals in each time of transmission, k indicates the $k^{th}$ time of transmission, t indicates a quantity of time units by which cyclic shift is performed for each set of downlink measurement reference signals in each cyclic shift, and q, k, and t are all positive integers greater than 0.

With reference to the tenth aspect or the first possible implementation of the tenth aspect, in a second possible implementation, the transceiver is further configured to: before transmitting each set of downlink measurement reference signals in the determined time unit that is in the time window and that is used to transmit the downlink measurement reference signal, send a value of q to user equipment UE by using a broadcast channel.

With reference to the second possible implementation of the tenth aspect, in a third possible implementation, the processor is further configured to configure, for each UE by using higher layer signaling, a time unit corresponding to each set of downlink measurement reference signals to be measured by the UE.

With reference to any one of the tenth aspect or the possible implementations of the tenth aspect, in a fourth possible implementation, the processor is specifically configured to determine, according to preset downlink measurement reference signal information, the time unit that is in each time window and that is used to transmit each set of downlink measurement reference signals, where the preset downlink measurement reference signal information includes the time unit that is in each time window and that is used to transmit each set of downlink measurement reference signals; or the transceiver is further configured to: obtain updated downlink measurement reference signal information, and determine, according to the updated downlink measurement reference signal information, the time unit that is in each time window and that is used to transmit each set of downlink measurement reference signals, where the updated downlink measurement reference signal information includes the time unit that is in each time window and that is used to transmit each set of downlink measurement reference signals.

An eleventh aspect of the present invention provides a signal sending apparatus, including:

a processor, configured to determine time units that are in T consecutive time windows and that are used to transmit a broadcast channel, where T is an integer greater than 0, T is an integer greater than 0, and the time units that are in the T time windows and that are used to transmit the broadcast channel are $j^{th}$ time units in all the T time windows, j is a positive integer that is greater than or equal to 1 and that is less than or equal to S, and S is a quantity of time units included in each time window; and a transceiver, configured to transmit the broadcast channel in each of the determined time units that are in the T time windows and that are used to transmit the broadcast channel.

With reference to the eleventh aspect, in a first possible implementation, the broadcast channel is located in r time units in each time window, the r time units have fixed locations in each time window, and r is a positive integer that is greater than or equal to 1 and that is less than or equal to S.

With reference to the first possible implementation of the eleventh aspect, in a second possible implementation, the transceiver is further configured to: before transmitting the broadcast channel in each of the determined time units that are in the T time windows and that are used to transmit the broadcast channel, send r to user equipment UE by using the broadcast channel.

With reference to the eleventh aspect or the first possible implementation of the eleventh aspect, in a third possible implementation, the processor is specifically configured to determine, according to preset broadcast channel information, the time units that are in the T consecutive time windows and that are used to transmit the broadcast channel, where the preset broadcast channel information includes: a quantity T of the time windows, and a time unit that is in each time window and that is used to transmit the broadcast channel; or the transceiver is further configured to: obtain updated broadcast channel information, and determine, according to the updated broadcast channel information, the time units that are in the T consecutive time windows and that are used to transmit the broadcast channel, where the updated broadcast channel information includes: a quantity T of the time windows, and a time unit that is in each time window and that is used to transmit the broadcast channel.

A twelfth aspect of the present invention provides a signal sending apparatus, including:

a processor, configured to determine P antenna ports, where the P antenna ports are antenna ports for transmitting a synchronization signal; and a transceiver, configured to map a broadcast channel to the P antenna ports for transmission.

With reference to the twelfth aspect, in a first possible implementation, the transceiver is specifically configured to: separately map, in an $i^{th}$ time unit in each time window, the broadcast channel to the P antenna ports for transmission; and separately map, in the $i^{th}$ time unit in each time window, the synchronization signal to the P antenna ports for transmission, where a transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

With reference to the first possible implementation of the twelfth aspect, in a second possible implementation, the transceiver is specifically configured to map, in at least two symbols in the $i^{th}$ time unit in each time window, the synchronization signal to the P antenna ports for transmission, where the symbol is a unit of time that is smaller than the time unit.

With reference to any one of the twelfth aspect or the possible implementations of the twelfth aspect, in a third possible implementation, the processor is specifically configured to determine the P antenna ports according to preset antenna port information, where the preset antenna port information includes a correspondence between the P antenna ports and the synchronization signal; or the transceiver is further configured to: obtain updated antenna port information, and determine the P antenna ports according to the updated antenna port information, where the updated antenna port information includes a correspondence between the P antenna ports and the synchronization signal.

A thirteenth aspect of the present invention provides a signal detection apparatus, including:

a processor, configured to determine a time unit that is in each time window and that is for detecting a synchronization signal, where the determined time unit includes at least one of: a $j^{th}$ time unit in each time window, a $(j+(\lfloor m/S \rfloor+1)\cdot S-m)^t$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S; and a transceiver, configured to detect the synchronization signal in the determined time unit in each time window.

With reference to the thirteenth aspect, in a first possible implementation, a sequence corresponding to the synchronization signal is formed by interleaving a first subsequence with a second subsequence; an expression of the first subsequence is as follows:

$$d(2n) = \begin{cases} s_0^{(m_0)}(n)c_0(n) & \text{a time unit } j \\ s_1^{(m_1)}(n)c_0(n) & \text{a time unit } j+(\lfloor m/S \rfloor+1)\times S-m, \\ s_2^{(m_2)}(n)c_0(n) & \text{a time unit } j+m \end{cases}$$

where $0 \leq n \leq N/2$; N is a length of the sequence corresponding to the synchronization signal; $d(2n)$ is the first subsequence; $s_0^{(m_0)}(n)$, $s_1^{(m_1)}(n)$, and $s_2^{(m_2)}(n)$ are three sequences including three cyclic shifts of a first M sequence; $c_0(n)$ is a first scrambling code sequence including a cyclic shift of a second M sequence; $s_0^{(m_0)}(n)c_0(n)$ is used to represent the first subsequence used when the synchronization signal is transmitted in the $j^{th}$ time unit in each time window; $s_1^{(m_1)}(n)c_0(n)$ is used to represent the first subsequence used when the synchronization signal is transmitted in the $(j+(\lfloor m/S \rfloor+1)\times S-m)^{th}$ time unit in each time window; and $s_2^{(m_2)}(n)c_0(n)$ is used to represent the first subsequence used when the synchronization signal is transmitted in the $(j+m)^{th}$ time unit in each time window; and an expression of the second subsequence is as follows:

$$d(2n+1) = \begin{cases} s_2^{(m_2)}(n)c_1(n)z_1^{(m_0)}(n) & \text{a time unit } j \\ s_1^{(m_1)}(n)c_1(n)z_1^{(m_1)}(n) & \text{a time unit } j+(\lfloor m/S \rfloor+1)\times S-m, \\ s_0^{(m_0)}(n)c_1(n)z_1^{(m_2)}(n) & \text{a time unit } j+m \end{cases}$$

where $d(2n+1)$ is the second subsequence; $c_1(n)$ is a second scrambling code sequence including a cyclic shift of the second M sequence; $z_1^{(m_0)}(n)$, $z_1^{(m_1)}(n)$, and $z_1^{(m_2)}(n)$ are three third scrambling code sequences including three cyclic shifts of a third M sequence; $s_2^{(m_2)}(n)c_1(n)z_1^{(m_0)}(n)$ is used to represent the second subsequence used when the synchronization signal is transmitted in the $j^{th}$ time unit in each time window; $s_1^{(m_1)}(n)c_1(n)z_1^{(m_1)}(n)$ is used to represent the second subsequence used when the synchronization signal is transmitted in the $(j+(\lfloor m/S \rfloor+1)\times S-m)^{th}$ time unit in each time window; and $s_0^{(m_0)}(n)c_1(n)z_1^{(m_2)}(n)$ is used to represent the second subsequence used when the synchronization signal is transmitted in the $(j+m)^{th}$ time unit in each time window.

With reference to the thirteenth aspect or the first possible implementation of the thirteenth aspect, in a second possible implementation, the transceiver is further configured to: before the time unit that is in each time window and that is for detecting the synchronization signal is determined, obtain a value of m that is broadcasted by a transmit end.

With reference to any one of the thirteenth aspect or the possible implementations of the thirteenth aspect, in a third possible implementation, the processor is specifically configured to:

determine, according to preset synchronization signal information, the time unit that is in each time window and that is for detecting the synchronization signal, where the preset synchronization signal information includes the time unit that is in each time window and that is for detecting the synchronization signal; or obtain updated synchronization signal information, and determine, according to the updated synchronization signal information, the time unit that is in each time window and that is for detecting the synchronization signal, where the updated synchronization signal information includes the time unit that is in each time window and that is for detecting the synchronization signal.

With reference to any one of the thirteenth aspect or the possible implementations of the thirteenth aspect, in a fourth possible implementation, the processor is further configured to determine time units that are in T consecutive time windows and that are for detecting the broadcast channel, where T is an integer greater than 0, and the time units that are in the T time windows and that are for detecting the broadcast channel are $j^{th}$ time units in all the time windows; and the transceiver is further configured to detect the broadcast channel in the determined time units that are in the T time windows and that are for detecting the broadcast channel.

With reference to the fourth possible implementation of the thirteenth aspect, in a fifth possible implementation, the broadcast channel is located in r time units in each time window, the r time units have fixed locations in each time window, and r is a positive integer that is greater than or equal to 1 and that is less than or equal to S.

With reference to the fifth possible implementation of the thirteenth aspect, in a sixth possible implementation, r and m have equal values.

With reference to the fifth possible implementation of the thirteenth aspect or the sixth possible implementation of the thirteenth aspect, in a seventh possible implementation, the processor is further configured to: before the broadcast channel is detected in the determined time units that are in the T time windows and that are for detecting the broadcast channel, obtain a value of r that is broadcasted by the transmit end.

With reference to the fourth possible implementation of the thirteenth aspect, or the fifth possible implementation of the thirteenth aspect, or the sixth possible implementation of the thirteenth aspect, or the seventh possible implementation of the thirteenth aspect, in an eighth possible implementation, the processor is specifically configured to:

determine, according to preset broadcast channel information, the time units that are in the T consecutive time windows and that are for detecting the broadcast channel, where the preset broadcast channel information includes: a quantity T of the time windows, and a time unit that is in each time window and that is for detecting the broadcast channel; or obtain updated broadcast channel information, and determine, according to the updated broadcast channel information, the time units that are in the T consecutive time windows and that are for detecting the broadcast channel, where the updated broadcast channel information includes: a quantity T of the time windows, and a time unit that is in each time window and that is for detecting the broadcast channel.

With reference to any one of the thirteenth aspect or the possible implementations of the thirteenth aspect, in a ninth possible implementation, the processor is further configured to determine a time unit that is in each time window and that is for measuring each set of downlink measurement reference signals, where the determined time unit that is in each time window and that is for measuring each set of downlink measurement reference signals includes at least one of: the $j^{th}$ time unit in each time window, a $(j+(\lfloor q/S \rfloor+1) \cdot S-q)^{th}$ time unit in each time window, or a $(j+q)^{th}$ time unit in each time window, and q is a positive integer that is greater than or equal to 1 and that is less than or equal to S; and the transceiver is further configured to perform channel quality measurement on each set of downlink measurement reference signals in the determined time unit that is in the time window and that is for measuring each set of downlink measurement reference signals.

With reference to the ninth possible implementation of the thirteenth aspect, in a tenth possible implementation, the processor is further configured to: before channel quality measurement is performed on each set of downlink measurement reference signals in the determined time unit that is in the time window and that is for measuring each set of downlink measurement reference signals, obtain a value of q that is broadcasted by the transmit end.

With reference to the tenth possible implementation of the thirteenth aspect, in an eleventh possible implementation, the transceiver is specifically configured to perform channel quality measurement on the downlink measurement reference signal in a time unit that is configured by the transmit end by using higher layer signaling and that is corresponding to each set of downlink measurement reference signals.

With reference to the ninth possible implementation of the thirteenth aspect, or the tenth possible implementation of the thirteenth aspect, or the eleventh possible implementation of the thirteenth aspect, or the twelfth possible implementation of the thirteenth aspect, in a thirteenth possible implementation, the processor is specifically configured to:

determine, according to preset downlink measurement reference signal information, the time unit that is in each time window and that is for measuring each set of downlink measurement reference signals, where the preset downlink measurement reference signal information includes the time unit that is in each time window and that is for measuring each set of downlink measurement reference signals; or obtain updated downlink measurement reference signal information, and determine, according to the updated downlink measurement reference signal information, the time unit that is in each time window and that is for measuring each set of downlink measurement reference signals, where the updated downlink measurement reference signal information includes the time unit that is in each time window and that is for measuring each set of downlink measurement reference signals.

A fourteenth aspect of the present invention provides a signal detection apparatus, including:

a processor, configured to determine a time unit that is in each time window and that is for measuring each set of downlink measurement reference signals, where the determined time unit that is in each time window and that is for measuring each set of downlink measurement reference signals includes at least one of: a $j^{th}$ time unit in each time window, a $(j+(\lfloor q/S \rfloor+1) \cdot S-q)^{th}$ time unit in each time window, or a $(j+q)^{th}$ time unit in each time window, q is a positive integer that is greater than or equal to 1 and that is less than or equal to S, S is a quantity of time units included in each time window, q is a positive integer that is greater than or equal to 1 and that is less than or equal to S, and j is a positive integer that is greater than or equal to 1 and that is less than or equal to S; and the transceiver, configured to perform channel quality measurement on each set of downlink measurement reference signals in the determined time unit that is in the time window and that is for measuring each set of downlink measurement reference signals.

With reference to the fourteenth aspect, in a first possible implementation, the processor is further configured to: before channel quality measurement is performed on each set of downlink measurement reference signals in the determined time unit that is in the time window and that is for measuring each set of downlink measurement reference signals, obtain a value of q that is broadcasted by the transmit end.

With reference to the first possible implementation of the fourteenth aspect, in a second possible implementation, the transceiver is specifically configured to perform channel quality measurement on the downlink measurement reference signal in a time unit that is configured by the transmit end by using higher layer signaling and that is corresponding to each set of downlink measurement reference signals.

With reference to any one of the fourteenth aspect or the possible implementations of the sixth aspect, in a third possible implementation, the processor is specifically configured to:

determine, according to preset downlink measurement reference signal information, the time unit that is in each time window and that is for measuring each set of downlink measurement reference signals, where the preset downlink measurement reference signal information includes the time unit that is in each time window and that is for measuring each set of downlink measurement reference signals; or obtain updated downlink measurement reference signal information, and determine, according to the updated downlink measurement reference signal information, the time unit that is in each time window and that is for measuring each set of downlink measurement reference signals, where the updated downlink measurement reference signal information includes the time unit that is in each time window and that is for measuring each set of downlink measurement reference signals.

A fifteenth aspect of the present invention provides a signal detection apparatus, including:

a processor, configured to determine time units that are in T consecutive time windows and that are for detecting a broadcast channel, where T is an integer greater than 0, and the time units that are in the T time windows and that are for detecting the broadcast channel are $j^{th}$ time units in all the time windows, j is a positive integer that is greater than or equal to 1 and that is less than or equal to S, and S is a quantity of time units included in each time window; and a transceiver, configured to detect the broadcast channel in the determined time units that are in the T time windows and that are for detecting the broadcast channel.

With reference to the fifteenth aspect, in a first possible implementation, the broadcast channel is located in r time units in each time window, the r time units have fixed locations in each time window, and r is a positive integer that is greater than or equal to 1 and that is less than or equal to S.

With reference to the first possible implementation of the fifteenth aspect, in a second possible implementation, the processor is configured to: before the broadcast channel is detected in the determined time units that are in the T time windows and that are for detecting the broadcast channel, obtain a value of r that is broadcasted by the transmit end.

With reference to any one of the fifteenth aspect or the possible implementations of the fifteenth aspect, in a third possible implementation, the processor is specifically configured to:

determine, according to preset broadcast channel information, the time units that are in the T consecutive time windows and that are for detecting the broadcast channel, where the preset broadcast channel information includes: a quantity T of the time windows, and a time unit that is in each time window and that is for detecting the broadcast channel; or obtain updated broadcast channel information, and determine, according to the updated broadcast channel information, the time units that are in the T consecutive time windows and that are for detecting the broadcast channel, where the updated broadcast channel information includes: a quantity T of the time windows, and a time unit that is in each time window and that is for detecting the broadcast channel.

A sixteenth aspect of the present invention provides a signal detection apparatus, including:

a processor, configured to determine P antenna ports, where the P antenna ports are antenna ports for transmitting a synchronization signal by a transmit end; and a transceiver, configured to detect a broadcast channel on the P antenna ports.

With reference to the sixteenth aspect, in a first possible implementation, the processor is specifically configured to:

detect, in an $i^{th}$ time unit in each time window, the broadcast channel corresponding to the P antenna ports; and detect, in the $i^{th}$ time unit in each time window, the synchronization signal corresponding to the P antenna ports, where a transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

With reference to the first possible implementation of the sixteenth aspect, in a second possible implementation, the transceiver is specifically configured to detect, in at least two symbols in the $i^{th}$ time unit in each time window, the synchronization signal corresponding to the P antenna ports, where the symbol is a unit of time that is smaller than the time unit.

With reference to any one of the sixteenth aspect or the possible implementations of the sixteenth aspect, in a third possible implementation, the processor is specifically configured to:

determine the P antenna ports according to preset antenna port information, where the preset antenna port information includes a correspondence between the P antenna ports and the synchronization signal; or obtain updated antenna port information, and determine the P antenna ports according to the updated antenna port information, where the updated antenna port information includes a correspondence between the P antenna ports and the synchronization signal.

A seventeenth aspect of the present invention provides a signal sending and detection system, including at least one signal sending apparatus according to any one of the first aspect or the possible implementations of the first aspect, and at least one signal detection apparatus according to any one of the fifth aspect or the possible implementations of the fifth aspect; or at least one signal sending apparatus according to any one of the second aspect or the possible implementations of the second aspect, and at least one signal detection apparatus according to any one of the sixth aspect or the possible implementations of the sixth aspect; or at least one signal sending apparatus according to any one of the third aspect or the possible implementations of the third aspect, and at least one signal detection apparatus according to any one of the seventh aspect or the possible implementations of the seventh aspect; or at least one signal sending apparatus according to any one of the fourth aspect or the possible implementations of the fourth aspect, and at least one signal detection apparatus according to any one of the eighth aspect or the possible implementations of the eighth aspect.

An eighteenth aspect of the present invention provides a signal sending method, including:

determining a time unit that is in each time window and that is used to transmit a synchronization signal, where the determined time unit includes at least one of: a $j^{th}$ time unit in each time window, a $(j+(\lfloor m/S \rfloor+1) \cdot S - m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S; and transmitting the synchronization signal in the determined time unit in each time window.

With reference to the eighteenth aspect, in a first possible implementation, a sequence corresponding to the synchronization signal is formed by interleaving a first subsequence with a second subsequence; an expression of the first subsequence is as follows:

$$d(2n) = \begin{cases} s_0^{(m_0)}(n)c_0(n) & \text{a time unit } j \\ s_1^{(m_1)}(n)c_0(n) & \text{a time unit } j + (\lfloor m/S \rfloor + 1) \times S - m, \\ s_2^{(m_2)}(n)c_0(n) & \text{a time unit } j + m \end{cases}$$

where $0 \leq n \leq N/2$; N is a length of the sequence corresponding to the synchronization signal; d(2n) is the first subsequence; $s_0^{(m_0)}(n)$, $s_1^{(m_1)}(n)$, and $s_2^{(m_2)}(n)$ are three sequences including three cyclic shifts of a first M sequence; $c_0(n)$ is a first scrambling code sequence including a cyclic shift of a second M sequence; $s_0^{(m_0)}(n)c_0(n)$ is used to represent the first subsequence used when the synchronization signal is transmitted in the $j^{th}$ time unit in each time window; $s_1^{(m_1)}(n)c_0(n)$ is used to represent the first subsequence used when the synchronization signal is transmitted in the $(j+(\lfloor m/S \rfloor+1) \times S-m)^{th}$ time unit in each time window; and $s_2^{(m_2)}(n)c_0(n)$ is used to represent the first subsequence used when the synchronization signal is transmitted in the $(j+m)^{th}$ time unit in each time window; and an expression of the second subsequence is as follows:

$$d(2n+1) = \begin{cases} s_2^{(m_2)}(n)c_1(n)z_1^{(m_0)}(n) & \text{a time unit } j \\ s_1^{(m_1)}(n)c_1(n)z_1^{(m_1)}(n) & \text{a time unit } j + (\lfloor m/S \rfloor + 1) \times S - m, \\ s_0^{(m_0)}(n)c_1(n)z_1^{(m_2)}(n) & \text{a time unit } j + m \end{cases}$$

where $d(2n+1)$ is the second subsequence; $c_1(n)$ is a second scrambling code sequence including a cyclic shift of the second M sequence;) $z_1^{(m_0)}(n)$, $z_1^{(m_1)}(n)$, and $z_2^{(m_2)}(n)$ are three third scrambling code sequences including three cyclic shifts of a third M sequence; $s_2^{(m_2)}(n)c_1(n)z_1^{(m_0)}(n)$ is used to represent the second subsequence used when the synchronization signal is transmitted in the $j^{th}$ time unit in each time window; $s_1^{(m_1)}(n)c_1(n)z_1^{(m_1)}(n)$ is used to represent the second subsequence used when the synchronization signal is transmitted in the $(j+(\lfloor m/S \rfloor+1)\times S-m)^{th}$ time unit in each time window; and $s_0^{(m_0)}(n)c_1(n)z_1^{(m_2)}(n)$ is used to represent the second subsequence used when the synchronization signal is transmitted in the $(j+m)^{th}$ time unit in each time window.

With reference to the eighteenth aspect or the first possible implementation of the eighteenth aspect, in a second possible implementation, before the transmitting the synchronization signal in the determined time unit in each time window, the method further includes:

sending m to user equipment UE by using a broadcast channel.

With reference to any one of the eighteenth aspect or the possible implementations of the eighteenth aspect, in a third possible implementation, the determining a time unit that is in each time window and that is used to transmit a synchronization signal includes:

determining, according to preset synchronization signal information, the time unit that is in each time window and that is used to transmit the synchronization signal, where the preset synchronization signal information includes the time unit that is in each time window and that is used to transmit the synchronization signal; or obtaining updated synchronization signal information, and determining, according to the updated synchronization signal information, the time unit that is in each time window and that is used to transmit the synchronization signal, where the updated synchronization signal information includes the time unit that is in the time window and that is used to transmit the synchronization signal.

With reference to any one of the eighteenth aspect or the possible implementations of the eighteenth aspect, in a fourth possible implementation, the method further includes:

determining time units that are in T consecutive time windows and that are used to transmit the broadcast channel, where T is an integer greater than 0, and the time units that are in the T time windows and that are used to transmit the broadcast channel are $j^{th}$ time units in all the T time windows; and transmitting the broadcast channel in each of the determined time units that are in the T time windows and that are used to transmit the broadcast channel.

With reference to the fourth possible implementation of the eighteenth aspect, in a fifth possible implementation, the broadcast channel is located in r time units in each time window, and the r time units have fixed locations in each time window.

With reference to the fifth possible implementation of the eighteenth aspect, in a sixth possible implementation, r and m have equal values.

With reference to the fifth possible implementation of the eighteenth aspect or the sixth possible implementation of the eighteenth aspect, in a seventh possible implementation, before the transmitting the broadcast channel in each of the determined time units that are in the T time windows and that are used to transmit the broadcast channel, the method further includes:

sending r to the user equipment UE by using the broadcast channel.

With reference to the fourth possible implementation of the eighteenth aspect, or the fifth possible implementation of the eighteenth aspect, or the sixth possible implementation of the eighteenth aspect, or the seventh possible implementation of the eighteenth aspect, in an eighth possible implementation, the determining time units that are in T consecutive time windows and that are used to transmit the broadcast channel includes:

determining, according to preset broadcast channel information, the time units that are in the T consecutive time windows and that are used to transmit the broadcast channel, where the preset broadcast channel information includes: a quantity T of the time windows, and a time unit that is in each time window and that is used to transmit the broadcast channel; or obtaining updated broadcast channel information, and determining, according to the updated broadcast channel information, the time units that are in the T consecutive time windows and that are used to transmit the broadcast channel, where the updated broadcast channel information includes: a quantity T of the time windows, and a time unit that is in each time window and that is used to transmit the broadcast channel.

With reference to any one of the eighteenth aspect or the possible implementations of the eighteenth aspect, in a ninth possible implementation, the method further includes:

determining a time unit that is in each time window and that is used to transmit each set of downlink measurement reference signals, where the determined time unit that is in each time window and that is used to transmit each set of downlink measurement reference signals includes at least one of: the $j^{th}$ time unit in each time window, a $(j+(\lfloor q/S \rfloor+1)\cdot S-q)^{th}$ time unit in each time window, or a $(j+q)^{th}$ time unit in each time window, and q is a positive integer that is greater than or equal to 1 and that is less than or equal to S; and transmitting each set of downlink measurement reference signals in the determined time unit that is in the time window and that is used to transmit the downlink measurement reference signal.

With reference to the ninth possible implementation of the eighteenth aspect, in a tenth possible implementation, the transmitting the downlink measurement reference signal in the determined time unit that is in the time window and that is used to transmit the downlink measurement reference signal includes:

performing, by using the following formula, cyclic shift on the determined time unit that is in the time window and that is used to transmit each set of downlink measurement reference signals, so that each set of downlink measurement reference signals is always transmitted in the $j^{th}$ time unit in each time window, and/or the $(j+q)^{th}$ time unit in each time window, and/or the $(j+(\lfloor q/S \rfloor+1)\cdot S-q)^{th}$ time unit in each time window:

$$t = \left\lfloor \frac{kq}{S} \right\rfloor \times S - \left\lfloor \left\lfloor \frac{kq}{S} \right\rfloor \times \frac{S}{q} \right\rfloor \times q,$$

where the cyclic shift is performing cyclic shift, by t time units, on time units corresponding to a $k^{th}$ time of transmission of q sets of the downlink measurement reference signals, q indicates a set quantity of downlink measurement reference signals in each time of transmission, k indicates the $k^{th}$ time of transmission, t indicates a quantity of time units by which cyclic shift is performed for each set of downlink measurement reference signals in each cyclic shift, and q, k, and t are all positive integers greater than 0.

With reference to the ninth possible implementation of the eighteenth aspect or the tenth possible implementation of the eighteenth aspect, in an eleventh possible implementation, before the transmitting each set of downlink measurement reference signals in the determined time unit that is in the time window and that is used to transmit the downlink measurement reference signal, the method further includes:

sending a value of q to the user equipment UE by using the broadcast channel.

With reference to the eleventh possible implementation of the eighteenth aspect, in a twelfth possible implementation, the method further includes:

configuring, for each UE by using higher layer signaling, a time unit corresponding to each set of downlink measurement reference signals to be measured by the UE.

With reference to the ninth possible implementation of the eighteenth aspect, or the tenth possible implementation of the eighteenth aspect, or the eleventh possible implementation of the eighteenth aspect, or the twelfth possible implementation of the eighteenth aspect, in a thirteenth possible implementation, the determining a time unit that is in each time window and that is used to transmit each set of downlink measurement reference signals includes:

determining, according to preset downlink measurement reference signal information, the time unit that is in each time window and that is used to transmit each set of downlink measurement reference signals, where the preset downlink measurement reference signal information includes the time unit that is in each time window and that is used to transmit each set of downlink measurement reference signals; or obtaining updated downlink measurement reference signal information, and determining, according to the updated downlink measurement reference signal information, the time unit that is in each time window and that is used to transmit each set of downlink measurement reference signals, where the updated downlink measurement reference signal information includes the time unit that is in each time window and that is used to transmit each set of downlink measurement reference signals.

A nineteenth aspect of the present invention provides a signal sending method, including:

determining a time unit that is in each time window and that is used to transmit each set of downlink measurement reference signals, where the determined time unit that is in each time window and that is used to transmit each set of downlink measurement reference signals includes at least one of: a $j^{th}$ time unit in each time window, a $(j+(\lfloor q/S \rfloor+1) \cdot S-q)^{th}$ time unit in each time window, or a $(j+q)^{th}$ time unit in each time window, S is a quantity of time units included in each time window, q is a positive integer that is greater than or equal to 1 and that is less than or equal to S, and j is a positive integer that is greater than or equal to 1 and that is less than or equal to S; and transmitting each set of downlink measurement reference signals in the determined time unit that is in the time window and that is used to transmit the downlink measurement reference signal.

With reference to the nineteenth aspect, in a first possible implementation, the transmitting the downlink measurement reference signal in the determined time unit that is in the time window and that is used to transmit the downlink measurement reference signal includes:

performing cyclic shift on the determined time unit that is in the time window and that is used to transmit each set of downlink measurement reference signals, so that each set of downlink measurement reference signals is always transmitted in the $j^{th}$ time unit in each time window, and/or the $(j+q)^{th}$ time unit in each time window, and/or the $(j+(\lfloor q/S \rfloor+1) \cdot S-q)^{th}$ time unit in each time window:

$$t = \left\lfloor \frac{kq}{S} \right\rfloor \times S - \left\lfloor \left\lfloor \frac{kq}{S} \right\rfloor \times \frac{S}{q} \right\rfloor \times q,$$

where the cyclic shift is performing cyclic shift, by t time units, on time units corresponding to a $k^{th}$ time of transmission of q sets of the downlink measurement reference signals, q indicates a set quantity of downlink measurement reference signals in each time of transmission, k indicates the $k^{th}$ time of transmission, t indicates a quantity of time units by which cyclic shift is performed for each set of downlink measurement reference signals in each cyclic shift, and q, k, and t are all positive integers greater than 0.

With reference to the nineteenth aspect or the first possible implementation of the nineteenth aspect, in a second possible implementation, before the transmitting each set of downlink measurement reference signals in the determined time unit that is in the time window and that is used to transmit the downlink measurement reference signal, the method further includes:

sending a value of q to user equipment UE by using a broadcast channel.

With reference to the second possible implementation of the nineteenth aspect, in a third possible implementation, the method further includes:

configuring, for each UE by using higher layer signaling, a time unit corresponding to each set of downlink measurement reference signals to be measured by the UE.

With reference to any one of the nineteenth aspect or the possible implementations of the nineteenth aspect, in a fourth possible implementation, the determining a time unit that is in each time window and that is used to transmit each set of downlink measurement reference signals includes:

determining, according to preset downlink measurement reference signal information, the time unit that is in each time window and that is used to transmit each set of downlink measurement reference signals, where the preset downlink measurement reference signal information includes the time unit that is in each time window and that is used to transmit each set of downlink measurement reference signals; or obtaining updated downlink measurement reference signal information, and determining, according to the updated downlink measurement reference signal information, the time unit that is in each time window and that is used to transmit each set of downlink measurement reference signals, where the updated downlink measurement reference signal information includes the time unit that is in each time window and that is used to transmit each set of downlink measurement reference signals.

A twentieth aspect of the present invention provides a signal sending method, including:

determining time units that are in T consecutive time windows and that are used to transmit a broadcast channel, where T is an integer greater than 0, and the time units that are in the T time windows and that are used to transmit the broadcast channel are $j^{th}$ time units in all the T time windows, j is a positive integer that is greater than or equal to 1 and that is less than or equal to S, and S is a quantity of time units included in each time window; and transmitting the broadcast channel in each of the determined time units that are in the T time windows and that are used to transmit the broadcast channel.

With reference to the twentieth aspect, in a first possible implementation, the broadcast channel is located in r time units in each time window, the r time units have fixed locations in each time window, and r is a positive integer that is greater than or equal to 1 and that is less than or equal to S.

With reference to the first possible implementation of the twentieth aspect, in a second possible implementation, before the transmitting the broadcast channel in each of the determined time units that are in the T time windows and that are used to transmit the broadcast channel, the method further includes:

sending r to user equipment UE by using the broadcast channel.

With reference to any one of the twentieth aspect or the first possible implementation of the twentieth aspect, in a third possible implementation, the determining time units that are in T consecutive time windows and that are used to transmit a broadcast channel includes:

determining, according to preset broadcast channel information, the time units that are in the T consecutive time windows and that are used to transmit the broadcast channel, where the preset broadcast channel information includes: a quantity T of the time windows, and a time unit that is in each time window and that is used to transmit the broadcast channel; or obtaining updated broadcast channel information, and determining, according to the updated broadcast channel information, the time units that are in the T consecutive time windows and that are used to transmit the broadcast channel, where the updated broadcast channel information includes: a quantity T of the time windows, and a time unit that is in each time window and that is used to transmit the broadcast channel.

A twenty-first aspect of the present invention provides a signal sending method, including:

determining P antenna ports, where the P antenna ports are antenna ports for transmitting a synchronization signal; and mapping a broadcast channel to the P antenna ports for transmission.

With reference to the twenty-first aspect, in a first possible implementation, the mapping a broadcast channel to the P antenna ports for transmission includes:

separately mapping, in an $i^{th}$ time unit in each time window, the broadcast channel to the P antenna ports for transmission; and the mapping a broadcast channel to the P antenna ports for transmission further includes: separately mapping, in the $i^{th}$ time unit in each time window, the synchronization signal to the P antenna ports for transmission, where a transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

With reference to the first possible implementation of the twenty-first aspect, in a second possible implementation, the separately mapping, in the $i^{th}$ time unit in each time window, the synchronization signal to the P antenna ports for transmission includes:

mapping, in at least two symbols in the $i^{th}$ time unit in each time window, the synchronization signal to the P antenna ports for transmission, where the symbol is a unit of time that is smaller than the time unit.

With reference to any one of the twenty-first aspect or the possible implementations of the twenty-first aspect, in a third possible implementation, the determining P antenna ports includes:

determining the P antenna ports according to preset antenna port information, where the preset antenna port information includes a correspondence between the P antenna ports and the synchronization signal; or obtaining updated antenna port information, and determining the P antenna ports according to the updated antenna port information, where the updated antenna port information includes a correspondence between the P antenna ports and the synchronization signal.

A twenty-second aspect of the present invention provides a signal detection method, including:

determining a time unit that is in each time window and that is for detecting a synchronization signal, where the determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S; and detecting the synchronization signal in the determined time unit in each time window.

With reference to the twenty-second aspect, in a first possible implementation, a sequence corresponding to the synchronization signal is formed by interleaving a first subsequence with a second subsequence; an expression of the first subsequence is as follows:

$$d(2n) = \begin{cases} s_0^{(m_0)}(n)c_0(n) & \text{a time unit } j \\ s_1^{(m_1)}(n)c_0(n) & \text{a time unit } j+(\lfloor m/S \rfloor + 1) \times S - m, \\ s_2^{(m_2)}(n)c_0(n) & \text{a time unit } j+m \end{cases}$$

where $0 \leq n \leq N/2$; N is a length of the sequence corresponding to the synchronization signal; d(2n) is the first subsequence; $s_0^{(m_0)}(n)$, $s_1^{(m_1)}(n)$, and $s_2^{(m_2)}(n)$ are three sequences including three cyclic shifts of a first M sequence; $c_0(n)$ is a first scrambling code sequence including a cyclic shift of a second M sequence; $s_0^{(m_0)}(n)c_0(n)$ is used to represent the first subsequence used when the synchronization signal is transmitted in the $j^{th}$ time unit in each time window; $s_1^{(m_1)}$ (n)c₀(n) is used to represent the first subsequence used when the synchronization signal is transmitted in the $(j+(\lfloor m/S \rfloor+1) \times S-m)^{th}$ time unit in each time window; and $s_2^{(m_2)}(n)c_0(n)$ is used to represent the first subsequence used when the synchronization signal is transmitted in the $(j+m)^{th}$ time unit in each time window; and an expression of the second subsequence is as follows:

$$d(2n+1) = \begin{cases} s_2^{(m_2)}(n)c_1(n)z_1^{(m_0)}(n) & \text{a time unit } j \\ s_1^{(m_1)}(n)c_1(n)z_1^{(m_1)}(n) & \text{a time unit } j + (\lfloor m/S \rfloor + 1) \times S - m, \\ s_0^{(m_0)}(n)c_1(n)z_1^{(m_2)}(n) & \text{a time unit } j + m \end{cases}$$

where $d(2n+1)$ is the second subsequence; $c_1(n)$ is a second scrambling code sequence including a cyclic shift of the second M sequence; $z_1^{(m_0)}(n)$, $z_1^{(m_1)}(n)$, and $z_2^{(m_2)}(n)$ are three third scrambling code sequences including three cyclic shifts of a third M sequence; $s_2^{(m_2)}(n)c_1(n)z_1^{m_0}(n)$ is used to represent the second subsequence used when the synchronization signal is transmitted in the $j^{th}$ time unit in each time window; $s_1^{(m_1)}(n)c_1(n)z_1^{(m_1)}(n)$ is used to represent the second subsequence used when the synchronization signal is transmitted in the $(j+(\lfloor m/S \rfloor+1) \times S-m)^{th}$ time unit in each time window; and $s_0^{(m_0)}(n)c_1(n) z_1^{(m_2)}(n)$ is used to represent the second subsequence used when the synchronization signal is transmitted in the $(j+m)^{th}$ time unit in each time window.

With reference to any one of the twenty-second aspect or the first possible implementation of the twenty-second aspect, in a second possible implementation, before the determining a time unit that is in each time window and that is for detecting a synchronization signal, the method further includes:

obtaining a value of m that is broadcasted by a transmit end.

With reference to any one of the twenty-second aspect or the possible implementations of the twenty-second aspect, in a third possible implementation, the determining a time unit that is in each time window and that is for detecting a synchronization signal includes:

determining, according to preset synchronization signal information, the time unit that is in each time window and that is for detecting the synchronization signal, where the preset synchronization signal information includes the time unit that is in each time window and that is for detecting the synchronization signal; or obtaining updated synchronization signal information, and determining, according to the updated synchronization signal information, the time unit that is in each time window and that is for detecting the synchronization signal, where the updated synchronization signal information includes the time unit that is in each time window and that is for detecting the synchronization signal.

With reference to any one of the twenty-second aspect or the possible implementations of the twenty-second aspect, in a fourth possible implementation, the method further includes:

determining time units that are in T consecutive time windows and that are for detecting the broadcast channel, where T is an integer greater than 0, and the time units that are in the T time windows and that are for detecting the broadcast channel are $j^{th}$ time units in all the time windows; and detecting the broadcast channel in the determined time units that are in the T time windows and that are for detecting the broadcast channel.

With reference to the fourth possible implementation of the twenty-second aspect, in a fifth possible implementation, the broadcast channel is located in r time units in each time window, the r time units have fixed locations in each time window, and r is a positive integer that is greater than or equal to 1 and that is less than or equal to S.

With reference to the fifth possible implementation of the twenty-second aspect, in a sixth possible implementation, r and m have equal values.

With reference to the fifth possible implementation of the twenty-second aspect or the sixth possible implementation of the twenty-second aspect, in a seventh possible implementation, before the detecting the broadcast channel in the determined time units that are in the T time windows and that are for detecting the broadcast channel, the method further includes:

obtaining a value of r that is broadcasted by the transmit end.

With reference to the fourth possible implementation of the twenty-second aspect, or the fifth possible implementation of the twenty-second aspect, or the sixth possible implementation of the twenty-second aspect, or the seventh possible implementation of the twenty-second aspect, in an eighth possible implementation, the determining time units that are in T consecutive time windows and that are for detecting the broadcast channel includes:

determining, according to preset broadcast channel information, the time units that are in the T consecutive time windows and that are for detecting the broadcast channel, where the preset broadcast channel information includes: a quantity T of the time windows, and a time unit that is in each time window and that is for detecting the broadcast channel; or obtaining updated broadcast channel information, and determining, according to the updated broadcast channel information, the time units that are in the T consecutive time windows and that are for detecting the broadcast channel, where the updated broadcast channel information includes: a quantity T of the time windows, and a time unit that is in each time window and that is for detecting the broadcast channel.

With reference to any one of the twenty-second aspect or the possible implementations of the twenty-second aspect, in a ninth possible implementation, the method further includes:

determining a time unit that is in each time window and that is for measuring each set of downlink measurement reference signals, where the determined time unit that is in each time window and that is for measuring each set of downlink measurement reference signals includes at least one of: the $j^{th}$ time unit in each time window, a $(j+(\lfloor q/S \rfloor+1) \cdot S-q)^{th}$ time unit in each time window, or a $(j+q)^{th}$ time unit in each time window, and q is a positive integer that is greater than or equal to 1 and that is less than or equal to S; and performing channel quality measurement on each set of downlink measurement reference signals in the determined time unit that is in the time window and that is for measuring each set of downlink measurement reference signals.

With reference to the ninth possible implementation of the twenty-second aspect, in a tenth possible implementation, before the performing channel quality measurement on each set of downlink measurement reference signals in the determined time unit that is in the time window and that is for measuring each set of downlink measurement reference signals, the method further includes:

obtaining a value of q that is broadcasted by the transmit end.

With reference to the tenth possible implementation of the twenty-second aspect, in an eleventh possible implementation, the method further includes:

performing channel quality measurement on the downlink measurement reference signal in a time unit that is configured by the transmit end by using higher layer signaling and that is corresponding to each set of downlink measurement reference signals.

With reference to the ninth possible implementation of the twenty-second aspect, or the tenth possible implementation of the twenty-second aspect, or the eleventh possible implementation of the twenty-second aspect, or the twelfth possible implementation of the twenty-second aspect, in a thirteenth possible implementation, the determining a time unit that is in each time window and that is for measuring each set of downlink measurement reference signals includes:

determining, according to preset downlink measurement reference signal information, the time unit that is in each time window and that is for measuring each set of downlink measurement reference signals, where the preset downlink measurement reference signal information includes the time unit that is in each time window and that is for measuring each set of downlink measurement reference signals; or obtaining updated downlink measurement reference signal information, and determining, according to the updated downlink measurement reference signal information, the time unit that is in each time window and that is for measuring each set of downlink measurement reference signals, where the updated downlink measurement reference signal information includes the time unit that is in each time window and that is for measuring each set of downlink measurement reference signals.

A twenty-third aspect of the present invention provides a signal detection method, including:

determining a time unit that is in each time window and that is for measuring each set of downlink measurement reference signals, where the determined time unit that is in each time window and that is for measuring each set of downlink measurement reference signals includes at least one of: a $j^{th}$ time unit in each time window, a $(j+(\lfloor q/S \rfloor+1) \cdot S-q)^{th}$ time unit in each time window, or a $(j+q)^{th}$ time unit in each time window, q is a positive integer that is greater than or equal to 1 and that is less than or equal to S, S is a quantity of time units included in each time window, q is a positive integer that is greater than or equal to 1 and that is less than or equal to S, and j is a positive integer that is greater than or equal to 1 and that is less than or equal to S; and performing channel quality measurement on each set of downlink measurement reference signals in the determined time unit that is in the time window and that is for measuring each set of downlink measurement reference signals.

With reference to the twenty-third aspect, in a first possible implementation, before the performing channel quality measurement on each set of downlink measurement reference signals in the determined time unit that is in the time window and that is for measuring each set of downlink measurement reference signals, the method further includes:

obtaining a value of q that is broadcasted by the transmit end.

With reference to the first possible implementation of the twenty-third aspect, in a second possible implementation, the method further includes:

performing channel quality measurement on the downlink measurement reference signal in a time unit that is configured by the transmit end by using higher layer signaling and that is corresponding to each set of downlink measurement reference signals.

With reference to any one of the twenty-third aspect or the possible implementations of the twenty-third aspect, in a third possible implementation, the determining a time unit that is in each time window and that is for measuring each set of downlink measurement reference signals includes:

determining, according to preset downlink measurement reference signal information, the time unit that is in each time window and that is for measuring each set of downlink measurement reference signals, where the preset downlink measurement reference signal information includes the time unit that is in each time window and that is for measuring each set of downlink measurement reference signals; or obtaining updated downlink measurement reference signal information, and determining, according to the updated downlink measurement reference signal information, the time unit that is in each time window and that is for measuring each set of downlink measurement reference signals, where the updated downlink measurement reference signal information includes the time unit that is in each time window and that is for measuring each set of downlink measurement reference signals.

A twenty-fourth aspect of the present invention provides a signal detection method, including:

determining time units that are in T consecutive time windows and that are for detecting a broadcast channel, where T is an integer greater than 0, and the time units that are in the T time windows and that are for detecting the broadcast channel are $j^{th}$ time units in all the time windows, j is a positive integer that is greater than or equal to 1 and that is less than or equal to S, and S is a quantity of time units included in each time window; and detecting the broadcast channel in the determined time units that are in the T time windows and that are for detecting the broadcast channel.

With reference to the twenty-fourth aspect, in a first possible implementation, the broadcast channel is located in r time units in each time window, the r time units have fixed locations in each time window, and r is a positive integer that is greater than or equal to 1 and that is less than or equal to S.

With reference to the first possible implementation of the twenty-fourth aspect, in a second possible implementation, before the detecting the broadcast channel in the determined time units that are in the T time windows and that are for detecting the broadcast channel, the method further includes:

obtaining a value of r that is broadcasted by the transmit end.

With reference to any one of the twenty-fourth aspect or the possible implementations of the twenty-fourth aspect, in a third possible implementation, the determining time units that are in T consecutive time windows and that are for detecting a broadcast channel includes:

determining, according to preset broadcast channel information, the time units that are in the T consecutive time windows and that are for detecting the broadcast channel, where the preset broadcast channel information includes: a quantity T of the time windows, and a time unit that is in each time window and that is for detecting the broadcast channel; or obtaining updated broadcast channel information, and determining, according to the updated broadcast channel information, the time units that are in the T consecutive time windows and that are for detecting the broadcast channel, where the updated broadcast channel information includes: a quantity T of the time windows, and a time unit that is in each time window and that is for detecting the broadcast channel.

A twenty-fifth aspect of the present invention provides a signal detection method, including:

determining P antenna ports, where the P antenna ports are antenna ports for transmitting a synchronization signal by a transmit end; and detecting a broadcast channel on the P antenna ports.

With reference to the twenty-fifth aspect, in a first possible implementation, the detecting a broadcast channel on the P antenna ports includes:

detecting, in an $i^{th}$ time unit in each time window, the broadcast channel corresponding to the P antenna ports; and the detecting a broadcast channel on the P antenna ports further includes: detecting, in the $i^{th}$ time unit in each time window, the synchronization signal corresponding to the P antenna ports, where a transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

With reference to the first possible implementation of the twenty-fifth aspect, in a second possible implementation, the detecting, in an $i^{th}$ time unit in each time window, the broadcast channel corresponding to the P antenna ports includes:

detecting, in at least two symbols in the $i^{th}$ time unit in each time window, the synchronization signal corresponding to the P antenna ports, where the symbol is a unit of time that is smaller than the time unit.

With reference to any one of the twenty-fifth aspect or the possible implementations of the twenty-fifth aspect, in a third possible implementation, the determining P antenna ports includes:

determining the P antenna ports according to preset antenna port information, where the preset antenna port information includes a correspondence between the P antenna ports and the synchronization signal; or obtaining updated antenna port information, and determining the P antenna ports according to the updated antenna port information, where the updated antenna port information includes a correspondence between the P antenna ports and the synchronization signal.

According to the signal sending apparatus, the signal detection apparatus, the signal sending and detection system, the signal sending method, and the signal detection method that are provided in the embodiments, the apparatus determines a time unit that is in each time window and that is used to transmit a synchronization signal, where the determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, for example, m may be a quantity of time units that are in each time window and that are used to transmit a broadcast channel, and j is a positive integer that is greater than or equal to 1 and that is less than or equal to S; and the apparatus transmits the synchronization signal in the determined time unit in each time window. Therefore, a synchronization signal is always located in a time unit that has a fixed location in each time window, so that when a receive end detects the synchronization signal, a device at the receive end needs to perform detection only in a fixed time unit in each time window, thereby reducing complexity of designing the synchronization signal, and complexity of performing detection by the device at the receive end.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 12A and FIG. 12B are a schematic diagram of a transmission moment according to an embodiment of the present invention;

FIG. 21A and FIG. 21B are a schematic diagram of a transmission moment sequence according to an embodiment of the present invention;

FIG. 23A and FIG. 23B are a schematic diagram of another broadcast channel transmission according to an embodiment of the present invention.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1A:
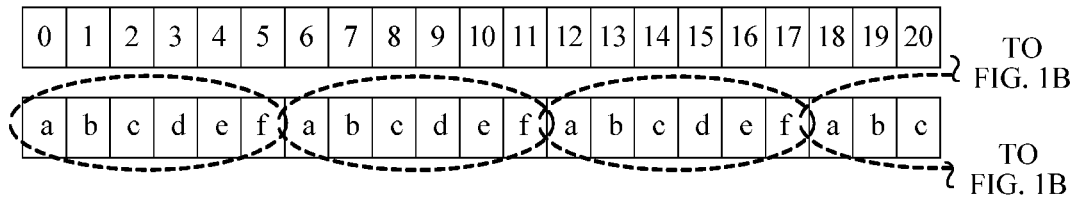
FIG. 1A and FIG. 1B are a schematic diagram of signal sending in the prior art.
Figure 1B:
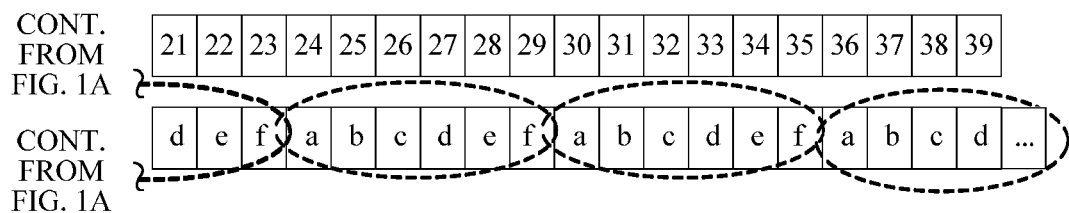
Figure 2:
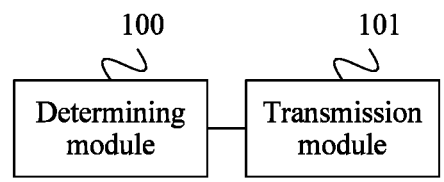
FIG. 2 is a schematic structural diagram of a signal sending apparatus according to an embodiment of the present invention.

FIG. 2 is a schematic structural diagram of a signal sending apparatus according to an embodiment of the present invention. The apparatus may be a device such as a base station, an evolved NodeB, or a remote radio unit (RRU). Referring to FIG. 2, the apparatus includes a determining module 100 and a transmission module 101.

The determining module 100 is configured to determine a time unit that is in each time window and that is used to transmit a synchronization signal.

The determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S.

The transmission module 101 is configured to transmit the synchronization signal in the determined time unit in each time window.

According to the signal sending apparatus provided in this embodiment, a determining module determines a time unit that is in each time window and that is used to transmit a synchronization signal, where the determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, for example, m may be a quantity of time units that are in each time window and that are used to transmit a broadcast channel, and j is a positive integer that is greater than or equal to 1 and that is less than or equal to S; and a transmission module transmits the synchronization signal in the determined time unit in each time window. Therefore, a synchronization signal is always located in a time unit that has a fixed location in each time window, so that when a receive end detects the synchronization signal, a device at the receive end needs to perform detection only in a fixed time unit in each time window, thereby reducing complexity of designing the synchronization signal, and complexity of performing detection by the device at the receive end.

Preferably, it can be learned by referring to the foregoing description that, in one time window, there may be three time units that are used to accommodate a synchronization signal. To effectively distinguish synchronization signals in the three time units to facilitate accurate identification by a receive end, this embodiment of the present invention provides an implementation solution for distinguishing the synchronization signals, and the solution is specifically as follows.

A sequence corresponding to the synchronization signal is formed by interleaving a first subsequence with a second subsequence. An expression of the first subsequence is as follows:

$$d(2n) = \begin{cases} s_0^{(m_0)}(n)c_0(n) & \text{a time unit } j \\ s_1^{(m_1)}(n)c_0(n) & \text{a time unit } j + (\lfloor m/S \rfloor + 1) \times S - m, \\ s_2^{(m_2)}(n)c_0(n) & \text{a time unit } j + m \end{cases}$$

where $0 \leq n \leq N/2$; N is a length of the sequence corresponding to the synchronization signal; d(2n) is the first subsequences; $s_0^{(m_0)}(n)$, $s_1^{(m_1)}(n)$, and $s_2^{(m_2)}(n)$ are three sequences including three cyclic shifts of a first M sequence; $c_0(n)$ is a first scrambling code sequence including a cyclic shift of a second M sequence; $s_0^{(m_0)}(n)c_0(n)$ is used to represent the first subsequence used when the synchronization signal is transmitted in the $j^{th}$ time unit in each time window; $s_1^{(m_1)}(n)c_0(n)$ is used to represent the first subsequence used when the synchronization signal is transmitted in the $(j+(\lfloor m/S \rfloor+1) \times S-m)^{th}$ time unit in each time window; and $s_2^{(m_2)}(n)c_0(n)$ is used to represent the first subsequence used when the synchronization signal is transmitted in the $(j+m)^{th}$ time unit in each time window.

An expression of the second subsequence is as follows:

$$d(2n+1) = \begin{cases} s_2^{(m_2)}(n)c_1(n)z_1^{(m_0)}(n) & \text{a time unit } j \\ s_1^{(m_1)}(n)c_1(n)z_1^{(m_1)}(n) & \text{a time unit } j + (\lfloor m/S \rfloor + 1) \times S - m, \\ s_0^{(m_0)}(n)c_1(n)z_1^{(m_2)}(n) & \text{a time unit } j + m \end{cases}$$

where d(2n+1) is the second subsequence; $c_1(n)$ is a second scrambling code sequence including a cyclic shift of the second M sequence; $z_1^{(m_0)}(n)$, $z_1^{(m_1)}(n)$, and $z_2^{(m_2)}(n)$ are three third scrambling code sequences including three cyclic shifts of a third M sequence, $s_2^{(m_2)}(n)c_1(n)z_1^{(m_0)}(n)$ is used to represent the second subsequence used when the synchronization signal is transmitted in the $j^{th}$ time unit in each time window; $s_1^{(m_1)}(n)c_1(n)z_1^{(m_1)}(n)$ is used to represent the second subsequence used when the synchronization signal is transmitted in the $(j+(\lfloor m/S \rfloor+1) \times S-m)^{th}$ time unit in each time window; and $s_0^{(m_0)}(n)c_1(n)z_1^{(m_2)}(n)$ is used to represent the second subsequence used when the synchronization signal is transmitted in the $(j+m)^{th}$ time unit in each time window.

Optionally, the transmission module 101 is further configured to: before transmitting the synchronization signal in the determined time unit in each time window, send m to user equipment UE by using a broadcast channel.

Preferably, the determining module 100 is specifically configured to determine, according to preset synchronization signal information, the time unit that is in each time window and that is used to transmit the synchronization signal, where the preset synchronization signal information includes the time unit that is in each time window and that is used to transmit the synchronization signal; or the transmission module 101 is further configured to: obtain updated synchronization signal information, and determine, according to the updated synchronization signal information, the time unit that is in each time window and that is used to transmit the synchronization signal, where the updated synchronization signal information includes the time unit that is in each time window and that is used to transmit the synchronization signal.

Further, still referring to FIG. 2, the apparatus may further transmit the broadcast channel when transmitting the synchronization signal.

Specifically, the determining module 100 is further configured to determine time units that are in T consecutive time windows and that are used to transmit the broadcast channel. T is an integer greater than 0, and T is an integer greater than 0.

The time units that are in the T time windows and that are used to transmit the broadcast channel are $j^{th}$ time units in all the T time windows, j is a positive integer that is greater than or equal to 1 and that is less than or equal to S, and S is the quantity of time units included in each time window.

The transmission module 101 is further configured to transmit the broadcast channel in each of the determined time units that are in the T time windows and that are used to transmit the broadcast channel.

According to the signal sending apparatus provided in this embodiment, a determining module determines time units that are in T consecutive time windows and that are used to transmit a broadcast channel, where T is an integer greater than 0, T is an integer greater than 0, the time units that are in the T time windows and that are used to transmit the broadcast channel are $j^{th}$ time units in all the T time windows, j is a positive integer that is greater than or equal to 1 and that is less than or equal to S, and S is a quantity of time units included in each time window; and a transmission module transmits the broadcast channel in each of the determined time units that are in the T time windows and that are used to transmit the broadcast channel. Therefore, a broadcast channel is always located in a time unit that has a fixed location in each time window, so that when a receive end detects the broadcast channel, a device at the receive end needs to perform detection only in a fixed time unit in each time window, thereby reducing complexity of designing the broadcast channel, and complexity of performing detection by the device at the receive end.

It should be noted that, the foregoing function of transmitting a broadcast channel may be performed by the apparatus shown in FIG. 2 at the same time as the corresponding function of transmitting a synchronization signal, or may be performed independently. No limitation is imposed herein.

Preferably, the broadcast channel is located in r time units in each time window, the r time units have fixed locations in each time window, and r is a positive integer that is greater than or equal to 1 and that is less than or equal to S.

Optionally, r may be equal to or different from m.

Optionally, the transmission module 101 is further configured to: before transmitting the broadcast channel in each of the determined time units that are in the T time windows and that are used to transmit the broadcast channel, send r to the user equipment UE by using the broadcast channel.

Preferably, similar to processing of the synchronization signal, before transmitting the broadcast channel, the apparatus shown in FIG. 2 also needs to determine a parameter related to transmission of the broadcast channel.

For example, the determining module 100 is specifically configured to determine, according to preset broadcast channel information, the time units that are in the T consecutive time windows and that are used to transmit the broadcast channel, where the preset broadcast channel information includes: a quantity T of the time windows, and a time unit that is in each time window and that is used to transmit the broadcast channel; or the transmission module 101 is further configured to: obtain updated broadcast channel information, and determine, according to the updated broadcast channel information, the time units that are in the T consecutive time windows and that are used to transmit the broadcast channel, where the updated broadcast channel information includes: a quantity T of the time windows, and a time unit that is in each time window and that is used to transmit the broadcast channel.

Further, when the apparatus shown in FIG. 2 transmits the synchronization signal and/or the broadcast channel, the apparatus may further transmit a downlink measurement reference signal.

Specifically, the determining module 100 is further configured to determine a time unit that is in each time window and that is used to transmit each set of downlink measurement reference signals.

The determined time unit that is in each time window and that is used to transmit each set of downlink measurement reference signals includes at least one of: the $j^{th}$ time unit in each time window, a $(j+(\lfloor q/S \rfloor+1) \cdot S-q)^{th}$ time unit in each time window, or a $(j+q)^{th}$ time unit in each time window, where S is the quantity of time units included in each time window, q is a positive integer that is greater than or equal to 1 and that is less than or equal to S, and j is a positive integer that is greater than or equal to 1 and that is less than or equal to S.

The transmission module 101 is further configured to transmit each set of downlink measurement reference signals in the determined time unit that is in the time window and that is used to transmit the downlink measurement reference signal.

According to the signal sending apparatus provided in this embodiment, a determining module determines a time unit that is in each time window and that is used to transmit each set of downlink measurement reference signals, where the determined time unit that is in each time window and that is used to transmit each set of downlink measurement reference signals includes at least one of: a $j^{th}$ time unit in each time window, a $(j+(\lfloor q/S \rfloor+1) \cdot S-q)^{th}$ time unit in each time window, or a $(j+q)^{th}$ time unit in each time window, S is a quantity of time units included in each time window, q is a positive integer that is greater than or equal to 1 and that is less than or equal to S, for example, q may be a quantity of time units that are in each time window for transmitting a broadcast channel and that are used to transmit the broadcast channel, and may be notified by a transmit end to a receive end by using the broadcast channel, and j is a positive integer that is greater than or equal to 1 and that is less than or equal to S; and a transmission module transmits each set of downlink measurement reference signals in the determined time unit that is in the time window and that is used to transmit the downlink measurement reference signal. Therefore, multiple sets of downlink measurement reference signals are always located in time units that have fixed locations in each time window, so that when performing measurement based on multiple sets of reference signals, a receive end can perform channel quality measurement on each set of reference signals in a designed predefined manner, thereby reducing complexity of performing measurement based on multiple sets of downlink measurement reference signals.

It should be noted that, the foregoing function of transmitting a downlink measurement reference signal may be performed by the apparatus shown in FIG. 2 at the same time as the function of transmitting a broadcast channel and the corresponding function of transmitting a synchronization signal, or may be performed independently. No limitation is imposed herein.

For the downlink measurement reference signal, cyclic shift may be performed on a time unit in which multiple sets of downlink measurement reference signals are placed in a time division manner, so as to ensure that a time unit used to transmit each set of downlink measurement reference signals has a fixed location in each time window. Specifically, a feasible implementation is as follows:

The transmission module 101 is specifically configured to perform cyclic shift on the determined time unit that is in the time window and that is used to transmit each set of downlink measurement reference signals, so that each set of downlink measurement reference signals is always transmitted in the $j^{th}$ time unit in each time window, and/or the $(j+q)^{th}$ time unit in each time window, and/or the $(j+(\lfloor q/S \rfloor + 1) \cdot S - q)^{th}$ time unit in each time window:

$$t = \left\lfloor \frac{kq}{S} \right\rfloor \times S - \left\lfloor \left\lfloor \frac{kq}{S} \right\rfloor \times \frac{S}{q} \right\rfloor \times q,$$

where the cyclic shift is performing cyclic shift, by t time units, on time units corresponding to a $k^{th}$ time of transmission of q sets of the downlink measurement reference signals, q indicates a set quantity of downlink measurement reference signals in each time of transmission, k indicates the $k^{th}$ time of transmission, t indicates a quantity of time units by which cyclic shift is performed for each set of downlink measurement reference signals in each cyclic shift, and q, k, and t are all positive integers greater than 0.

Optionally, the transmission module 101 is further configured to: before transmitting each set of downlink measurement reference signals in the determined time unit that is in the time window and that is used to transmit the downlink measurement reference signal, send a value of q to the user equipment UE by using the broadcast channel.

Figure 3:
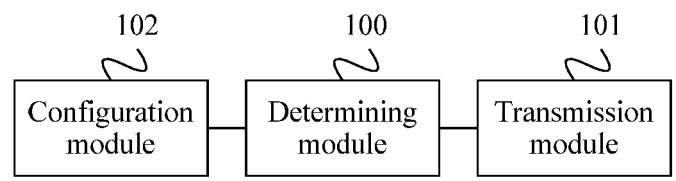
FIG. 3 is a schematic structural diagram of another signal sending apparatus according to an embodiment of the present invention.

Preferably, based on FIG. 2, FIG. 3 is a schematic structural diagram of another signal sending apparatus according to an embodiment of the present invention. Referring to FIG. 3, the apparatus further includes a configuration module 102.

The configuration module 102 is configured to configure, for each UE by using higher layer signaling, a time unit corresponding to each set of downlink measurement reference signals to be measured by the UE.

Preferably, the determining module 100 is specifically configured to determine, according to preset downlink measurement reference signal information, the time unit that is in each time window and that is used to transmit each set of downlink measurement reference signals, where the preset downlink measurement reference signal information includes the time unit that is in each time window and that is used to transmit each set of downlink measurement reference signals; or the transmission module 101 is further configured to: obtain updated downlink measurement reference signal information, and determine, according to the updated downlink measurement reference signal information, the time unit that is in each time window and that is used to transmit each set of downlink measurement reference signals, where the updated downlink measurement reference signal information includes the time unit that is in each time window and that is used to transmit each set of downlink measurement reference signals.

Still referring to FIG. 2, to reduce complexity during detection by a device at a receive end, and to reduce pilot overheads and design, the apparatus shown in FIG. 2 may further have the following functions:

A determining module 100 is configured to determine P antenna ports, where the P antenna ports are antenna ports for transmitting a synchronization signal.

A transmission module 101 is configured to map a broadcast channel to the P antenna ports for transmission.

According to the signal sending apparatus provided in this embodiment of the present invention, a determining module determines P antenna ports, where the P antenna ports are antenna ports for transmitting a synchronization signal; and a transmission module maps a broadcast channel to the P antenna ports for transmission. Therefore, a broadcast channel is transmitted based on a synchronization signal resource, so that a device at a receive end demodulates the broadcast channel according to the synchronization signal resource, thereby reducing complexity of detecting, by the device at the receive end, synchronization signal resources and broadcast channels that are separately corresponding to multiple resources, and avoiding a case in which the device at the receive end separately demodulates a synchronization signal and a broadcast channel based on different resources. In addition, because there is no need to design a new broadcast-channel dedicated demodulation pilot again, overheads and design of a broadcast-channel demodulation pilot are reduced.

Further, the transmission module 101 is specifically configured to: separately map, in an $i^{th}$ time unit in each time window, the broadcast channel to the P antenna ports for transmission; and separately map, in the $i^{th}$ time unit in each time window, the synchronization signal to the P antenna ports for transmission.

A transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

Further, the transmission module 101 is specifically configured to map, in at least two symbols in the $i^{th}$ time unit in each time window, the synchronization signal to the P antenna ports for transmission.

The symbol is a unit of time that is smaller than the time unit.

Preferably, the determining module 100 is specifically configured to determine the P antenna ports according to preset antenna port information, where the preset antenna port information includes a correspondence between the P antenna ports and the synchronization signal; or the transmission module 101 is further configured to: obtain updated antenna port information, and determine the P antenna ports according to the updated antenna port information, where the updated antenna port information includes a correspondence between the P antenna ports and the synchronization signal.

The apparatus shown in FIG. 2 or FIG. 3 is used as a device at a transmit end. Correspondingly, improvement also needs to be made for a device at a receive end. The device at the receive end is described in the following by using specific embodiments.

Figure 4:
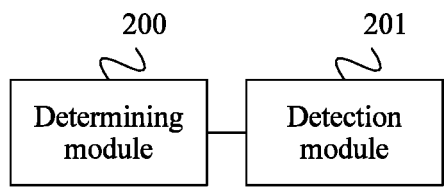
FIG. 4 is a schematic structural diagram of a signal detection apparatus according to an embodiment of the present invention.

FIG. 4 is a schematic structural diagram of a signal detection apparatus according to an embodiment of the present invention. The apparatus is used as a device at a receive end, and may be UE, a remote radio unit (Remote Ratio Unit, RRU for short), or any other receiving device. Referring to FIG. 4, the apparatus includes a determining module 200 and a detection module 201.

The determining module 200 is configured to determine a time unit that is in each time window and that is for detecting a synchronization signal.

The determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S.

The detection module 201 is configured to detect the synchronization signal in the determined time unit in each time window.

According to the signal detection apparatus provided in this embodiment, a determining module determines a time unit that is in each time window and that is for detecting a synchronization signal, where the determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S; and a detection module detects the synchronization signal in the determined time unit in each time window. Therefore, a synchronization signal is always located in a time unit that has a fixed location in each time window, so that when detecting the synchronization signal, a device at a receive end needs to perform detection only in a fixed time unit in each time window, thereby reducing complexity of designing the synchronization signal, and complexity of performing detection by the device at the receive end.

It can be learned by referring to the embodiment corresponding to FIG. 2 that, in one time window, there may be three time units that are used to accommodate a synchronization signal. Synchronization signals in the three time units need to be distinguished. For a specific solution of distinguishing the synchronization signals, refer to the embodiment corresponding to FIG. 2. Details are not described herein again.

Figure 5:
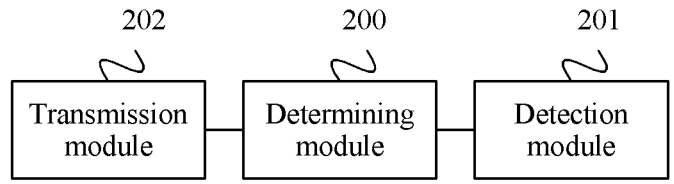
FIG. 5 is a schematic structural diagram of another signal detection apparatus according to an embodiment of the present invention.

Based on FIG. 4, FIG. 5 is a schematic structural diagram of another signal detection apparatus according to an embodiment of the present invention. Referring to FIG. 5, the apparatus further includes a transmission module 202.

The transmission module 202 is further configured to: before the time unit that is in each time window and that is for detecting the synchronization signal is determined, obtain a value of m that is broadcasted by a transmit end.

Preferably, the determining module 200 is specifically configured to:

determine, according to preset synchronization signal information, the time unit that is in each time window and that is for detecting the synchronization signal, where the preset synchronization signal information includes the time unit that is in each time window and that is for detecting the synchronization signal; or obtain updated synchronization signal information, and determine, according to the updated synchronization signal information, the time unit that is in each time window and that is for detecting the synchronization signal, where the updated synchronization signal information includes the time unit that is in each time window and that is for detecting the synchronization signal.

Further, when the apparatus shown in FIG. 4 or FIG. 5 detects a synchronization signal, the apparatus may further detect a broadcast channel.

Specifically, the determining module 200 is further configured to determine time units that are in T consecutive time windows and that are for detecting the broadcast channel, where T is an integer greater than 0.

The time units that are in the T time windows and that are for detecting the broadcast channel are $j^{th}$ time units in all the time windows, j is a positive integer that is greater than or equal to 1 and that is less than or equal to S, and S is a quantity of time units included in each time window.

The detection module 201 is further configured to detect the broadcast channel in the determined time units that are in the T time windows and that are for detecting the broadcast channel.

According to the signal detection apparatus provided in this embodiment, a determining module determines time units that are in T consecutive time windows and that are for detecting a broadcast channel, where T is an integer greater than 0, the time units that are in the T time windows and that are for detecting the broadcast channel are $j^{th}$ time units in all the time windows, j is a positive integer that is greater than or equal to 1 and that is less than or equal to S, and S is a quantity of time units included in each time window; and a detection module detects the broadcast channel in the determined time units that are in the T time windows and that are for detecting the broadcast channel. Therefore, a broadcast channel is always located in a time unit that has a fixed location in each time window, so that when detecting the broadcast channel, a device at a receive end needs to perform detection only in a fixed time unit in each time window, thereby reducing complexity of designing the broadcast channel, and complexity of performing detection by the device at the receive end.

It should be noted that, the foregoing function of detecting a synchronization signal and the function of detecting a broadcast channel may be simultaneously or mutually independently performed by the apparatus shown in FIG. 4 or FIG. 5. No limitation is imposed herein.

Preferably, the broadcast channel is located in r time units in each time window, the r time units have fixed locations in each time window, and r is a positive integer that is greater than or equal to 1 and that is less than or equal to S.

Further, the determining module 200 is further configured to: before the broadcast channel is detected in the determined time units that are in the T time windows and that are for detecting the broadcast channel, obtain a value of r that is broadcasted by the transmit end.

Preferably, the determining module 200 is specifically configured to:

determine, according to preset broadcast channel information, the time units that are in the T consecutive time windows and that are for detecting the broadcast channel, where the preset broadcast channel information includes: a quantity T of the time windows, and a time unit that is in each time window and that is for detecting the broadcast channel; or obtain updated broadcast channel information, and determine, according to the updated broadcast channel information, the time units that are in the T consecutive time windows and that are for detecting the broadcast channel, where the updated broadcast channel information includes: a quantity T of the time windows, and a time unit that is in each time window and that is for detecting the broadcast channel.

Further, when the apparatus shown in FIG. 4 or FIG. 5 detects the synchronization signal and/or the broadcast channel, the apparatus may further measure a downlink measurement reference signal.

Specifically, the determining module 200 is further configured to determine a time unit that is in each time window and that is for measuring each set of downlink measurement reference signals.

The determined time unit that is in each time window and that is for measuring each set of downlink measurement reference signals includes at least one of: the $j^{th}$ time unit in each time window, a $(j+(\lfloor q/S \rfloor+1) \cdot S-q)^{th}$ time unit in each time window, or a $(j+q)^{th}$ time unit in each time window, q is a positive integer that is greater than or equal to 1 and that is less than or equal to S, S is the quantity of time units included in each time window, q is a positive integer that is greater than or equal to 1 and that is less than or equal to S, and j is a positive integer that is greater than or equal to 1 and that is less than or equal to S.

The detection module 201 is further configured to perform channel quality measurement on each set of downlink measurement reference signals in the determined time unit that is in the time window and that is for measuring each set of downlink measurement reference signals.

According to the signal detection apparatus provided in this embodiment, a determining module determines a time unit that is in each time window and that is for measuring each set of downlink measurement reference signals, where the determined time unit that is in each time window and that is for measuring each set of downlink measurement reference signals includes at least one of: a $j^{th}$ time unit in each time window, a $(j+(\lfloor q/S \rfloor+1) \cdot S-q)^{th}$ time unit in each time window, or a $(j+q)^{th}$ time unit in each time window, q is a positive integer that is greater than or equal to 1 and that is less than or equal to S, S is a quantity of time units included in each time window, q is a positive integer that is greater than or equal to 1 and that is less than or equal to S, and j is a positive integer that is greater than or equal to 1 and that is less than or equal to S; and a detection module performs channel quality measurement on each set of downlink measurement reference signals in the determined time unit that is in the time window and that is for measuring each set of downlink measurement reference signals. Therefore, multiple sets of downlink measurement reference signals are always located in time units that have fixed locations in each time window, so that when receiving and measuring each set of measurement reference signals, a receive end can perform channel quality measurement on each set of reference signals in a designed predefined manner, thereby reducing complexity of performing measurement based on multiple sets of downlink measurement reference signals.

It should be noted that, when the apparatus shown in FIG. 4 or FIG. 5 performs the function of detecting a synchronization signal and/or the function of detecting a broadcast channel, the apparatus may further perform a function of measuring a downlink measurement reference signal. Alternatively, the three functions may be performed independently. No limitation is imposed herein.

Optionally, the determining module 200 is further configured to: before channel quality measurement is performed on each set of downlink measurement reference signals in the determined time unit that is in the time window and that is for measuring each set of downlink measurement reference signals, obtain a value of q that is broadcasted by the transmit end.

Preferably, the detection module 201 is specifically configured to perform channel quality measurement on the downlink measurement reference signal in a time unit that is configured by the transmit end by using higher layer signaling and that is corresponding to each set of downlink measurement reference signals.

Preferably, the determining module 200 is specifically configured to:

determine, according to preset downlink measurement reference signal information, the time unit that is in each time window and that is for measuring each set of downlink measurement reference signals, where the preset downlink measurement reference signal information includes the time unit that is in each time window and that is for measuring each set of downlink measurement reference signals; or obtain updated downlink measurement reference signal information, and determine, according to the updated downlink measurement reference signal information, the time unit that is in each time window and that is for measuring each set of downlink measurement reference signals, where the updated downlink measurement reference signal information includes the time unit that is in each time window and that is for measuring each set of downlink measurement reference signals.

Still referring to FIG. 4 or FIG. 5 in which the apparatus is used as a device at a receive end, to reduce complexity during detection by the device at the receive end, and to reduce pilot overheads and design, an embodiment of the present invention provides a solution of demodulating a broadcast channel based on a synchronization signal resource.

Specifically, a determining module 200 is configured to determine P antenna ports, where the P antenna ports are antenna ports for transmitting a synchronization signal by a transmit end.

A detection module 201 is configured to detect a broadcast channel on the P antenna ports.

According to the signal detection apparatus provided in this embodiment of the present invention, a determining module determines P antenna ports, where the P antenna ports are antenna ports for transmitting a synchronization signal by a transmit end; and a detection module detects a broadcast channel on the P antenna ports. Therefore, a broadcast channel is transmitted according to a synchronization signal resource, thereby reducing complexity of detecting, by a device at a receive end, synchronization signal resources and broadcast channels that are separately corresponding to multiple resources, and avoiding a case in which the device at the receive end separately demodulates a synchronization signal and a broadcast channel based on different resources. In addition, because there is no need to design a new broadcast-channel dedicated demodulation pilot again, overheads and design of a broadcast-channel demodulation pilot are reduced.

Further, the detection module 201 is specifically configured to:

detect, in an $i^{th}$ time unit in each time window, the broadcast channel corresponding to the P antenna ports; and detect, in the $i^{th}$ time unit in each time window, the synchronization signal corresponding to the P antenna ports.

A transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

Optionally, the detection module 201 is specifically configured to detect, in at least two symbols in the $i^{th}$ time unit in each time window, the synchronization signal corresponding to the P antenna ports.

The symbol is a unit of time that is smaller than the time unit.

Optionally, the determining module 200 is specifically configured to:

determine the P antenna ports according to preset antenna port information, where the preset antenna port information includes a correspondence between the P antenna ports and the synchronization signal; or obtain updated antenna port information, and determine the P antenna ports according to the updated antenna port information, where the updated antenna port information includes a correspondence between the P antenna ports and the synchronization signal.

Figure 6:
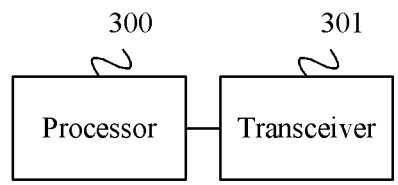
FIG. 6 is a schematic structural diagram of another signal sending apparatus according to an embodiment of the present invention.

FIG. 6 is a schematic structural diagram of another signal sending apparatus according to an embodiment of the present invention. The apparatus may be a device such as a base station, an evolved NodeB, or a remote radio unit (Remote Ratio Unit, RRU for short). Referring to FIG. 6, the apparatus includes a processor 300 and a transceiver 301.

The processor 300 may have a corresponding function of the determining module 100 shown in FIG. 2. Correspondingly, the transceiver 301 may have a corresponding function of the transmission module 101 shown in FIG. 2. Therefore, the apparatus can implement technical effects in the embodiment corresponding to FIG. 2.

Further, based on FIG. 2, the processor 300 may further have a corresponding function of the configuration module 102 shown in FIG. 3. Therefore, the apparatus can implement technical effects in the embodiment corresponding to FIG. 3.

The processor 300 may have a corresponding function of the determining module 200 shown in FIG. 4. Correspondingly, the transceiver 301 may have a corresponding function of the detection module 201 shown in FIG. 4. Therefore, the apparatus can implement technical effects in the embodiment corresponding to FIG. 4.

Further, based on FIG. 4, the transceiver 301 may further have a corresponding function of the transmission module 202 shown in FIG. 5. Therefore, the apparatus can implement technical effects in the embodiment corresponding to FIG. 5.

Further, an embodiment of the present invention further provides a signal sending and detection system. The system includes a signal sending apparatus used as a device at a transmit end and a signal detection apparatus used as a device at a receive end. A quantity of devices at the transmit end and that of devices at the receive end are not limited in this embodiment. In addition, the signal sending apparatus may use the structure shown in FIG. 2, FIG. 3, or FIG. 6, and implement corresponding functions and technical effects. The signal detection apparatus may use the structure shown in FIG. 4, FIG. 5, or FIG. 6, and implement corresponding functions and technical effects.

Figure 7:
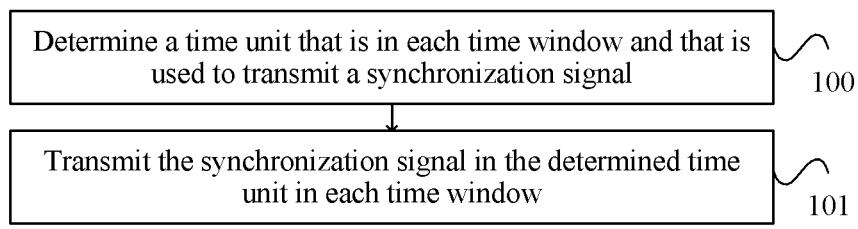
FIG. 7 is a schematic diagram of a signal sending method according to an embodiment of the present invention.

FIG. 7 is a schematic diagram of a signal sending method according to an embodiment of the present invention. An execution body of the method may use a structure of the apparatus shown in FIG. 2, FIG. 3, or FIG. 6, and the apparatus can perform all steps shown in this embodiment. The apparatus may be a device such as a base station, an evolved NodeB, or an RRU. Referring to FIG. 7, the method includes the following steps.

Step 100: Determine a time unit that is in each time window and that is used to transmit a synchronization signal.

The determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S.

Step 101: Transmit the synchronization signal in the determined time unit in each time window.

According to the signal sending method provided in this embodiment, a time unit that is in each time window and that is used to transmit a synchronization signal is determined, where the determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window. S is a quantity of time units included in each time window, m is a positive integer that is greater than or equal to 1 and that is less than or equal to S, for example, m may be a quantity of time units that are in each time window and that are used to transmit a broadcast channel, and j is a positive integer that is greater than or equal to 1 and that is less than or equal to S; and the synchronization signal is transmitted in the determined time unit in each time window. Therefore, a synchronization signal is always located in a time unit that has a fixed location in each time window, so that when a receive end detects the synchronization signal, a device at the receive end needs to perform detection only in a fixed time unit in each time window, thereby reducing complexity of designing the synchronization signal, and complexity of performing detection by the device at the receive end.

Preferably, it can be learned by referring to the foregoing description that, in one time window, there may be three time units that are used to accommodate a synchronization signal. To effectively distinguish synchronization signals in the three time units to facilitate accurate identification by a receive end, this embodiment of the present invention provides an implementation solution for distinguishing the synchronization signals, and the solution is specifically as follows.

A sequence corresponding to the synchronization signal is formed by interleaving a first subsequence with a second subsequence. An expression of the first subsequence is as follows:

$$d(2n) = \begin{cases} s_0^{(m_0)}(n)c_0(n) & \text{a time unit } j \\ s_1^{(m_1)}(n)c_0(n) & \text{a time unit } j + (\lfloor m/S \rfloor + 1) \times S - m, \\ s_2^{(m_2)}(n)c_0(n) & \text{a time unit } j + m \end{cases}$$

where $0 \leq n \leq N/2$; N is a length of the sequence corresponding to the synchronization signal; $d(2n)$ is the first subsequence; $s_0^{(m_0)}(n)$, $s_1^{(m_1)}(n)$, and $s_2^{(m_2)}(n)$ are three sequences including three cyclic shifts of a first M sequence; $c_0(n)$ is a first scrambling code sequence including a cyclic shift of a second M sequence; $s_0^{(m_0)}(n)c_0(n)$ is used to represent the first subsequence used when the synchronization signal is transmitted in the $j^{th}$ time unit in each time window; $s_1^{(m_1)}(n)c_0(n)$ is used to represent the first subsequence used when the synchronization signal is transmitted in the $(j+(\lfloor m/S \rfloor+1) \times S - m)^{th}$ time unit in each time window; and $s_2^{(m_2)}(n)c_0(n)$ is used to represent the first subsequence used when the synchronization signal is transmitted in the $(j+m)^{th}$ time unit in each time window.

An expression of the second subsequence is as follows:

$$d(2n+1) = \begin{cases} s_2^{(m_2)}(n)c_1(n)z_1^{(m_0)}(n) & \text{a time unit } j \\ s_1^{(m_1)}(n)c_1(n)z_1^{(m_1)}(n) & \text{a time unit } j + (\lfloor m/S \rfloor + 1) \times S - m, \\ s_0^{(m_0)}(n)c_1(n)z_1^{(m_2)}(n) & \text{a time unit } j + m \end{cases}$$

where $d(2n+1)$ is the second subsequence; $c_1(n)$ is a second scrambling code sequence including a cyclic shift of the second M sequence; $z_1^{(m_0)}(n)$, $z_1^{(m_1)}(n)$, and $z_1^{(m_2)}(n)$ are three third scrambling code sequences including three cyclic shifts of a third M sequence; $s_2^{(m_2)}(n)c_1(n)z_1^{(m_0)}(n)$ is used to represent the second subsequence used when the synchronization signal is transmitted in the $j^{th}$ time unit in each time window; $s_1^{(m_1)}(n)c_1(n)z_1^{(m_1)}(n)$ is used to represent the second subsequence used when the synchronization signal is transmitted in the $(j+(\lfloor m/S \rfloor+1) \times S-m)^{th}$ time unit in each time window; and $s_0^{(m_0)}(n)c_1(n)z_1^{(m_2)}(n)$ is used to represent the second subsequence used when the synchronization signal is transmitted in the $(j+m)^{th}$ time unit in each time window.

Optionally, before performing step 101, a device at a transmit end may send m to user equipment UE by using a broadcast channel Specifically, to enable the UE at the receive end to detect the synchronization signal, the device at the transmit end may send a value of m to the UE before transmitting the synchronization signal. In addition, the value of m may be preset in the UE. In this case, the value of m does not need to be sent to the UE.

Preferably, step 100 shown in FIG. 7 may have the following several feasible implementations:

Manner 1: Step 100a: Determine, according to preset synchronization signal information, the time unit that is in each time window and that is used to transmit the synchronization signal, where the preset synchronization signal information includes the time unit that is in each time window and that is used to transmit the synchronization signal.

In step 100a, a preset manner is used: The time unit that is in each time window and that is used to transmit the synchronization signal is preset in a storage medium of the device at the transmit end, and when the synchronization signal needs to be transmitted, synchronization signal information that is preset in the storage medium is invoked, and the synchronization signal is transmitted. Optionally, the preset synchronization signal information may further include parameters such as S and m.

Manner 2: Step 100b: Obtain updated synchronization signal information, and determine, according to the updated synchronization signal information, the time unit that is in each time window and that is used to transmit the synchronization signal, where the updated synchronization signal information includes the time unit that is in the time window and that is used to transmit the synchronization signal.

In step 100b, when the device at the transmit end has a corresponding computation function, the device at the transmit end may generate the updated synchronization signal information according to a system requirement, or the device at the transmit end receives the updated synchronization signal information sent by a system control device. Further, the device at the transmit end may actively obtain the updated synchronization signal information from the control device, or may wait for the control device to configure the updated synchronization signal information. No limitation is imposed herein. Optionally, the updated synchronization signal information may further include parameters such as S and m.

Figure 8:
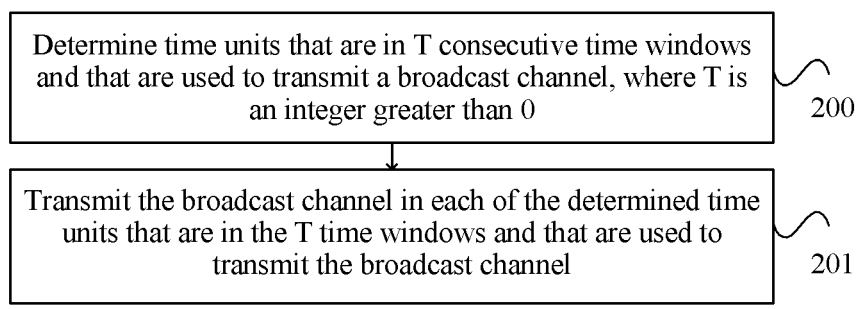
FIG. 8 is a schematic diagram of another signal sending method according to an embodiment of the present invention.

Further, when the apparatus shown in FIG. 2, FIG. 3, or FIG. 6 is used as the device at the receive end, the apparatus may further transmit the broadcast channel when transmitting the synchronization signal. Specifically, FIG. 8 is a schematic diagram of another signal sending method according to an embodiment of the present invention. Referring to FIG. 8, the method includes the following steps.

Step 200: Determine time units that are in T consecutive time windows and that are used to transmit a broadcast channel, where T is an integer greater than 0.

The time units that are in the T time windows and that are used to transmit the broadcast channel are $j^{th}$ time units in all the T time windows, j is a positive integer that is greater than or equal to 1 and that is less than or equal to S, and S is a quantity of time units included in each time window.

Step 201: Transmit the broadcast channel in each of the determined time units that are in the T time windows and that are used to transmit the broadcast channel According to the signal sending method provided in this embodiment, time units that are in T consecutive time windows and that are used to transmit a broadcast channel are determined, where T is an integer greater than 0, the time units that are in the T time windows and that are used to transmit the broadcast channel are $j^{th}$ time units in all the T time windows, j is a positive integer that is greater than or equal to 1 and that is less than or equal to S, and S is a quantity of time units included in each time window; and the broadcast channel is transmitted in each of the determined time units that are in the T time windows and that are used to transmit the broadcast channel. Therefore, a broadcast channel is always located in a time unit that has a fixed location in each time window, so that when a receive end detects the broadcast channel, a device at the receive end needs to perform detection only in a fixed time unit in each time window, thereby reducing complexity of designing the broadcast channel, and complexity of performing detection by the device at the receive end.

It should be noted that the foregoing step 200 and step 201 may be performed at the same time as step 100 and step 101 shown in FIG. 7, or may be performed independently. No limitation is imposed herein.

Preferably, all broadcast channels in a cell are located in r time units in each time window in a time division manner, the r time units have fixed locations in each time window, and r is a positive integer that is greater than or equal to 1 and that is less than or equal to S, where r may be equal to or different from m.

Optionally, before step 201 shown in FIG. 8, the method further includes the following step:

Step 202: Send r to user equipment UE by using the broadcast channel, so that the UE detects the broadcast channel in the r time units. Optionally, a value of r may be sent to all user equipments UEs in the cell by using a broadcast channel that is first transmitted in each time window.

Preferably, similar to processing of the synchronization signal, before transmitting the broadcast channel, the device at the transmit end also needs to determine a parameter related to transmission of the broadcast channel Specifically, step 200 may have the following several feasible implementations:

Manner 1: Step 200*a*: Determine, according to preset broadcast channel information, the time units that are in the T consecutive time windows and that are used to transmit the broadcast channel, where the preset broadcast channel information includes: a quantity T of the time windows, and a time unit that is in each time window and that is used to transmit the broadcast channel Manner 2: Step 200*b*: Obtain updated broadcast channel information, and determine, according to the updated broadcast channel information, the time units that are in the T consecutive time windows and that are used to transmit the broadcast channel, where the updated broadcast channel information includes: a quantity T of the time windows, and a time unit that is in each time window and that is used to transmit the broadcast channel It should be noted that, for step 200*a* and step 200*b*, refer to related descriptions of step 100*a* and step 100*b*. That is, the device at the transmit end may determine, in a preset manner or in an obtaining manner, the quantity T of the time windows and the time unit that is in each time window and that is used to transmit the broadcast channel In addition, the preset broadcast channel information or the updated broadcast channel information may further include a parameter related to the quantity T of the time windows and the time unit that is in each time window and that is used to transmit the broadcast channel, for example, j.

Figure 9:
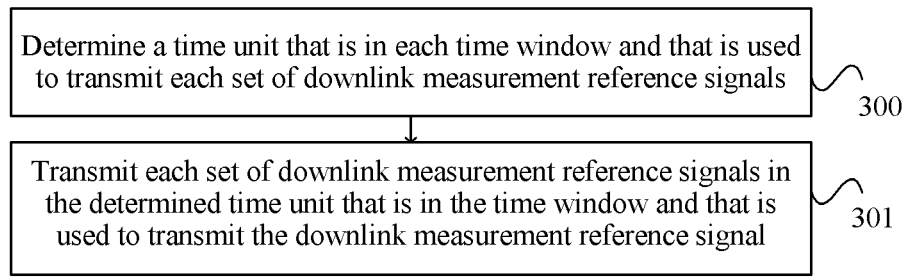
FIG. 9 is a schematic diagram of another signal sending method according to an embodiment of the present invention.

Further, when the device at the transmit end transmits the synchronization signal and/or the broadcast channel, the device at the transmit end may further transmit a downlink measurement reference signal. Specifically, FIG. 9 is a schematic diagram of another signal sending method according to an embodiment of the present invention. Referring to FIG. 9, the method includes the following steps.

Step 300: Determine a time unit that is in each time window and that is used to transmit each set of downlink measurement reference signals.

The determined time unit that is in each time window and that is used to transmit each set of downlink measurement reference signals includes at least one of: the $j^{th}$ time unit in each time window, a $(j+(\lfloor q/S \rfloor+1) \cdot S - q)^{th}$ time unit in each time window, or a $(j+q)^{th}$ time unit in each time window, where S is the quantity of time units included in each time window, q is a positive integer that is greater than or equal to 1 and that is less than or equal to S, and j is a positive integer that is greater than or equal to 1 and that is less than or equal to S.

Step 301: Transmit each set of downlink measurement reference signals in the determined time unit that is in the time window and that is used to transmit the downlink measurement reference signal.

According to the signal sending method provided in this embodiment, a time unit that is in each time window and that is used to transmit each set of downlink measurement reference signals is determined, where the determined time unit that is in each time window and that is used to transmit each set of downlink measurement reference signals includes at least one of: a $j^{th}$ time unit in each time window, a $(j+(\lfloor q/S \rfloor+1) \cdot S - q)^{th}$ time unit in each time window, or a $(j+q)^{th}$ time unit in each time window, S is a quantity of time units included in each time window, q is a positive integer that is greater than or equal to 1 and that is less than or equal to S, and j is a positive integer that is greater than or equal to 1 and that is less than or equal to S; and each set of downlink measurement reference signals is transmitted in the determined time unit that is in the time window and that is used to transmit the downlink measurement reference signal. Therefore, multiple sets of downlink measurement reference signals are always located in time units that have fixed locations in each time window, so that when performing measurement based on multiple sets of reference signals, a receive end can perform channel quality measurement on each set of reference signals in a designed predefined manner, thereby reducing complexity of performing measurement based on multiple sets of downlink measurement reference signals.

It should be noted that, the foregoing step 300 and step 301 may be performed at the same time as step 100 and step 101 shown in FIG. 7, or may be performed at the same time as step 100 and step 101 shown in FIG. 7 and step 200 and step 201 shown in FIG. 8, or may be performed at the same time as step 200 and step 201 shown in FIG. 8, or may be performed independently. No limitation is imposed herein.

For the downlink measurement reference signal, cyclic shift may be performed on a time unit in which multiple sets of downlink measurement reference signals are placed in a time division manner, so as to ensure that a time unit used to transmit each set of downlink measurement reference signals has a fixed location in each time window. Specifically, a feasible implementation is as follows:

Cyclic shift is performed on the determined time unit that is in the time window and that is used to transmit each set of downlink measurement reference signals, so that each set of downlink measurement reference signals is always transmitted in the $j^{th}$ time unit in each time window, and/or the $(j+q)^{th}$ time unit in each time window, and/or the $(j+(\lfloor q/S \rfloor+1) \cdot S - q)^{th}$ time unit in each time window:

$$t = \left\lfloor \frac{kq}{S} \right\rfloor \times S - \left\lfloor \left\lfloor \frac{kq}{S} \right\rfloor \times \frac{S}{q} \right\rfloor \times q,$$

where the cyclic shift is performing cyclic shift, by t time units, on time units corresponding to a $k^{th}$ time of transmission of q sets of the downlink measurement reference signals, q indicates a set quantity of downlink measurement reference signals in each time of transmission, k indicates the $k^{th}$ time of transmission, t indicates a quantity of time units by which cyclic shift is performed for each set of downlink measurement reference signals in each cyclic shift, and q, k, and t are all positive integers greater than 0.

Optionally, before step 301, the method further includes the following step:

Step 302: Send a value of q to the user equipment UE by using the broadcast channel.

Preferably, a time unit corresponding to each set of downlink measurement reference signals to be measured by the UE is configured for each UE by using higher layer signaling. For example, the transmit end configures, for the UE by using the higher layer signaling, a measurement time unit set corresponding to each set of downlink measurement reference signals, and the UE performs channel quality measurement on each set of downlink measurement reference signals in a time unit in the set.

Preferably, similar to processing of the synchronization signal or the broadcast channel, before transmitting the downlink measurement reference signal, the device at the transmit end also needs to determine a parameter related to transmission of the downlink measurement reference signal. Specifically, step 300 may have the following several feasible implementations:

Manner 1: Step 300a: Determine, according to preset downlink measurement reference signal information, the time unit that is in each time window and that is used to transmit each set of downlink measurement reference signals, where the preset downlink measurement reference signal information includes the time unit that is in each time window and that is used to transmit each set of downlink measurement reference signals.

Manner 2: Step 300b: Obtain updated downlink measurement reference signal information, and determine, according to the updated downlink measurement reference signal information, the time unit that is in each time window and that is used to transmit each set of downlink measurement reference signals, where the updated downlink measurement reference signal information includes the time unit that is in each time window and that is used to transmit each set of downlink measurement reference signals.

It should be noted that, for step 300a and step 300b, refer to related descriptions of step 100a and step 100b. That is, the device at the transmit end may determine, in a preset manner or in an obtaining manner, the time unit that is in each time window and that is used to transmit each set of downlink measurement reference signals. In addition, the preset downlink measurement reference signal information or the updated downlink measurement reference signal information may further include a parameter related to the time unit that is in each time window and that is used to transmit the downlink measurement reference signal, for example, j, q, or S.

By using specific embodiments, the following describes how to enable a synchronization signal, a broadcast channel, and a downlink measurement reference signal to be always located in a specific time unit in each time window. A PSS and/or an SSS are/is used as an example of the synchronization signal.

For example, a device at a transmit end may transmit a physical broadcast channel (Physical Broadcast Channel, PBCH for short), a downlink measurement reference signal (Downlink Measurement Reference Signal, DL-MRS for short), and a primary synchronization signal (Primary Synchronization Signal, PSS for short) and/or a secondary synchronization signal (Secondary Synchronization Signal, SSS for short) based on multiple resources in the following manner. The DL-MRS may be a cell-specific reference signal (CRS) or a channel state information reference signal (CSI-RS) in a current LTE system.

Figure 10A:
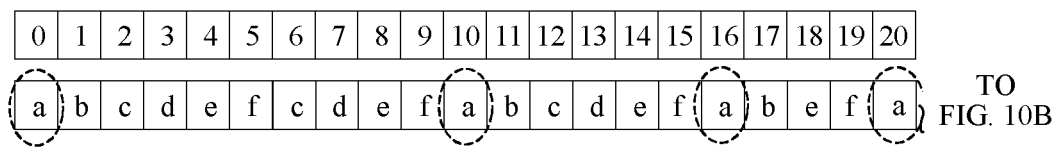
FIG. 10A and FIG. 10B are a schematic diagram of a transmission order of multiple resources according to an embodiment of the present invention.
Figure 10B:
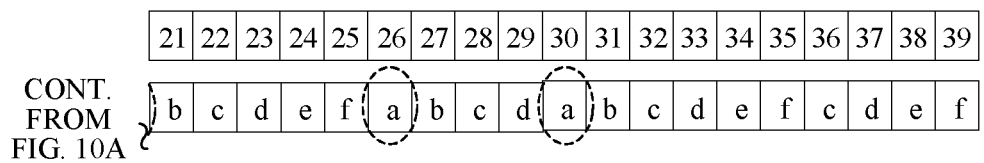

Specifically, it is assumed that a total quantity of resources is m. Time division transmission is performed on the PBCH, the DL-RS, the PSS and/or the SSS by using each resource. During transmission, the m resources need to correspond to different time units in a time window for transmission. That is, the first resource corresponds to the first time unit in a time window, the second resource corresponds to the second time unit in the time window, and the like. Each round of transmission is corresponding to one time window, and all resources need to be transmitted at least once in one round of transmission. To ensure that time units for placing the PBCH, the DL-RS, the PSS and/or the SSS have fixed locations during each round of transmission, a feasible manner is to perform shift on time units in each round of transmission. Specifically, a rule of a transmission order of the m resources in each round is concluded as follows: A transmission order in the first round is 0, 1, . . . , m−1; a transmission order in the second round is obtained by performing cyclic shift by $(\lfloor 2m/10 \rfloor \times 10 - \lfloor \lfloor 2m/10 \rfloor \times 10/m \rfloor \times m)$ time units relative to the first round; and a transmission order in the third round is obtained by performing cyclic shift by $(\lfloor 3m/10 \rfloor \times 10 - \lfloor \lfloor 3m/10 \rfloor \times 10/m \rfloor \times m)$ time units relative to the first round. By analogy, it can be learned that a transmission order in a $k^{th}$ ($k \geq 1$) round is obtained by performing cyclic shift by $(\lfloor km/10 \rfloor \times 10 - \lfloor \lfloor km/10 \rfloor \times 10/m \rfloor \times m)$ time units relative to the first round. For example, m=6. Resources are specifically a, b, c, d, e, and f. FIG. 10A and FIG. 10B are a schematic diagram of a transmission order of multiple resources according to an embodiment of the present invention. Referring to FIG. 10A and FIG. 10B, the following can be obtained by substituting 6 into the foregoing formula: A transmission order in the first round is a, b, c, d, e, and f. A transmission order in the second round is obtained by performing cyclic shift, by four time units (rightward) relative to the first round, on a transmission time unit corresponding to each resource, and a transmission order obtained after the shift is c, d, e, f, a, and b. A transmission order in the third round is also obtained by performing cyclic shift, by four time units (rightward) relative to the first round, on a transmission time unit corresponding to each resource, and a transmission order obtained after the shift is also c, d, e, f, a, and b. A transmission order in the fourth round is obtained by performing cyclic shift, by two time units (rightward) relative to the first round, on a transmission time unit corresponding to each resource, and a transmission order obtained after the shift is e, f, a, b, c, and d. A transmission order in the fifth round is obtained by performing cyclic shift, by two time units (rightward) relative to the first round, on a transmission time unit corresponding to each resource, and a transmission order obtained after the shift is also e, f, a, b, c, and d. A transmission order in the sixth round is obtained by performing cyclic shift by zero time units relative to the first round, and a transmission order obtained after the shift is a, b, c, d, e, and f. After the foregoing shift is performed, it can be learned by referring to FIG. 10A and FIG. 10B that, from a perspective of each time window, for example, because one radio frame in FIG. 10A and FIG. 10B is corresponding to one time window, and one radio frame includes 10 subframes, it can be learned by referring to FIG. 10A and FIG. 10B that subframes whose numbers are 0 to 9 belong to a same radio frame, subframes whose numbers are 10 to 19 belong to a same radio frame, subframes whose numbers are 20 to 29 belong to a same radio frame, and subframes whose numbers are 30 to 39 belong to a same radio frame. Correspondingly, after the foregoing shift is performed, it can be learned that subframes whose numbers are 0 to 5 in the first radio frame are respectively corresponding to six resources: a, b, c, d, e, and f; subframes whose numbers are 10 to 15 in the second radio frame are respectively corresponding to six resources: a, b, c, d, e, and f; subframes whose numbers are 20 to 25 in the third radio frame are respectively corresponding to six resources: a, b, c, d, e, and f; and the like. It can be learned that, after the foregoing shift is performed, the m resources can be always located in m subframes in each radio frame, so that multiple resources are transmitted at fixed locations during implementation of each round of transmission. Certainly, locations in which the m resources are always located in each radio frame may be first m subframes in the radio frame, or may be last m subframes in the radio frame, or may be any m consecutive subframes in the radio frame. In this embodiment, specific locations of the m subframes in a radio frame to which the m subframes belong are not limited. Further, each resource may be used to transmit the PBCH, the DL-RS, the PSS and/or the SSS. In an example of the PSS and/or the SSS, a location of a time unit in which a $j^{th}$ resource used to transmit the PSS and/or the SSS may appear is a $j^{th}$ time unit, and/or a $(j+(\lfloor m/S \rfloor+1) \cdot S-m)^{th}$ time unit, and/or a $(j+m)^{th}$ time unit. For example, still referring to FIG. 10A and FIG. 10B, the first resource a corresponding to transmission of the PSS and/or the SSS is used as an example. A time unit used to transmit the PSS and/or the SSS in the first radio frame is the zero$^{th}$ time unit (a subframe whose number is 0); time units used to transmit the PSS and/or the SSS in the second radio frame are the zero$^{th}$ time unit (a subframe whose number is 10) and the sixth time unit (a subframe whose number is 16); time units used to transmit the PSS and/or the SSS in the third radio frame are the zero$^{th}$ time unit (a subframe whose number is 20) and the sixth time unit (a subframe whose number is 26); and the like.

In an example of the PBCH, it can be learned by referring to the foregoing description that a location of a time unit in which a $j^{th}$ resource used to transmit the PBCH may appear is a $j^{th}$ time unit in each time window for transmitting the PBCH.

It should be noted that, based on a characteristic of the PBCH, the $j^{th}$ resource of the PBCH is always sent in a $j^{th}$ subframe in each radio frame for transmitting the PBCH. That is, a PBCH on the first resource is sent in the first subframe in each radio frame for transmitting the PBCH, and a corresponding user group performs blind detection in a corresponding subframe. A PBCH on the second resource is sent in the second subframe in each radio frame for transmitting the PBCH, and a corresponding user group performs blind detection in a corresponding subframe.

In an example of the DL-RS, it can be learned by referring to the foregoing description that, a location of a time unit in which a $j^{th}$ resource used to transmit the DL-RS may appear is $j^{th}$ time unit, and/or a) $(j+q)^{th}$ time unit, and/or a $(j+(\lfloor q/S \rfloor+1) \cdot S-q)^{th}$ time unit.

Further, for the DL-RS, when one time window includes only one radio subframe, for the $j^{th}$ resource of the DL-RS, downlink channel quality measurement is performed on the $j^{th}$ resource in a subframe set {j, j+q/10+j/j+10−q, j+2q/20+j/j+2(10−q), . . . }, where j+q/10+j/j+10−q represents one of a subframe whose number is j+q, a subframe whose number is 10+j, or a subframe whose number is j+10−q. A user performs detection in the three subframes, and when detecting a resource j, the user performs corresponding channel quality measurement (including an operation such as performing moving average on measurement values) in the subframe. For example, in FIG. 10A and FIG. 10B, corresponding channel quality measurement is performed on a resource a in a subframe set {0, 10, 16, 20, 26, . . . }, a resource b in a subframe set {1, 11, 17, 21, 27, . . . }, a resource c in a subframe set {2, 6, 12, 22, 28, . . . }, a resource d in a subframe set {3, 7, 13, 23, 29, . . . }, a resource e in a subframe set {4, 8, 14, 18, 24, . . . }, and a resource f in a subframe set {5, 9, 15, 19, 25, . . . }. A channel quality measurement value may be channel quality information (Channel Quality Indicator, CQI for short), reference signal received power (Reference Signal Received Power, RSRP for short), reference signal received quality (Reference Signal Received Quality, RSRQ for short), or the like.

When one time window includes multiple radio subframes, for the $j^{th}$ resource of the DL-RS, downlink channel quality measurement is performed on the $j^{th}$ resource in a subframe set {j, j+q/ j+($\lfloor q/10 \rfloor$+1)×10 / j+($\lfloor q/10 \rfloor$+1)×10−q, j+2q/ j+($\lfloor q/10 \rfloor$+1)×20 / j+($\lfloor q/10 \rfloor$+1)×20−q, . . . }, where j+q/j+($\lfloor q/10 \rfloor$+1)×10/j+($\lfloor q/10 \rfloor$+1)×10−q represents one of a subframe whose number is j+q, a subframe whose number is j+($\lfloor q/10 \rfloor$+1)+1)×10, or a subframe whose number is j+($\lfloor q/10 \rfloor$+1)×10−q. A user performs detection in the three subframes, and when detecting a resource j, the user performs corresponding channel quality measurement (including an operation such as performing moving average on measurement values) in the subframe, where q is a positive integer that is greater than or equal to 1 and that is less than or equal to S, for example, q may be a quantity/set quantity of different downlink measurement reference signals transmitted in each time window, S is a quantity of time units included in each time window, and j is a positive integer that is greater than or equal to 1 and that is less than or equal to S.

Figure 11:
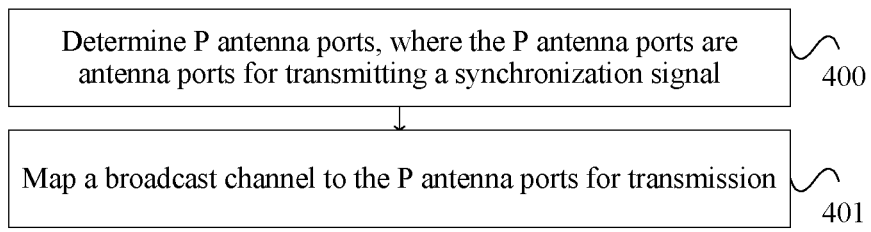
FIG. 11 is a schematic diagram of another signal sending method according to an embodiment of the present invention.

Further, to reduce complexity during detection by a device at a receive end, and to reduce pilot overheads and design, an embodiment of the present invention provides a solution of demodulating a broadcast channel based on a synchronization signal resource. Specifically, FIG. 11 is a schematic diagram of another signal sending method according to an embodiment of the present invention. Referring to FIG. 11, the method includes the following steps:

Step 400: Determine P antenna ports, where the P antenna ports are antenna ports for transmitting a synchronization signal.

Step 401: Map a broadcast channel to the P antenna ports for transmission.

According to the signal sending method provided in this embodiment of the present invention, P antenna ports are determined, where the P antenna ports are antenna ports for transmitting a synchronization signal; and a broadcast channel is mapped to the P antenna ports for transmission. Therefore, a broadcast channel is transmitted based on a synchronization signal resource, so that a device at a receive end demodulates the broadcast channel according to the synchronization signal resource, thereby reducing complexity of detecting, by the device at the receive end, synchronization signal resources and broadcast channels that are separately corresponding to multiple resources, and avoiding a case in which the device at the receive end separately demodulates a synchronization signal and a broadcast channel based on different resources. In addition, because there is no need to design a new broadcast-channel dedicated demodulation pilot again, overheads and design of a broadcast-channel demodulation pilot are reduced.

Further, a feasible implementation of step 401 is as follows:

Step 401a: Separately map, in an $i^{th}$ time unit in each time window, the broadcast channel to the P antenna ports for transmission.

It should be noted that a device at a transmit end simultaneously separately maps, in the $i^{th}$ time unit in each time window, the synchronization signal to the P antenna ports for transmission.

Specifically, a transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

Several feasible implementations of step 400 are as follows:

Manner 1: Step 400a: Determine the P antenna ports according to preset antenna port information, where the preset antenna port information includes a correspondence between the P antenna ports and the synchronization signal.

Manner 2: Step 400b: Obtain updated antenna port information, and determine the P antenna ports according to the updated antenna port information, where the updated antenna port information includes a correspondence between the P antenna ports and the synchronization signal.

An objective of the embodiment corresponding to FIG. 11 is to demodulate a broadcast channel on each resource based on a synchronization signal. In the following, a PBCH is used as an example of a broadcast channel and a PSS/SSS is used as an example of a synchronization signal, to describe such a binding manner. A total quantity of resources is m. When performing transmission based on multiple resources, a base station demodulates a PBCH on a $j^{th}$ resource based on a PSS/SSS signal on the $j^{th}$ resource. That is, on each resource, a PBCH is bound to a PSS/SSS. A transmission cycle of the PSS/SSS is less than or equal to a transmission cycle of the PBCH. Alternatively, an interval between two adjacent times of transmission of the PSS/SSS on each resource is less than or equal to a time interval between two adjacent times of transmission of a corresponding PBCH. For example, in Embodiment 1, a PSS/SSS on a $j^{th}$ resource is located in a subframe whose number is j, j+10−m, or j+m in each frame, and an interval between two adjacent times of transmission of the PSS/SSS is m/(10−m)/10. A PBCH on the $j^{th}$ resource is always located in a $j^{th}$ subframe in each frame, and an interval between two adjacent times of transmission of the PBCH is 10. Optionally, the transmission cycle of the PSS/SSS may be set to P, the transmission cycle of the PBCH may be set to Q, and P≤Q.

Figure 12A:
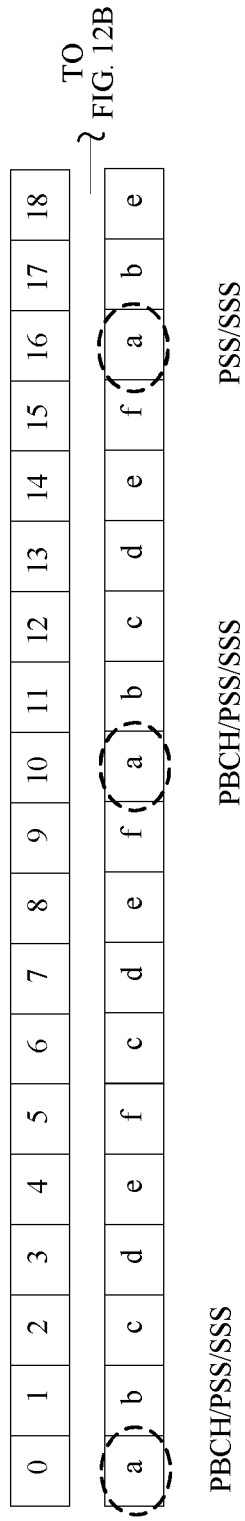
Figure 12B:
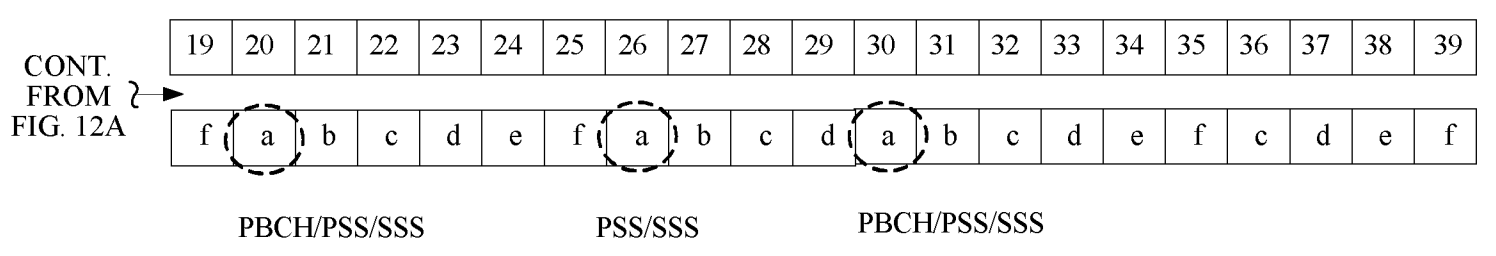

The device at the transmit end may transmit a PBCH/PSS/SSS based on m resources and according to the foregoing transmission moment manner and a corresponding transmission cycle. For example, a quantity m of resources is equal to 6. FIG. 12A and FIG. 12B are a schematic diagram of a transmission moment according to an embodiment of the present invention.

Referring to FIG. 12A and FIG. 12B, a moment marked with a PBCH/PS S/S SS is a moment at which both a PBCH and a PSS/SSS are transmitted, and a moment marked with a PS S/SSS is a moment at which only a PSS/SSS is transmitted and no PBCH is transmitted.

The receive end demodulates, based on a PSS/SSS at the $zero^{th}$ moment in FIG. 12A and FIG. 12B, a PBCH at the $zero^{th}$ moment; demodulates, based on a PSS/SSS at the tenth moment, a PBCH at the tenth moment; and the like.

Preferably, in this embodiment of the present invention, a preferred implementation of a solution in which the device at the transmit end transmits the synchronization signal is as follows:

mapping, in at least two symbols in the $i^{th}$ time unit in each time window, the synchronization signal to the P antenna ports for transmission.

The symbol is a unit of time that is smaller than the time unit.

Figure 13:
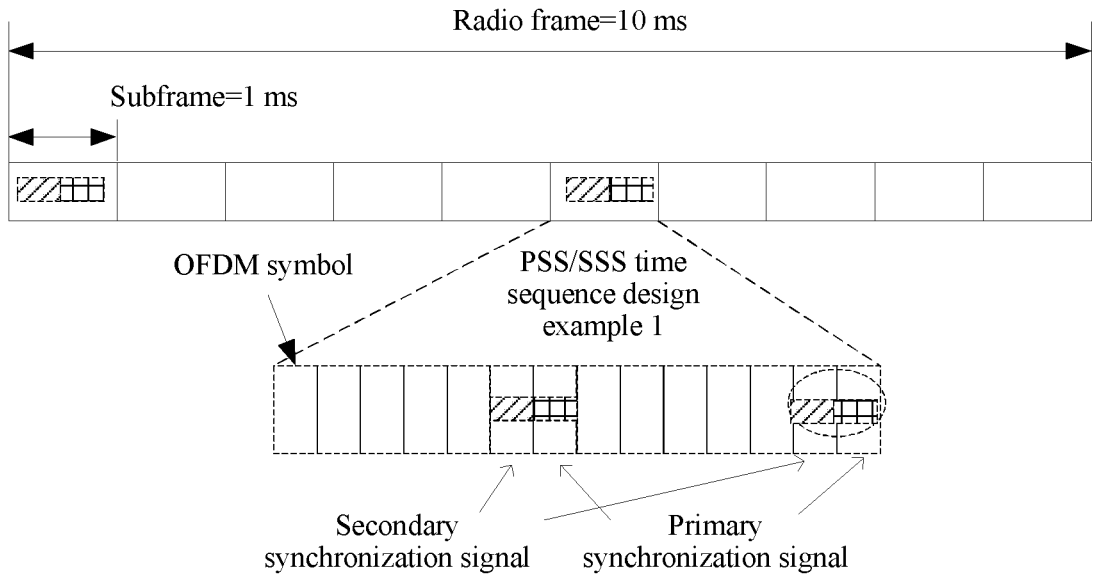
FIG. 13 and FIG. 14 are schematic diagrams of a time-domain structure of a synchronization signal according to an embodiment of the present invention.
Figure 14:
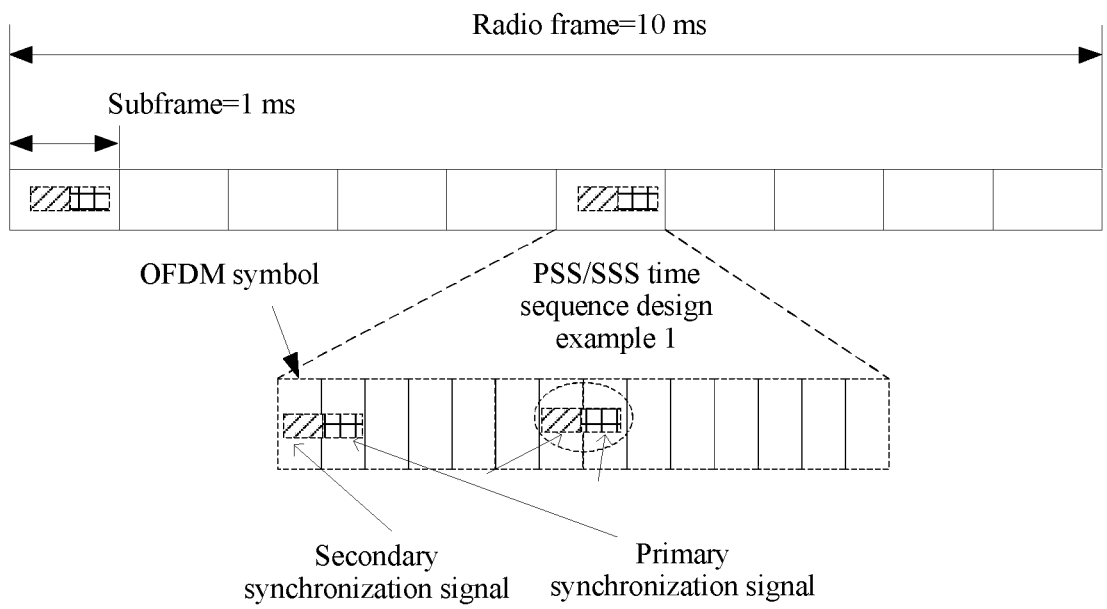

Further, by using specific embodiments and examples, the following describes how to arrange a synchronization signal in at least two symbols in an $i^{th}$ time unit. Specifically, the symbol is an orthogonal frequency division multiplexing (OFDM) symbol. FIG. 13 and FIG. 14 are schematic diagrams of a time-domain structure of a synchronization signal according to an embodiment of the present invention. In a current 3GPP standard, density of a PSS/SSS is located only in the last two OFDM symbols in the first timeslot in a subframe in which the PSS/SSS is located. In design of FIG. 13, in FDD, density of an expanded PSS/SSS is located in the last two OFDM symbols in the first timeslot and the second timeslot in a subframe in which the PSS/SSS is located. Specifically, the SSS is located in the penultimate OFDM symbol in each timeslot, and the PSS is located in the last OFDM symbol in each timeslot. Optionally, design of FIG. 14 may be used. That is, the PSS/SSS is located in the first two OFDM symbols in the first timeslot and the second timeslot of a frame in which the PSS/SSS is located. Specifically, the SSS is located in the first OFDM symbol in each timeslot, and the PSS is located in the second OFDM symbol in each timeslot. In the two design solutions, relative locations of the PSS/SSS in two timeslots are symmetric. In addition, there is another method for increasing time domain density of a PSS/SSS.

Figure 15:
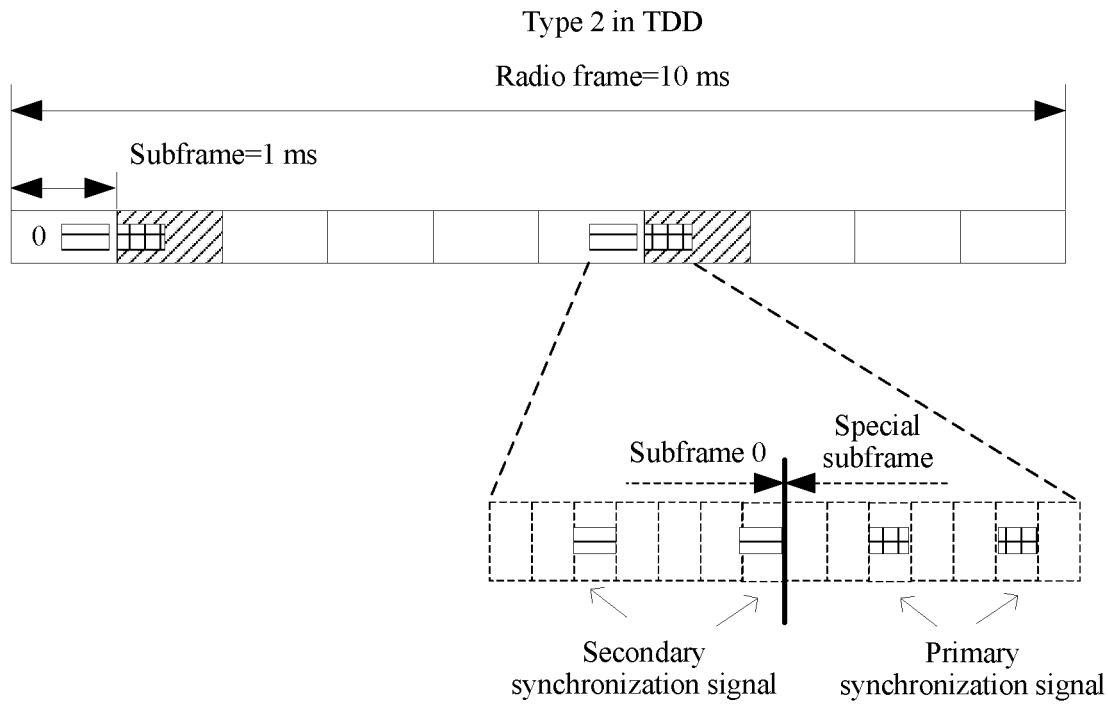
FIG. 15 and FIG. 16 are schematic diagrams of another time-domain structure of a synchronization signal according to an embodiment of the present invention.
Figure 16:
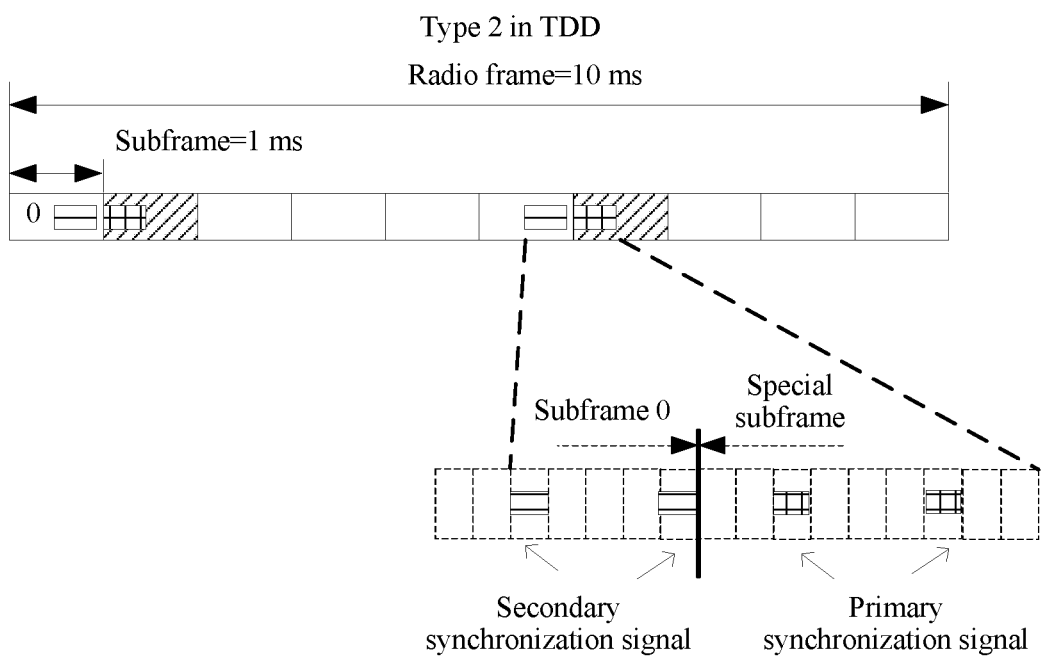

FIG. 15 and FIG. 16 are schematic diagrams of another time-domain structure of a synchronization signal according to an embodiment of the present invention. Referring to FIG. 15 and FIG. 16, in TDD, time domain density of a PSS and time domain density of an SSS are respectively increased in a subframe 0/5 and a special subframe. In TDD of a type 2, an SSS is located in the last OFDM symbol in a subframe 0 or 5 in each frame, and a PSS is located in the third OFDM symbol in a downlink pilot timeslot (DWPTS) of a special subframe adjacent to the subframe 0 or 5. Design of an expanded PSS/SSS in TDD is shown in FIG. 10A and FIG. 10B, the SSS is located in the third OFDM symbol and the last OFDM symbol in a subframe 0 or 5, and the PSS is located in the first OFDM symbol and the third OFDM symbol in a special subframe adjacent to the subframe 0 or 5. Optionally, design of FIG. 16 may be used. The SSS is located in the third OFDM symbol and the last OFDM symbol in a subframe 0 or 5, and the PSS is located in the third OFDM symbol and the seventh OFDM symbol in a special subframe adjacent to the subframe 0 or 5 (when a DwPTS in the special subframe includes nine or more OFDM symbols). In addition, the PSS may be placed in the third OFDM symbol and the sixth or the eighth OFDM symbol in the special subframe adjacent to the subframe 0 or 5.

Figure 17:
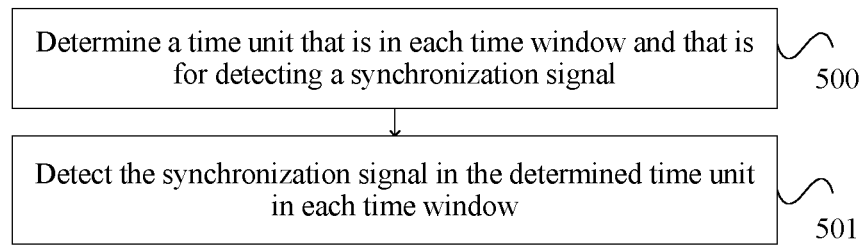
FIG. 17 is a schematic diagram of a signal detection method according to an embodiment of the present invention.

Corresponding to the embodiments of the transmit end in FIG. 7 to FIG. 16, the following describes a signal detection method at a receive end in embodiments of the present invention by using specific embodiments. FIG. 17 is a schematic diagram of a signal detection method according to an embodiment of the present invention. An execution body of the method may use a structure of the apparatus shown in FIG. 4, FIG. 5, or FIG. 6. The apparatus may be a device at the receive end, and the device may be UE, a remote radio unit (RRU), or any other receiving device. Referring to FIG. 17, the method includes the following steps.

Step 500: Determine a time unit that is in each time window and that is for detecting a synchronization signal.

The determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S.

Step 501: Detect the synchronization signal in the determined time unit in each time window.

According to the signal detection method provided in this embodiment, a time unit that is in each time window and that is for detecting a synchronization signal is determined, where the determined time unit includes at least one of: a $j^{th}$ time unit in each time window, a $(j+(\lfloor m/S \rfloor+1) \cdot S-m)^{th}$ time unit in each time window, or a $(j+m)^{th}$ time unit in each time window, S is a quantity of time units included in each time window, m is a positive integer that is greater than or equal to 1 and that is less than or equal to S, and j is a positive integer that is greater than or equal to 1 and that is less than or equal to S; and the synchronization signal is detected in the determined time unit in each time window. Therefore, a synchronization signal is always located in a time unit that has a fixed location in each time window, so that when detecting the synchronization signal, a device at a receive end needs to perform detection only in a fixed time unit in each time window, thereby reducing complexity of designing the synchronization signal, and complexity of performing detection by the device at the receive end.

It can be learned by referring to the embodiment corresponding to FIG. 7 that, in one time window, there may be three time units that are used to accommodate a synchronization signal. Synchronization signals in the three time units need to be distinguished. For a specific solution of distinguishing the synchronization signals, refer to the embodiment corresponding to FIG. 7. Details are not described herein again.

Optionally, before step 500, the method further includes:

Step 502: Obtain a value of m that is broadcasted by a transmit end.

Specifically, to accurately detect the synchronization signals in time units at the foregoing three locations, the device at the receive end needs to know the value of m. A feasible implementation is that the device at the receive end obtains, by means of blind detection, the value of m that is broadcasted by the transmit end. Alternatively, another feasible implementation is that the value of m is preset in the device at the receive end, and when the device at the receive end needs to perform corresponding detection, the device at the receive end invokes the value of m.

Preferably, step 500 shown in FIG. 17 may have the following several feasible implementations:

Manner 1: Determine, according to preset synchronization signal information, the time unit that is in each time window and that is for detecting the synchronization signal, where the preset synchronization signal information includes the time unit that is in each time window and that is for detecting the synchronization signal.

A preset manner is used in step 500*a*. The time unit that is in each time window and that is for detecting the synchronization signal is preset in a storage medium of the device at the receive end, and when the synchronization signal needs to be detected, synchronization signal information that is preset in the storage medium is invoked, and the synchronization signal is detected. Optionally, the preset synchronization signal information may further include parameters such as S and m.

Manner 2: Step 500*b*: Obtain updated synchronization signal information, and determine, according to the updated synchronization signal information, the time unit that is in each time window and that is for detecting the synchronization signal, where the updated synchronization signal information includes the time unit that is in each time window and that is for detecting the synchronization signal.

In step 500*b*, when the device at the receive end has a corresponding computation function, the device at the receive end may generate the updated synchronization signal information according to a system requirement, or the device at the receive end receives the updated synchronization signal information sent by a system control device. Further, the device at the receive end may actively obtain the updated synchronization signal information from the control device, or may wait for the control device to configure the updated synchronization signal information. No limitation is imposed herein. Optionally, the updated synchronization signal information may further include parameters such as S and m.

Figure 18:
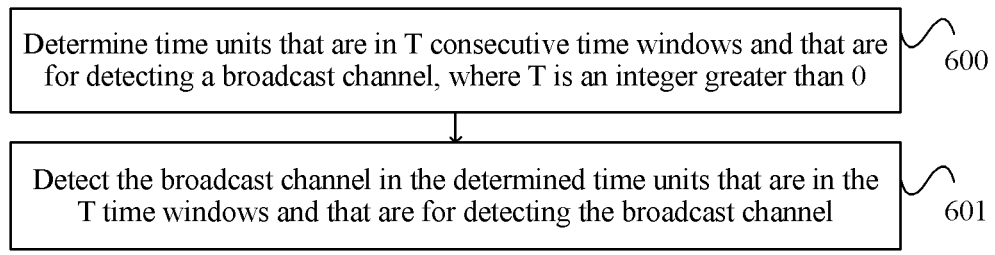
FIG. 18 is a schematic diagram of another signal detection method according to an embodiment of the present invention.

Further, when the device at the receive end detects the synchronization signal, the device at the receive end may further detect a broadcast channel. FIG. 18 is a schematic diagram of another signal detection method according to an embodiment of the present invention. Referring to FIG. 18, the method includes the following steps.

Step 600: Determine time units that are in T consecutive time windows and that are for detecting a broadcast channel, where T is an integer greater than 0.

The time units that are in the T time windows and that are for detecting the broadcast channel are $j^{th}$ time units in all the time windows, j is a positive integer that is greater than or equal to 1 and that is less than or equal to S, and S is a quantity of time units included in each time window.

Step 601: Detect the broadcast channel in the determined time units that are in the T time windows and that are for detecting the broadcast channel.

According to the signal detection method provided in this embodiment, time units that are in T consecutive time windows and that are for detecting a broadcast channel are determined, where T is an integer greater than 0, the time units that are in the T time windows and that are for detecting the broadcast channel are $j^{th}$ time units in all the time windows, j is a positive integer that is greater than or equal to 1 and that is less than or equal to S, and S is a quantity of time units included in each time window; and the broadcast channel is detected in the determined time units that are in the T time windows and that are for detecting the broadcast channel. Therefore, a broadcast channel is always located in a time unit that has a fixed location in each time window, so that when detecting the broadcast channel, a device at a receive end needs to perform detection only in a fixed time unit in each time window, thereby reducing complexity of designing the broadcast channel, and complexity of performing detection by the device at the receive end.

It should be noted that the foregoing step 600 and step 601 may be performed at the same time as step 500 and step 501 shown in FIG. 17, or may be performed independently. No limitation is imposed herein.

Preferably, all broadcast channels in a cell are located in r time units in each time window, the r time units have fixed locations in each time window, and r is a positive integer that is greater than or equal to 1 and that is less than or equal to S.

It should be noted that r may be equal to or different from the value of m.

Before step 601, the method further includes the following step:

Step 602: Obtain a value of r that is broadcasted by the transmit end.

Specifically, a manner of obtaining the value of r is similar to step 502, and details are not described herein again.

Preferably, similar to processing of the synchronization signal, before detecting the broadcast channel, the device at the receive end also needs to determine a parameter related to detection of the broadcast channel. Specifically, step 600 may have the following several feasible implementations:

Manner 1: Step 600*a*: Determine, according to preset broadcast channel information, the time units that are in the T consecutive time windows and that are for detecting the broadcast channel, where the preset broadcast channel information includes: a quantity T of the time windows, and a time unit that is in each time window and that is for detecting the broadcast channel.

Manner 2: Step 600*b*: Obtain updated broadcast channel information, and determine, according to the updated broadcast channel information, the time units that are in the T consecutive time windows and that are for detecting the broadcast channel, where the updated broadcast channel information includes: a quantity T of the time windows, and a time unit that is in each time window and that is for detecting the broadcast channel.

It should be noted that, for step 600*a* and step 600*b*, refer to related descriptions of step 500*a* and step 500*b*. That is, the device at the receive end may determine, in a preset manner or in an obtaining manner, the quantity T of the time windows and the time unit that is in each time window and that is for detecting the broadcast channel. In addition, the preset broadcast channel information or the updated broadcast channel information may further include a parameter related to the quantity T of the time windows and the time unit that is in each time window and that is for detecting the broadcast channel, for example, j.

Figure 19:
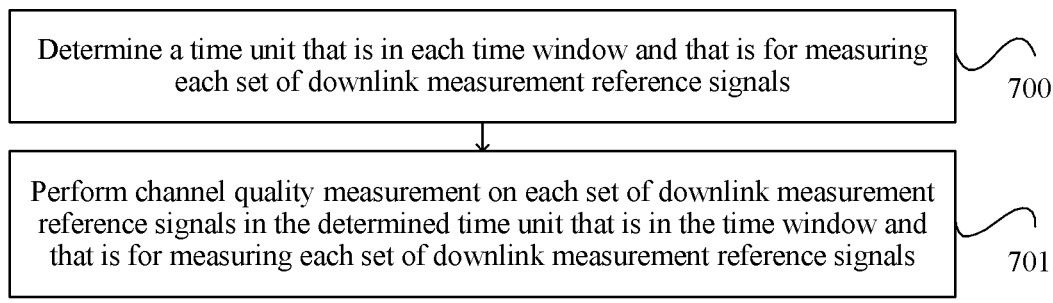
FIG. 19 is a schematic diagram of another signal detection method according to an embodiment of the present invention.

Further, when the device at the receive end detects the synchronization signal and/or the broadcast channel, the device at the receive end may further measure a downlink measurement reference signal. Specifically, FIG. 19 is a schematic diagram of another signal detection method according to an embodiment of the present invention. Referring to FIG. 19, the method includes the following steps.

Step 700: Determine a time unit that is in each time window and that is for measuring each set of downlink measurement reference signals.

The determined time unit that is in each time window and that is for measuring each set of downlink measurement reference signals includes at least one of: the $j^{th}$ time unit in each time window, a $(j+(\lfloor q/S \rfloor+1) \cdot S-q)^{th}$ time unit in each time window, or a $(j+q)^{th}$ time unit in each time window, q is a positive integer that is greater than or equal to 1 and that is less than or equal to S, S is the quantity of time units included in each time window, q is a positive integer that is greater than or equal to 1 and that is less than or equal to S, and j is a positive integer that is greater than or equal to 1 and that is less than or equal to S.

Step 701: Perform channel quality measurement on each set of downlink measurement reference signals in the determined time unit that is in the time window and that is for measuring each set of downlink measurement reference signals.

According to the signal detection method provided in this embodiment, a time unit that is in each time window and that is for measuring each set of downlink measurement reference signals is determined, where the determined time unit that is in each time window and that is for measuring each set of downlink measurement reference signals includes at least one of: a $j^{th}$ time unit in each time window, a $(j+(\lfloor q/S \rfloor+1) \cdot S-q)^{th}$ time unit in each time window, or a $(j+q)^{th}$ time unit in each time window, q is a positive integer that is greater than or equal to 1 and that is less than or equal to S, S is a quantity of time units included in each time window, q is a positive integer that is greater than or equal to 1 and that is less than or equal to S, and j is a positive integer that is greater than or equal to 1 and that is less than or equal to S; and channel quality measurement is performed on each set of downlink measurement reference signals in the determined time unit that is in the time window and that is for measuring each set of downlink measurement reference signals. Therefore, multiple sets of downlink measurement reference signals are always located in time units that have fixed locations in each time window, so that when receiving and measuring each set of measurement reference signals, a receive end can perform channel quality measurement on each set of reference signals in a designed predefined manner, thereby reducing complexity of performing measurement based on multiple sets of downlink measurement reference signals.

It should be noted that the foregoing step 700 and step 701 may be performed at the same time as step 500 and step 501 shown in FIG. 17, or may be performed at the same time as step 500 and step 501 shown in FIG. 17 and step 600 and step 601 shown in FIG. 18, or may be performed at the same time as step 600 and step 601 shown in FIG. 18, or may be performed independently. No limitation is imposed herein.

Optionally, before step 701, the method further includes the following step:

Step 702: Obtain q that is broadcasted by the transmit end.

Preferably, channel quality measurement is performed on the downlink measurement reference signal in a time unit that is configured by the transmit end by using higher layer signaling and that is corresponding to each set of downlink measurement reference signals.

Preferably, similar to processing of the synchronization signal or the broadcast channel, before detecting or measuring a downlink measurement reference signal, the device at the receive end also needs to determine a parameter related to detection or measurement of the downlink measurement reference signal. Specifically, step 700 may have the following several feasible implementations:

Manner 1: Step 700*a*: Determine, according to preset downlink measurement reference signal information, the time unit that is in each time window and that is for measuring each set of downlink measurement reference signals, where the preset downlink measurement reference signal information includes the time unit that is in each time window and that is for measuring each set of downlink measurement reference signals.

Manner 2: Step 700*b*: Obtain updated downlink measurement reference signal information, and determine, according to the updated downlink measurement reference signal information, the time unit that is in each time window and that is for measuring each set of downlink measurement reference signals, where the updated downlink measurement reference signal information includes the time unit that is in each time window and that is for measuring each set of downlink measurement reference signals.

It should be noted that, for step 700a and step 700b, refer to related descriptions of step 500a and step 500b. That is, the device at the receive end may determine, in a preset manner or in an obtaining manner, the time unit that is in each time window and that is used to measure each set of downlink measurement reference signals. In addition, the preset broadcast channel information or the updated broadcast channel information may further include a parameter related to the time unit that is in each time window and that is used to measure each set of downlink measurement reference signals, for example, j, q, and S.

In the embodiments corresponding to FIG. 17 to FIG. 19, a time window may be corresponding to one or more radio frames. According to a radio frame standard in the prior art, each radio frame includes 10 subframes, and the subframe may be considered as a type of time unit. By using specific examples, the following describes the foregoing embodiments in a form of a radio frame and a subframe.

A device at a transmit end may transmit a PBCH, a DL-RS, a PSS and/or an SSS based on multiple resources in the foregoing manner. Details are not described herein again.

Further, for a multi-resource-based sending manner, there may be two scenarios: A total quantity of resources is greater than a quantity of subframes in a radio frame, or a total quantity of resources is less than or equal to a quantity of subframes in a radio frame. Based on the embodiments corresponding to FIG. 17 to FIG. 19, for the two scenarios, the following describes the signal detection method provided in the embodiments of the present invention.

Scenario 1: A quantity of resources is less than or equal to a quantity of subframes in each frame.

For example, a broadcast channel is a PBCH. A $j^{th}$ resource of the PBCH is always sent in a $j^{th}$ subframe in each frame for transmitting the PBCH. That is, a PBCH on the first resource is sent in the first subframe in each frame for transmitting the PBCH, and a corresponding user group performs blind detection in a corresponding subframe. A PBCH on the second resource is sent in the second subframe in each frame for transmitting the PBCH, and a corresponding user group performs blind detection in a corresponding subframe; and the like.

Figure 20:
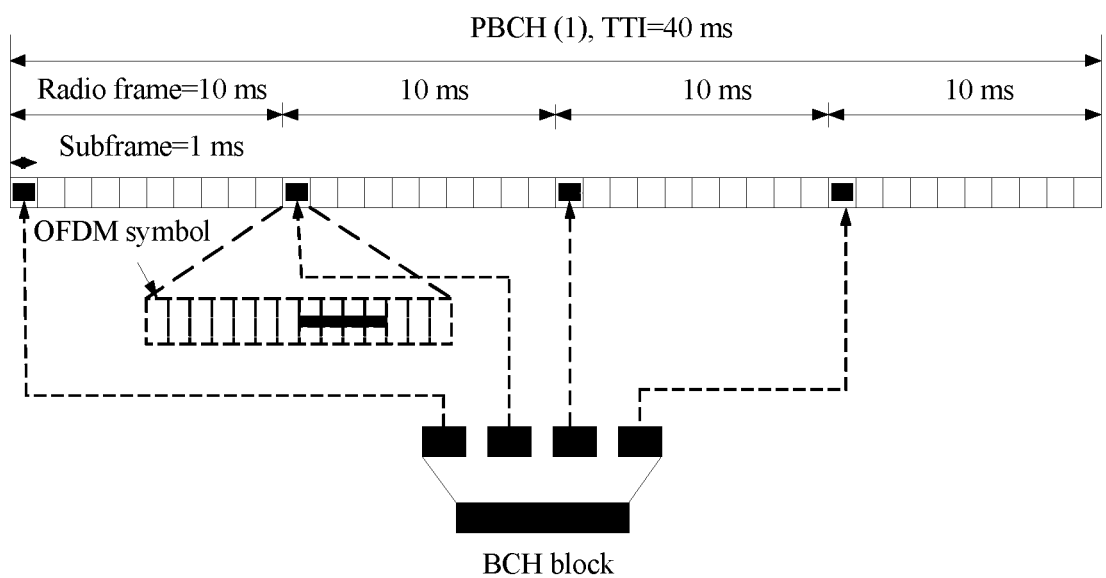
FIG. 20 is a schematic diagram of broadcast channel transmission according to an embodiment of the present invention.

FIG. 20 is a schematic diagram of broadcast channel transmission according to an embodiment of the present invention. In an example of FIG. 20, a transmission cycle is 40 ms and a quantity of resources is less than or equal to a quantity of subframes in each radio frame, and a schematic diagram of transmission of the first resource of the PBCH is provided. An encoded broadcast channel (broadcast channel, BCH for short) block is always located in the first subframe in each frame for transmitting the PBCH.

Figure 21A:
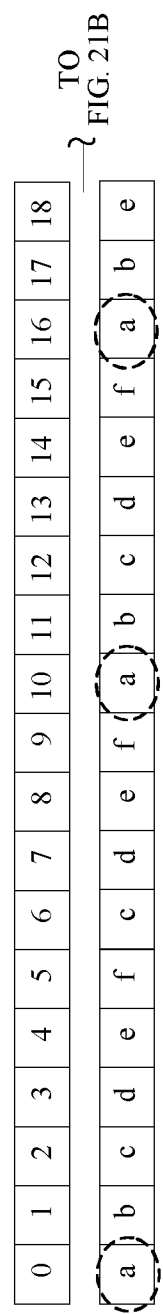

Further, for example, a synchronization signal is a PSS/SSS, and a quantity of resources is 6. FIG. 21A and FIG. 21B are a schematic diagram of a transmission moment sequence according to an embodiment of the present invention. Referring to FIG. 21A and FIG. 21B and the foregoing descriptions related to the synchronization signal, a $j^{th}$ resource of the PSS/SSS is always located in one or more of a subframe whose number is j, a subframe whose number is j+10−m, or a subframe whose number is j+m in each frame for transmitting the PSS/SSS, and m is a quantity of different PSS/SSS resources in each frame for transmitting the PSS/SSS. Multiple times of transmission of each resource in one transmission cycle may be non-uniform, and FIG. 21A and FIG. 21B provide a possible transmission moment sequence form.

It can be learned from FIG. 21A and FIG. 21B that, subframe numbers of frames corresponding to a resource a in a cycle of 30 ms are {0, 0, 6, 0, 6}; subframe numbers of frames corresponding to a resource b in the cycle of 30 ms are {1, 1, 7, 1, 7}; subframe numbers of frames corresponding to a resource c in the cycle of 30 ms are {2, 6, 2, 2, 8}; subframe numbers of frames corresponding to a resource d in the cycle of 30 ms are {3, 7, 3, 3, 9}; subframe numbers of frames corresponding to a resource e in the cycle of 30 ms are {4, 8, 4, 8, 4}; and subframe numbers of frames corresponding to a resource f in the cycle of 30 ms are {5, 9, 5, 9, 5}. It can be learned from FIG. 21A and FIG. 21B that the resource a is transmitted for the first time in a subframe whose number is 0 in the first frame, is transmitted for the second time in a subframe whose number is 0 in the second frame, and is transmitted for the third time in subframe whose number is 6 in the second frame. Therefore, multiple times of transmission in one transmission cycle are non-uniform.

Specifically, SSSs sent based on m resources are formed by interleaving three sequences whose lengths are 31, and different sequences are used for distinguishing three secondary synchronization subframes (j, j+m, j+10−m) in 10 ms. A specific implementation has been provided above for how to use a sequence for distinguishing, and details are not described herein again.

Similarly, for a subframe set of the $j^{th}$ resource of a DL-RS, refer to the embodiment corresponding to the transmit end. Details are not described herein again.

The quantity of resources may be cell-specific, that is, different cells have different quantities of resources. The quantity of resources is notified to a corresponding user group by means of broadcasting. For example, the quantity of resources is notified by using the PBCH, and a user obtains the value by performing blind detection on a PBCH on a corresponding resource. Alternatively, a user obtains the quantity of resources by performing N (N≥2) consecutive times of blind detection on a corresponding PSS/SSS resource. In the foregoing example, any user may learn, by performing three consecutive times of blind detection, that the quantity of resources is 6.

Scenario 2: A quantity of resources is greater than a quantity of subframes in each frame.

Figure 22:
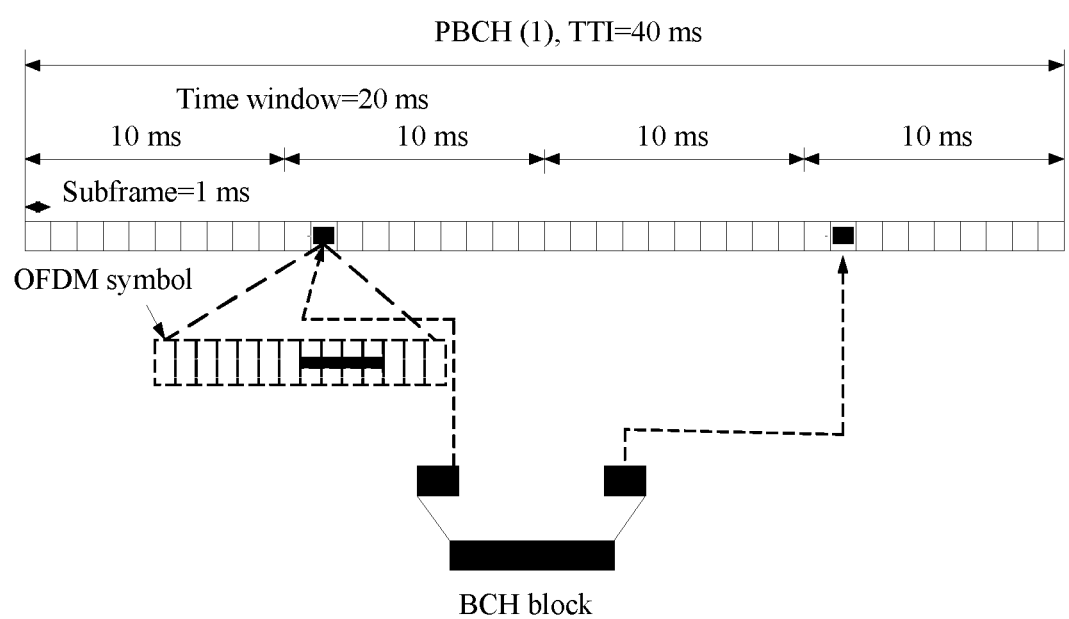
FIG. 22 is a schematic diagram of another broadcast channel transmission according to an embodiment of the present invention.

It is assumed that the total quantity of resources is M (>10), and a PBCH is used as an example. A $j^{th}$ resource of the PBCH is always sent in a $j^{th}$ subframe in [0, (floor(M/10)+1)×10−1] subframes, and the $j^{th}$ subframe is an absolute subframe in subframes whose numbers are 0 to (floor(M/10)+1)×10−1. For example, when a value of M is 15, the first resource is located in the first subframe in subframes whose numbers are [0, 19], and the twelfth resource is located in the twelfth subframe in the subframes whose numbers are [0, 19]. A corresponding user group performs blind detection in a corresponding subframe. FIG. 22 is a schematic diagram of another broadcast channel transmission according to an embodiment of the present invention. In an example of FIG. 22, M=15 and a PBCH is transmitted four times, and a schematic diagram of transmission of the twelfth resource of the PBCH is provided. An encoded BCH block is always located in the twelfth subframe in subframes whose numbers are [0, 19].

For example, a synchronization signal is a PSS/SSS. A $j^{th}$ resource of the PSS/SSS is always located in one or more of a subframe whose number is j, a subframe whose number is j+(floor(M/10)+1)×10−m, or a subframe whose number is j+m in subframes whose numbers are [0, (floor(M/10)+1)×10−1], and m is a quantity of different PSS/SSS resources in each frame for transmitting the PSS/SSS. Multiple times of transmission of each resource in one transmission cycle may be non-uniform. FIG. 23A and FIG. 23B are a schematic diagram of another broadcast channel transmission according to an embodiment of the present invention. For example, the quantity of resources is still 15 as used above. Referring to FIG. 23A and FIG. 23B, a resource k is transmitted for the first time in a subframe whose number is 10, is transmitted for the second time in a subframe whose number is 15, and is transmitted for the third time in a subframe whose number is 30. Therefore, multiple times of transmission in one transmission cycle are non-uniform.

Specifically, SSSs sent based on m resources are formed by interleaving three sequences whose lengths are 31, and different sequences are used for distinguishing three secondary synchronization subframes (j, j+m, j+10−m) in 10 ms. A specific implementation has been provided above for how to use a sequence for distinguishing, and details are not described herein again.

Similarly, for a subframe set of a $j^{th}$ resource of a DL-RS, refer to the embodiment corresponding to the transmit end. Details are not described herein again.

Figure 24:
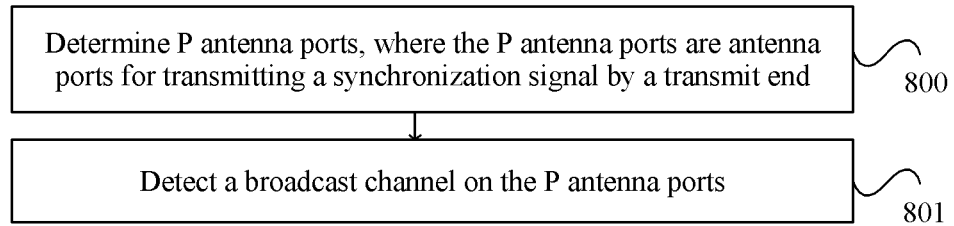
FIG. 24 is a schematic diagram of another signal detection method according to an embodiment of the present invention.

Corresponding to the embodiment corresponding to FIG. 11 in which the execution body is used as a device at a receive end, to reduce complexity during detection by the device at the receive end, and to reduce pilot overheads and design, an embodiment of the present invention provides a solution of demodulating a broadcast channel based on a synchronization signal resource. Specifically, FIG. 24 is a schematic diagram of another signal detection method according to an embodiment of the present invention. Referring to FIG. 24, the method includes the following steps:

Step 800: Determine P antenna ports, where the P antenna ports are antenna ports for transmitting a synchronization signal by a transmit end.

Step 801: Detect a broadcast channel on the P antenna ports.

According to the signal detection method provided in this embodiment of the present invention, P antenna ports are determined, where the P antenna ports are antenna ports for transmitting a synchronization signal by a transmit end; and a broadcast channel is detected on the P antenna ports. Therefore, a broadcast channel is transmitted according to a synchronization signal resource, thereby reducing complexity of detecting, by a device at a receive end, synchronization signal resources and broadcast channels that are separately corresponding to multiple resources, and avoiding a case in which the device at the receive end separately demodulates a synchronization signal and a broadcast channel based on different resources. In addition, because there is no need to design a new broadcast-channel dedicated demodulation pilot again, overheads and design of a broadcast-channel demodulation pilot are reduced.

Further, a feasible implementation of step 801 is as follows:

Step 801a: Detect, in an $i^{th}$ time unit in each time window, the broadcast channel corresponding to the P antenna ports.

It should be noted that the device at the receive end simultaneously detects, in the $i^{th}$ time unit in each time window, the synchronization signal corresponding to the P antenna ports.

Specifically, a transmission cycle of the synchronization signal in the $i^{th}$ time unit in each time window is less than or equal to a transmission cycle of the broadcast channel in the $i^{th}$ time unit in each time window, i is greater than or equal to 1 and is less than or equal to M, and M is a total quantity of time units in each time window.

Several feasible implementations of step 800 are as follows:

Manner 1: Step 800a: Determine the P antenna ports according to preset antenna port information, where the preset antenna port information includes a correspondence between the P antenna ports and the synchronization signal.

Manner 2: Step 800b: Obtain updated antenna port information, and determine the P antenna ports according to the updated antenna port information, where the updated antenna port information includes a correspondence between the P antenna ports and the synchronization signal.

Preferably, in this embodiment of the present invention, a preferred implementation of a solution in which the device at the receive end detects the synchronization signal is as follows:

detecting, in at least two symbols in the $i^{th}$ time unit in each time window, the synchronization signal corresponding to the P antenna ports.

The symbol is a unit of time that is smaller than the time unit.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The storage medium includes: any medium that can store program code, such as a ROM, a RAM, a magnetic disk, or an optical disc.

Finally, it should be noted that the embodiments are only intended for describing the technical solutions of the present invention, but not for limiting the present invention. Although the present invention is described in detail with reference to the embodiments, persons of ordinary skill in the art should understand that they may still make modifications to the technical solutions described in the embodiments or make equivalent replacements to some or all technical features thereof. Therefore, the protection scope of the present invention shall be subject to the protection scope of the claims.

What is claimed is:

1. A signal detection method, comprising:
   obtaining synchronization signal information;
   determining, according to the synchronization signal information, a time unit for detecting a synchronization signal from a base station in a time window, wherein the time unit comprises a $j^{th}$ time unit in the time window, the time window comprises S time units, wherein 1≤j≤S, j and S are integers; and
   detecting the synchronization signal during the $j^{th}$ time unit in the time window.

2. The method according to claim 1, wherein the synchronization signal information comprises the time unit.

3. The method according to claim 2, further comprising:
   determining broadcast channel time units used for detecting the broadcast channel in T consecutive time windows, wherein T is an integer greater than 0, wherein the broadcast channel time units used for detecting the broadcast channel are $j^{th}$ time units in the T consecutive time windows; and
   detecting the broadcast channel in the broadcast channel time units.

4. The method according to claim 3, further comprising:
   obtaining broadcast channel information; and
   determining, according to the broadcast channel information, the broadcast channel time units for detecting the broadcast channel in the T consecutive time windows, wherein the broadcast channel information comprises:

a quantity of the T consecutive time windows, and a broadcast channel time unit for detecting the broadcast channel in a time window of the T consecutive time windows.

5. The method according to claim 1, wherein a sequence corresponding to the synchronization signal is acquired by interleaving a first sub-sequence d(2n) with a second sub-sequence d(2n+1), wherein the first subsequence is acquired based on a first M sequence and a second M sequence, and the second subsequence is acquired based on a first M sequence, a second M sequence, and a third M sequence.

6. The method according to claim 1, further comprising:
determining a downlink measurement time unit for measuring a downlink measurement reference signal in the time window, wherein the downlink measurement time unit comprises the $j^{th}$ time unit in the time window;
performing channel quality measurement on the downlink measurement reference signal in the downlink measurement time unit.

7. The method according to claim 1, wherein the $j^{th}$ time unit is associated with a beam.

8. The method according to claim 1, wherein the synchronization signal information comprises the $j^{th}$ time unit and a parameter m, the parameter m is the total quantity of resources for receiving the PBCH, PSS and SSS in the time window.

9. A signal detection apparatus, comprising:
a transceiver, configured to obtain synchronization signal information;
a processor, configured to determine, according to the synchronization signal information, a time unit for detecting a synchronization signal from a base station in a time window, wherein the time unit comprises a $j^{th}$ time unit in the time window, the time window comprises S time units, wherein $1 \leq j \leq S$, j and S are integers; and
the transceiver, configured to detect the synchronization signal during the $j^{th}$ time unit in the time window.

10. The apparatus according to claim 9, wherein the synchronization signal information comprises the time unit.

11. The apparatus according to claim 10, wherein:
the processor is further configured to determine broadcast channel time units for detecting the broadcast channel in T consecutive time windows, wherein T is an integer greater than 0, wherein the broadcast channel time units are $j^{th}$ time units in the T consecutive time windows; and
the transceiver is further configured to detect the broadcast channel in the broadcast channel time units.

12. The apparatus according to claim 11, wherein:
the transceiver is further configured to obtain broadcast channel information;
the processor is further configured to determine, according to the broadcast channel information, the broadcast channel time units for detecting the broadcast channel in the T consecutive time windows, wherein the broadcast channel information comprises: a quantity of the T consecutive time windows, and a broadcast channel time unit used for detecting the broadcast channel in a time window of the T consecutive time windows.

13. The apparatus according to claim 9, wherein a sequence corresponding to the synchronization signal is acquired by interleaving a first subsequence d(2n) with a second subsequence d(2n+1), wherein the first subsequence is acquired based on a first M sequence and a second M sequence, and the second subsequence is acquired based on a first M sequence, a second M sequence, and a third M sequence.

14. The apparatus according to claim 9, wherein:
the processor is further configured to determine a downlink measurement time unit for measuring a downlink measurement reference signal in the time window, wherein the downlink measurement time unit comprises the $j^{th}$ time unit in the time window;
the transceiver is further configured to perform channel quality measurement on the downlink measurement reference signal in the downlink measurement time unit.

15. The apparatus according to claim 9, wherein the $j^{th}$ time unit is associated with a beam.

16. The apparatus according to claim 9, wherein the synchronization signal information comprises the $j^{th}$ time unit and a parameter m, the parameter m is the total quantity of resources for receiving the PBCH, PSS and SSS in the time window.

17. A non-transitory computer-readable storage medium comprising instructions which, when executed by a computer, cause the computer to:
obtaining synchronization signal information;
determine, according to the synchronization signal information, a time unit for detecting a synchronization signal from a base station in a time window, wherein the time unit comprises a $j^{th}$ time unit in the time window, the time window comprises S time units, wherein $1 \leq j \leq S$, j and S are integers; and
detect the synchronization signal during the $j^{th}$ time unit in the time window.

* * * * *

UNITED STATES PATENT AND TRADEMARK OFFICE
CERTIFICATE OF CORRECTION

PATENT NO. : 10,554,467 B2
APPLICATION NO. : 16/055353
DATED : February 4, 2020
INVENTOR(S) : Liu et al.

It is certified that error appears in the above-identified patent and that said Letters Patent is hereby corrected as shown below:

In the Specification

Column 8, Line 31: replace "d (2n)" with --d(2n)--
Column 8, Line 32: replace "$S_2^{m2}(n)$" with --$S_2^{(m2)}(n)$--
Column 18, Line 2: replace "to use equipment" with --to the user equipment--
Column 19, Line 5: replace "S-m)'" with --S-m)$^{th}$--
Column 25, Line 15: replace "$z_1^{(m0)}z(n)$" with --$z_1^{(m0)}z(n)$--
Column 49, Line 49: replace "channel" with --channel.--
Column 50, Line 44: replace "channel" with --channel.--
Column 51, Line 28: replace "channel" with --channel.--
Column 51, Line 36: replace "channel" with --channel.--
Column 57, Line 56: replace "PBCH/PS S/S SS" with --PBCH/PSS/SSS--
Column 57, Line 58: replace "PS S/SSS" with --PSS/SSS--

Signed and Sealed this
Fourth Day of October, 2022

Katherine Kelly Vidal
*Director of the United States Patent and Trademark Office*